(12) United States Patent
Washington et al.

(10) Patent No.: US 7,121,461 B2
(45) Date of Patent: Oct. 17, 2006

(54) REJECT BIN HAVING SEPARATED STORAGE AREAS FOR DIVERTED AND RETRACTED CURRENCY NOTES

(75) Inventors: Jon Washington, Clinton, OH (US); Eric VanKeulen, North Canton, OH (US); Gregory Spicer, Cuyahoga Falls, OH (US); Douglas Dominick, North Canton, OH (US); Thomas A. VanKirk, Wooster, OH (US); Damon J. Blackford, Akron, OH (US); H. Thomas Graef, Bolivar, OH (US)

(73) Assignee: DieBold Self-Service Systems, division of DieBold, Incorporated, North Canton, OH (US)

( * ) Notice: Subject to any disclaimer, the term of this patent is extended or adjusted under 35 U.S.C. 154(b) by 317 days.

(21) Appl. No.: 10/790,633

(22) Filed: Feb. 27, 2004

(65) Prior Publication Data

US 2004/0188921 A1    Sep. 30, 2004

Related U.S. Application Data

(62) Division of application No. 10/750,571, filed on Dec. 30, 2003, now Pat. No. 6,935,558.

(60) Provisional application No. 60/451,086, filed on Feb. 28, 2003, provisional application No. 60/437,636, filed on Dec. 31, 2002, provisional application No. 60/437,637, filed on Dec. 31, 2002.

(51) Int. Cl.
*G07F 19/00* (2006.01)

(52) U.S. Cl. ............. 235/379; 235/435; 235/381; 271/145

(58) Field of Classification Search .......... 235/379, 235/380, 381, 435; 271/145, 147; 705/39, 705/43
See application file for complete search history.

(56) References Cited

U.S. PATENT DOCUMENTS

| | | | |
|---|---|---|---|
| 4,795,889 A | 1/1989 | Matuura et al. | |
| 5,021,639 A | 6/1991 | Hara et al. | |
| 6,073,837 A * | 6/2000 | Milne | 235/379 |
| 6,454,163 B1 * | 9/2002 | Peebles et al. | 235/379 |
| 6,516,998 B1 * | 2/2003 | Calder et al. | 235/381 |
| 6,540,136 B1 | 4/2003 | Ross | |
| 6,637,647 B1 | 10/2003 | Katou et al. | |

* cited by examiner

*Primary Examiner*—Steven S. Paik
(74) *Attorney, Agent, or Firm*—Daniel D. Wasil; Ralph E. Jocke; Walker & Jocke

(57) ABSTRACT

A reject cassette can commonly receive and separately store both diverted and retracted currency notes. The reject cassette includes a diverted note storage area and a retracted note storage area. The diverted note storage area receives notes deemed unpresentable to a customer. The retracted note storage area receives previously presented notes that were left by a customer. A movable partition directs the notes to the appropriate storage area.

27 Claims, 51 Drawing Sheets

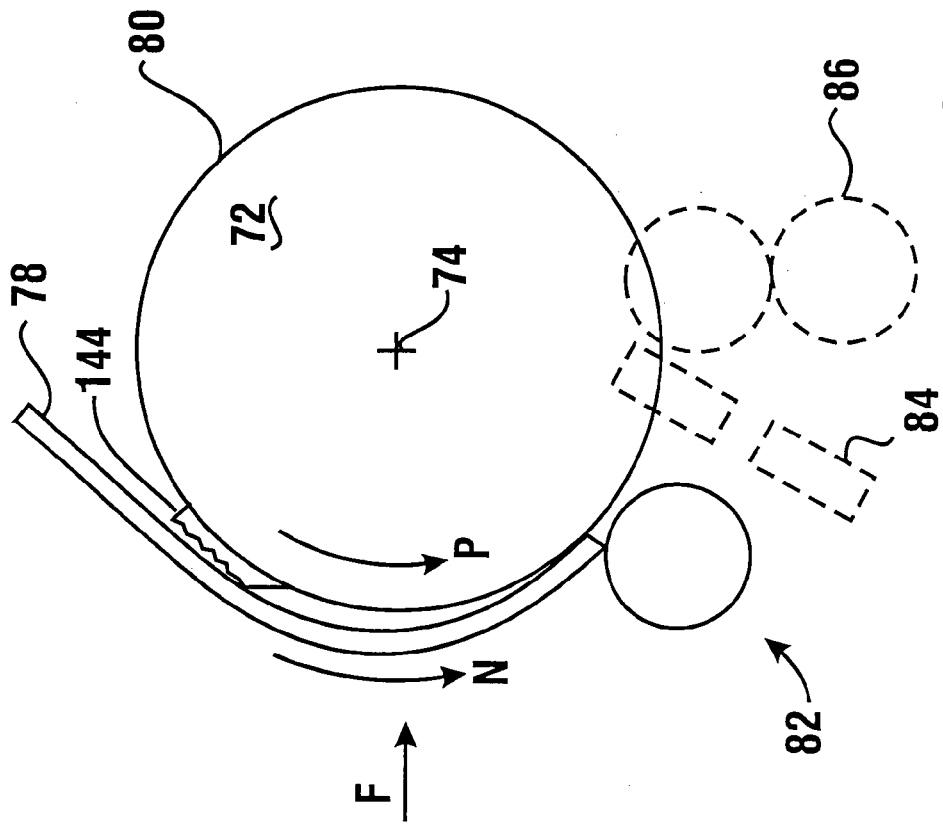
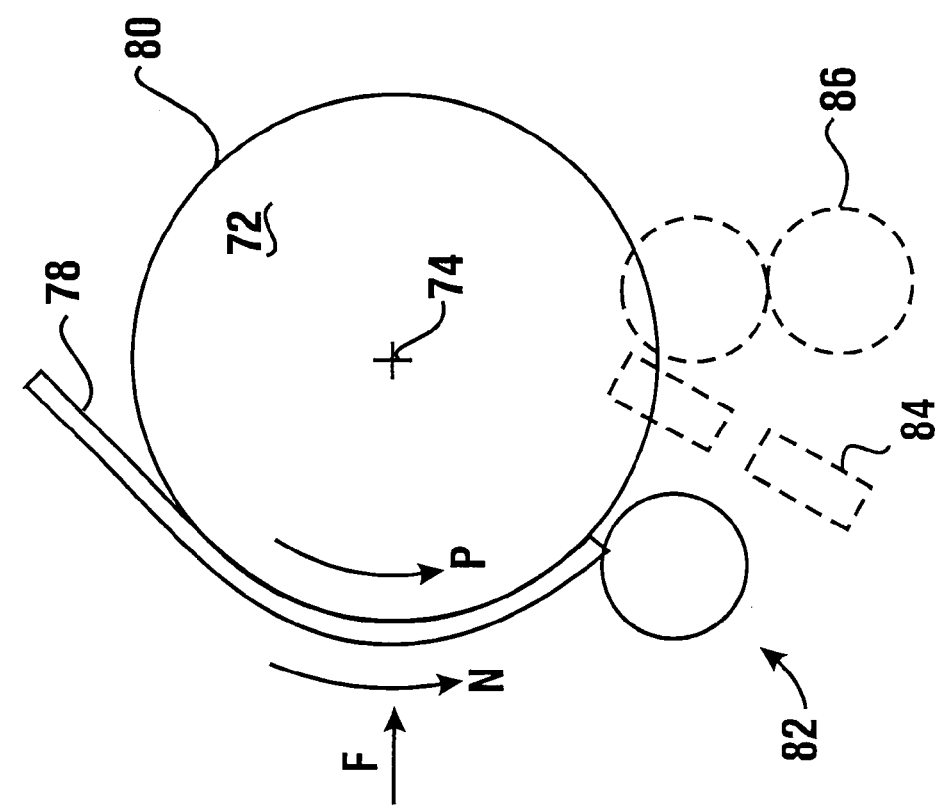
FIG. 6
FIG. 5

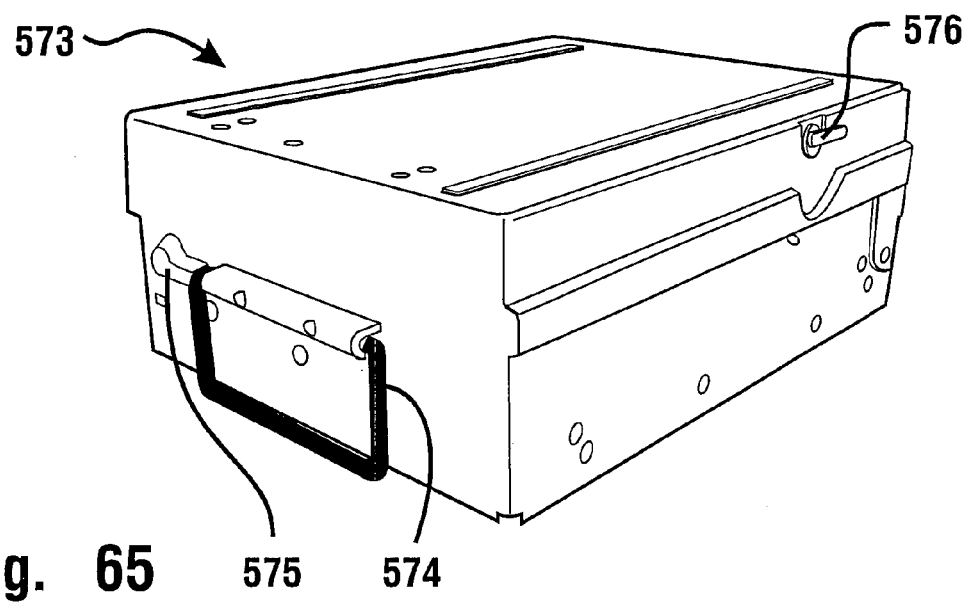
Fig. 65  573  575  574  576
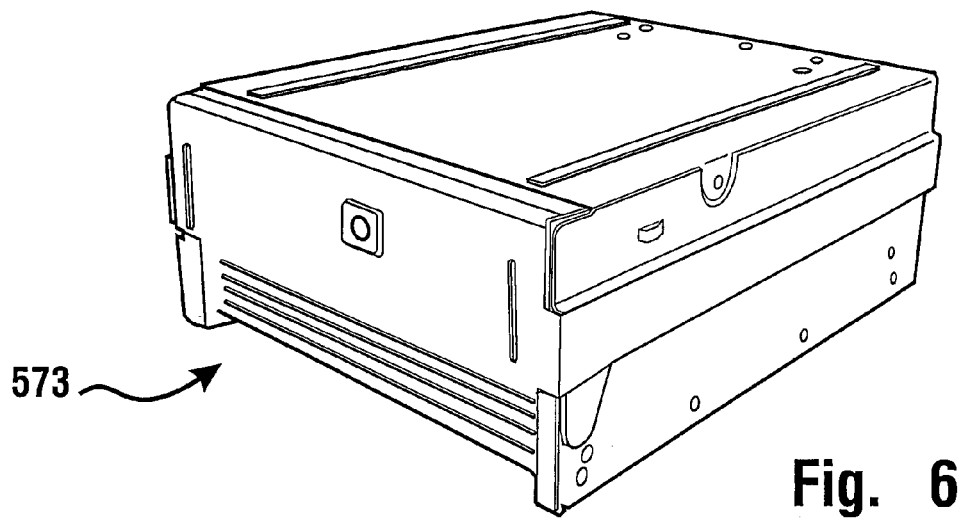
573  Fig. 66

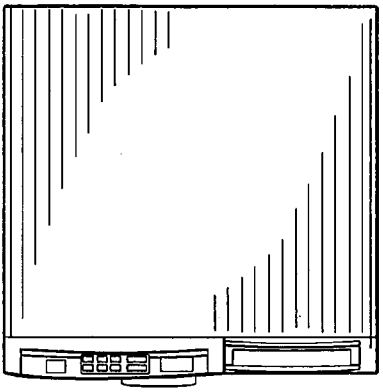
Fig. 73
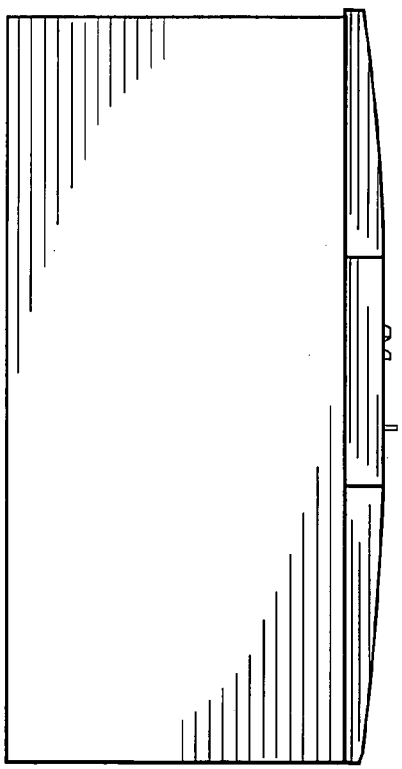
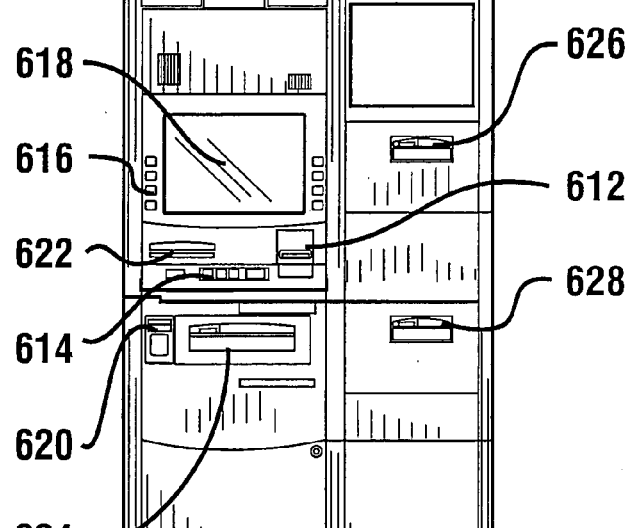
Fig. 74  Fig. 72

REJECT BIN HAVING SEPARATED STORAGE AREAS FOR DIVERTED AND RETRACTED CURRENCY NOTES

CROSS REFERENCE TO RELATED APPLICATIONS

This application claims the benefit of U.S. Provisional Application No. 60/451,086 filed Feb. 28, 2003; and is a divisional of U.S. application Ser. No. 10/750,571 filed Dec. 30, 2003 now U.S. Pat. No. 6,935,558, which claims the benefits of U.S. Provisional Application No. 60/437,636 filed Dec. 31, 2002 and U.S. Provisional Application No. 60/437,637 filed Dec. 31, 2002, and the disclosures of each are incorporated herein by reference.

TECHNICAL FIELD

This invention relates to automated transaction machines.

BACKGROUND ART

Automated transaction machines include automated banking machines. A common type of automated banking machine is an automated teller machine ("ATM"). ATMs may be used to perform transactions such as dispensing cash, accepting deposits, making account balance inquiries, paying bills, and transferring funds between accounts. ATMs and other types of automated banking machines may be used to dispense media or documents such as currency, tickets, scrip, vouchers, checks, gaming materials, receipts, or other media. While many types of automated banking machines, including ATMs, are operated by consumers, other types of automated banking machines may be operated by service providers. Such automated banking machines may be used by service providers to provide cash or other types of sheets or documents when performing transactions. For purposes of this disclosure, an automated banking machine shall be construed as any machine that is capable of carrying out transactions which include transfers of value.

A popular brand of automated banking machine is manufactured by Diebold, Incorporated, the assignee of the present invention. Such automated banking machines are capable of selectively dispensing media, such as in the form of sheets, to users of the machine. A sheet dispensing mechanism used in such machines includes a picking mechanism which delivers:

or "picks" sheets generally one at a time from a stack of sheets stored within the machine.

Media, such as a stack of sheets, can be housed in a specialized container such as a cassette or canister. Media cassettes can be designed to operate in conjunction with the particular media removal mechanism of the machine. A media cassette can be an integral part of the media dispensing system. Cassettes can be loaded or filled with media at locations away from the machine and under secure conditions. Cassettes can be transported to the automated banking machine. Cassettes present the advantage of allowing large amounts of media to be loaded into machines quickly. The interchangeability of cassettes between machines which have the same type of media removal mechanism may also be permitted. An example of a cassette adapted for use in an automated banking machine is disclosed in U.S. Pat. No. 4,113,140, the disclosure of which is incorporated herein by reference.

Picked sheets can be transported through one or more transports within the machine and eventually delivered to a user. A picking mechanism used in some Diebold automated banking machines is described in U.S. Pat. No. 5,577,720, the disclosure of which is incorporated herein by reference. The picking mechanism includes a rotating picking member that comprises a plurality of cylindrical portions disposed along a shaft. Each cylindrical portion includes a high friction segment along a portion of the circumference. These high friction segments are sized and positioned such that upon each rotation of the picking member, an end note bounding an end of the stack is exposed to the moving high friction segment. Such exposure causes the end note to be moved away from the stack in engagement with the moving cylindrical portions of the picking member.

Disposed adjacent to each of the cylindrical portions of the picking member and in the direction of rotation of the picking member relative to the stack when picking the notes, are a plurality of stripping members. A stripping member is disposed in generally abutting relation with each of the cylindrical portions of the picking member. Each stripping member is generally circular and does not rotate during rotation of the picking member in a note picking direction. The stripping member generally operates to prevent all but the end note from moving out of the stack upon rotation of the picking member. The stripping member operates to prevent generally all but the end note from being delivered from the stack because the force applied by the picking member directly on the end note exceeds the resistance force applied by the stripping member to the end note. However the resistance force of the stripping member acting on notes in the stack other than the end note, because such notes are not directly engaged with the picking member, generally prevents the other notes from moving from the stack.

Stripping members may each be supported through one-way clutch mechanisms. These one-way clutch mechanisms prevent the stripping members from turning responsive to the force applied to the stripping members as the picking member moves to pick a note. However the one-way clutch in connection with each stripping member enables each stripping member to rotate in a direction opposite to that which the stripping member is urged to move during picking. This is useful in situations where a doubles detector senses that more than one note has moved past the stripping member. In such circumstances a controller operating in the banking machine may operate to cause the picking member to rotate in an opposed direction, which is the opposite of the direction in which the picking member normally moves when picking a note. As the picking member moves in this opposed direction, the stripping member rotates so as to facilitate the movement of the multiple sheets back toward the stack. Once the multiple sheets have been moved back toward the stack and beyond the stripping member, the controller may operate to cause the picking mechanism to again try to pick a single note from the stack.

In many existing automated banking machines produced by the assignee of the present invention, notes that are picked from the dispenser are moved through a transport of the type shown in U.S. Pat. No. 5,342,165, the disclosure of which is incorporated herein by reference. Such transports include a plurality of generally parallel and transversely disposed belt flights which move the notes in engagement therewith. Disposed between each adjacent pair of belt flights is a projecting member. The projecting member generally extends to at least the level of the sheet engaging surfaces of the adjacent belt flight. As a result sheets are captured in sandwiched relation between the projecting members and the belt flight. This sandwiching of the sheets causes the sheets to move with the moving belt flights to selected locations in the machine. For example as shown in the incorporated disclosure, the sheets are moved in engagement with the belt flight into a stack. Once the stack of sheets has been accumulated, the stack is engaged with belt flights so that it can be moved to be presented to a user of the machine.

The sheet dispenser mechanisms and transports described are highly reliable and have been used extensively in automated banking machines. However, problems can sometimes be encountered in the picking and transport of sheets. In some circumstances sheets may have relatively high surface tension and an affinity for adjacent sheets. This may prevent an end note from being readily separated from a stack of sheets. Alternatively an end note may be worn or soiled in a way that reduces its frictional properties. In such cases an end note may be more resistant to the forces of the high friction segment on the picking member and will not readily separate from the stack. In alternative situations the picking mechanism may be picking a type of sheet which is plasticized or otherwise has reduced frictional properties relative to the high friction segment on the picking member. In such circumstances picking the end note from a stack may prove more difficult to accomplish reliably.

Difficulties in picking sheets may also be encountered due to wear or malfunctions. After extended use the high friction segments on a picking member can become worn. This results in the segments providing less engaging force to move an end note. Alternatively or in addition, high friction segments may become soiled with use, which may also have the effect of reducing the frictional properties of the picking member. The currency canisters which hold the stack of notes also provide a biasing force to hold the end note in abutting relation with the picking member. As a result of damage or wear, the mechanism which provides the biasing force may not provide as great a force biasing the end note to engage the picking member as may be desirable to achieve highly reliable picking of sheets.

In circumstances where the picking member has difficulty picking a note, the note fails to move in coordinated relation with the high friction segments on the cylindrical portions of the picking member. The high friction segments may rotate past the end note leaving the end note generally in the stack. When this situation occurs the machine controller generally operates so that repeated attempts are made to pick the note. If the note cannot be removed from the stack, the machine may operate in accordance with its programming to provide notes from other supplies through other picking mechanisms within the machine. Alternatively the machine may indicate a malfunction and be placed out of service. In either case the extended transaction time or complete inability to carry out a user's transaction presents a significant inconvenience to the user of the machine.

Notes with less than optimum properties may also cause problems when being transported within the machine. Notes that have become wet or soiled may adhere to the projecting members and may fail to move with the belt flights in the transport. Notes that are slippery or have unduly low friction may not produce sufficient engaging force with the moving belt flights and may not move in coordinated relation with the belt flights. Likewise unduly worn or limp notes may not achieve normal engaging force with the belt flights and may become stuck or otherwise fail to move in a transport.

These conditions also present the potential for delaying a transaction or placing a machine out of service. The problem of notes sticking in a transport may also result in the misdispensing of notes. In some circumstances notes may be crumpled or damaged due to transport problems.

Thus there exists a need for improvements to picking mechanisms and sheet transports used in automated banking machines. There further exists a need for improvements to picking mechanisms and transports used in automated banking machines that can be readily installed in existing machines to facilitate use with notes and sheet types having a wider range of properties. There further exists a need for improvements to media cassettes which can be used with picking mechanisms.

DISCLOSURE OF INVENTION

It is an object of an exemplary form of the present invention to provide an automated banking machine.

It is a further object of an exemplary form of the present invention to provide an automated banking machine with an improved system for picking sheets.

It is a further object of an exemplary form of the present invention to provide an automated banking machine with an improved system for transporting sheets.

It is a further object of an exemplary form of the present invention to provide an automated banking machine which provides added force when necessary for picking or transporting sheets.

It is a further object of an exemplary form of the present invention to provide an automated banking machine with an improved media cassette.

It is a further object of an exemplary form of the present invention to provide a method for picking sheets in an automated banking machine.

It is a further object of an exemplary form of the present invention to provide a method for transporting sheets in an automated banking machine.

It is a further object of an exemplary form of the present invention to provide a method for improving the operation of an automated banking machine.

It is a further object of an exemplary form of the present invention to provide a method for upgrading an existing machine to provide for improved picking of sheets.

It is a further object of an exemplary form of the present invention to provide a method for upgrading an existing automated banking machine to provide for improved transport of sheets.

It is a further object of an exemplary form of the present invention to provide a method of improving a media cassette for an automated banking machine.

It is a further object of an exemplary form of the present invention to provide a method for upgrading an existing automated banking machine to provide for improved media cassettes.

The disclosures of U.S. Provisional Application Nos. 60/437,636 filed Dec. 31, 2002 and 60/437,637 filed Dec. 31, 2002 are incorporated herein by reference.

Further objects of exemplary forms of the present invention will be made apparent in the following Best Mode For Carrying Out Invention and the appended claims.

The foregoing objects are accomplished in an exemplary embodiment of the present invention by replacing the picking member in the prior art sheet dispenser mechanism with, or otherwise providing an alternate picking member that provides for applying additional force to move a sheet from a stack in situations where the sheet does not move with the picking member. In the exemplary embodiment the sheets which are picked through operation of the picking member are notes that are picked from a stack. The stack is bounded by an end note which engages the picking member.

The alternative picking member includes at least one movable engaging portion. The movable engaging portion is movable relative to the rotating picking member. The alternate picking member operates so that when the picking member rotates about its axis to pick a note, the engaging portion is in engagement with the end note being picked. In circumstances where the picking member rotates such that the movement of the picking member exceeds the movement of the end note, the engaging portion moves further radially outward relative to the picking member. This outward movement of the engaging portion applies increasing engaging force to the end note. This increasing engaging force results in additional force tending to move the end note relative to the stack.

The exemplary form of the alternate picking member includes a cam surface and a cam follower portion. The cam follower portion is operatively connected to the engaging portion. The action of the cam surface and cam follower portion operates to cause the engaging portion to move radially inward when necessary, before the engaging portion passes adjacent to the stripping member. This avoids the engaging portion from colliding with the stripping member and prevents damage to the dispenser mechanism as well as to notes that are moved therethrough.

The exemplary form of the present invention further includes a sheet transport for transporting notes or sheets that have been dispensed from the dispenser mechanism. The sheet transport includes a plurality of belts which include a plurality of generally parallel transversely spaced belt flights. Projecting member portions extend generally parallel and intermediate of the belt flights. This configuration enables sheets to move in sandwiched relation between the belt flights and the projecting member portions. To provide more reliable movement of sheets, at least one of the conventional belts is replaced with an alternate belt. While the conventional belts have a generally smooth continuous sheet engaging surface, the exemplary form of the alternate belt includes at least one and preferably a plurality of, projections that extend from the sheet engaging surface of the belt. As a result, sheets which become stuck due to adhesion to the projecting member portions will be engaged by the projections and urged to move in the transport. Similarly sheets which do not have sufficient frictional engagement with the belt flights to be moved along the transport, are engaged by the projections and urged to move therewith. This minimizes the risk that sheets will become hung up in the transport and results in higher reliability of the machine.

The exemplary form of the picking member and belt may be installed in new machines or in existing automated banking machines without further substantial modifications to the machines. This may enable enhancing machine reliability quickly and at a modest cost.

BRIEF DESCRIPTION OF DRAWINGS

FIG. 5 is a side schematic view of the picking member operating to move an end note from the stack in circumstances where the end note moves in coordinated relation with the picking member.

FIG. 6 is a view similar to FIG. 5 but showing the movement of the engaging portion of the picking member radially outward responsive to the picking member moving in a picking direction without corresponding movement of the end note.

FIG. 65 shows a front perspective view of a divert cassette.

FIG. 66 shows a rear perspective view of the cassette of FIG. 65.

FIG. 72 shows a perspective of another automated banking machine.

FIG. 73 shows atop view of the machine of FIG. 72.

FIG. 74 shows a side view of the machine of FIG. 72.

BEST MODE FOR CARRYING OUT INVENTION

Figure 1:
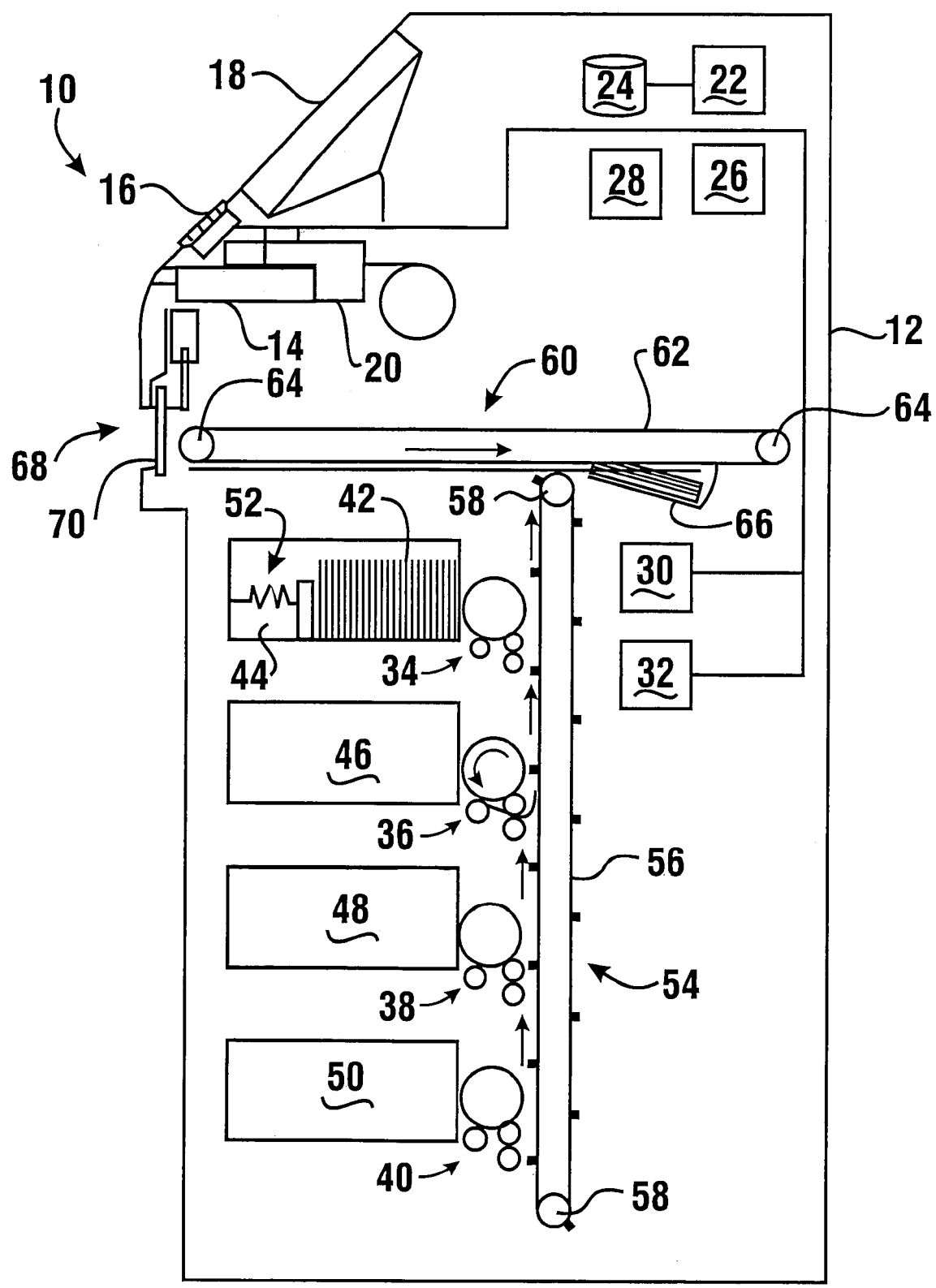
FIG. 1 is a side schematic view of an automated banking machine incorporating an exemplary embodiment of the present invention.

Referring now to the drawings and particularly FIG. 1, there is shown therein an exemplary embodiment of an automated banking machine generally indicated 10. In the exemplary embodiment machine 10 is an ATM. However it should be understood that the invention may be used in connection with other types of automated transaction machines and banking machines.

Automated banking machine 10 includes a housing 12 which houses certain components of the machine. The components of the machine include input and output devices. In this exemplary embodiment the input devices include a card reader schematically indicated 14. Card reader 14 is operative to read a customer's card which includes information about the customer thereon, such as the customer's account number. In embodiments of the invention the card reader 14 may be a card reader adapted for reading magnetic stripe cards and/or so-called "smart cards" which include a programmable memory. Another input device in the exemplary embodiment are input keys 16. Input keys 16 may in embodiments of the invention, be arranged in a keypad or keyboard. Input keys 16 may alternatively or in addition include function keys or other types of devices for receiving manual inputs. It should be understood that in various embodiments of the invention other types of input devices may be used such as biometric readers, speech or voice recognition devices, inductance type readers, IR type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 18. Display 18 may include an LCD), CRT or other type display that is capable of providing visible indicia to a customer. In other embodiments of the invention output devices may include devices such as audio speakers, RF transmitters, IR transmitters or other types of devices that are capable of providing outputs which may be perceived by a user either directly or through use of a computing device, article or machine. It should be understood that embodiments of the invention may also include combined input and output devices such as a touch screen display which is capable of providing outputs to a user as well as receiving inputs.

The exemplary embodiment of the automated banking machine 10 also includes a receipt printer schematically indicated 20. The receipt printer is operative to print receipts for users reflecting transactions conducted at the machine. Forms of the invention may also include other types of printing mechanisms such as statement printer mechanisms, ticket printing mechanisms, check printing mechanisms, and other devices that operate to apply indicia to media in the course of performing transactions carried out with the machine.

Automated banking machine 10 further includes one or more controllers schematically indicated 22. Controller 22 includes one or more processors that are in operative connection with a memory schematically indicated 24. The controller is operative to carry out programmed instructions to achieve operation of the machine in accomplishing transactions. As schematically indicated, the controller is in operative connection with a plurality of the transaction function devices included in the machine.

The exemplary embodiment of the invention includes at least one communications device 26. The communications device may be one or more of a plurality of types of devices that enable the machine to communicate with other systems and devices for purposes of carrying out transactions. For example, communications device 26 may include a modem for communicating messages over a data line or wireless network, with one or more other computers that operate to transfer data representative of the transfer of funds in response to transactions conducted at the machine. Alternatively the communications device 26 may include various types of network interfaces, line drivers or other devices suitable to enable communication between the machine 10 and other computers and systems.

Machine 10 also includes a plurality of sensing devices for sensing various conditions in the machine. These various sensing devices are represented schematically by component 28 for simplicity and to facilitate understanding. It should be understood that a plurality of sensing devices are provided in the machine for sensing and indicating to the controller 22 the status of devices within the machine.

Automated banking machine 10 further includes a plurality of actuators schematically indicated 30 and 32. The actuators may comprise a plurality of devices such as motors, solenoids, cylinders, rotary actuators and other types of devices that are operated responsive to the controller 22. It should be understood that numerous components within the automated banking machine are operated by actuators positioned in operative connection therewith. Actuators 30 and 32 are shown to schematically represent such actuators in the machine and to facilitate understanding.

In the exemplary automated banking machine 10 there are four sheet dispenser mechanisms 34, 36, 38 and 40. Each sheet dispensing mechanism is operative responsive to the controller 22 to pick sheets. Sheets may be selectively picked generally one at a time from a stack of sheets such as stack 42 shown adjacent to sheet dispenser mechanism 34. In the exemplary embodiment each of the stacks of sheets associated with a respective sheet dispenser mechanism is housed in a canister or cassette. A canister for use in an automated banking machine may be of the type shown in U.S. Pat. No. 4,871,085, the disclosure of which is incorporated herein by reference. A canister 44 houses sheets in connection with dispenser mechanism 34. Likewise a canister 46 houses sheets to be picked by dispenser mechanism 36. A canister 48 houses sheets dispensed by dispenser mechanism 38 and a canister 50 houses sheets that are dispensed by dispenser mechanism 40. As schematically represented in canister 44, the stack of sheets 42 is biased to engage the sheet dispenser mechanism by a biasing mechanism 52.

In the exemplary embodiment, canisters or cassettes 44, 46, 48, 50 are used to house media having predetermined value, e.g., currency, including bank notes or bills or sheets. Such bank notes may be of various currency denominations which enable dispensing money in varying amounts to customers. Alternatively, one or more of the canisters or cassettes may hold other types of media or sheets such as coupons, scrip, tickets, money orders, vouchers, checks, gaming materials, or other items of value. The controller operates the dispenser mechanism selectively in response to customer inputs and information from systems with which the machine communicates, to cause sheets to be selectively dispensed from the multi-media canisters.

Notes that are dispensed from the canisters in the exemplary embodiment are engaged with a first note transport schematically indicated 54. First note transport 54, which is later described in detail, includes a plurality of continuous belts 56. The belts extend around sets of rollers 58 which operate to drive and guide the belts. As shown schematically in FIG. 1 by the sheet dispensed from dispenser mechanism 36, sheets are enabled to engage the adjacent flights of belts 56 and move in engagement therewith upward to a second transport 60.

The second transport 60 in the exemplary embodiment is similar to that shown in U.S. Pat. No. 5,342,165 the disclosure of which is incorporated herein by reference. Transport 60 also includes a plurality of continuous belts 62 which extend about sets of rollers 64. Rollers 64 operate to drive the belt 62 such that notes passing upward in transport 54 initially engage flights of belt 62 and are collected into a stack 66. In response to operation of the controller 22 when a desired number of notes have been collected in the stack 66, the stack is moved in the manner of the incorporated disclosure and the belts 62 are driven so that the stack 66 is moved toward a user opening 68 in the housing 12 of the machine. As the notes are moved toward the opening 68, the controller operates a suitable actuating device to operate a gate 70 so as to enable the stack to pass outward through the opening. As a result the user is enabled to receive the sheets from the machine. After a user is sensed as having removed the stack from the opening, the controller may operate to close the gate 70 so as to minimize the risk of tampering with the machine.

It should be understood that the devices shown in connection with exemplary automated banking machine 10 are representative of devices that may be found in such machines. Numerous additional or alternative types of devices such as deposit accepting devices, document reading devices, currency accepting devices, ticket printing devices and additional devices may be included in automated banking machines which are used in connection with the present invention.

Figure 14:
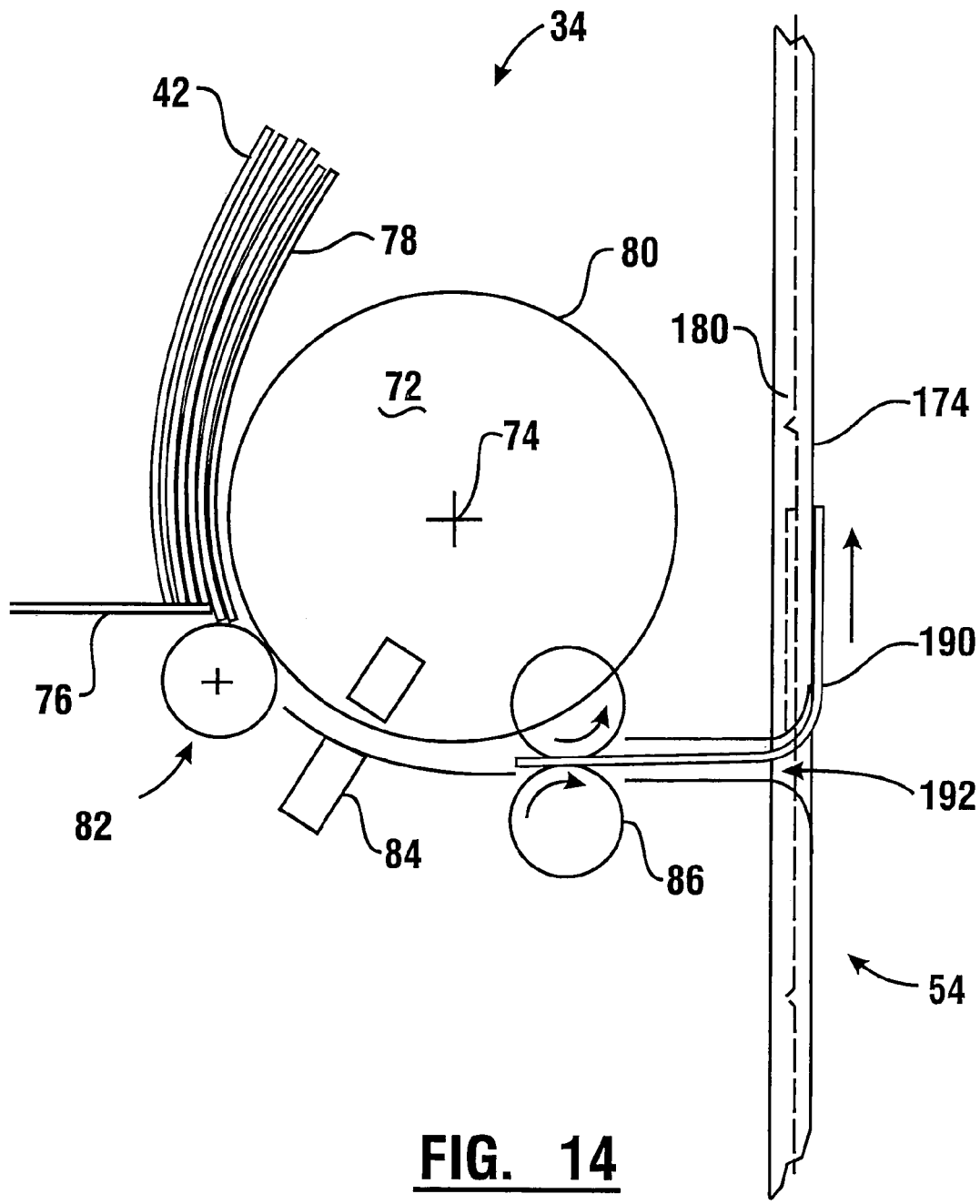
FIG. 14 is a side schematic view showing a sheet that has been dispensed by a dispenser mechanism moving to engage a sheet transport.

FIG. 14 shows the sheet dispenser mechanism 34 in greater detail. In the exemplary embodiment of the machine 10 all the dispenser mechanisms are the same, therefore only one will be described in detail. Dispenser mechanism 34 includes a picking member 72. The picking member 72 is selectively rotated responsive to the controller 22 about an axis 74. Bank notes or other sheets in the stack 42 are supported by a supporting surface 76 which terminates in the area adjacent to the picking member. An end note 78 bounds the stack adjacent to the picking member 72. During each rotation of the picking member the then current end note bounding the stack is moved and delivered from the stack and passed to the transport 54.

The picking member 72 has an outer bounding surface 80. The outer bounding surface 80 is in generally abutting relation with stripping members 82. As previously discussed the stripping members 82 in the exemplary embodiment do not rotate in a clockwise direction as shown in FIG. 14. In the exemplary embodiment, the stripping members 82 will however rotate in a counterclockwise direction due to action of associated one-way clutches as later described.

Positioned downstream of the stripping members 82 is a doubles detector 84. Doubles detector 84 may be a mechanical sensor, radiation sensor, sonic sensor or other type sensor that is suitable for determining if single or multiple notes have moved past the stripping member toward the transport. Downstream of the doubles detector are a pair of carry away rolls 86. The carry away rolls are operative to engage sheets that have moved sufficiently away from the stack so as to engage the rolls. The rolls, which are operated by a drive in response to the controller 22, operate to engage sheets and move them into the transport. It should be understood that this configuration of the dispenser mechanism is exemplary and in other embodiments different configurations may be used.

As discussed in the incorporated disclosure of U.S. Pat. No. 5,577,720, the normal operation of the dispenser mechanism involves the picking member rotating responsive to the controller 22 during picking operations. When it is desired to pick the end note 78 the picking member 72 rotates in a counterclockwise direction as shown in FIG. 14 about the axis 74. This is done through operation of a drive or other similar device. Rotation of the picking member urges the end note 78 to move from the stack. The stripping members 82 resist the movement of the end note because the stripping members do not move in a clockwise direction as shown in FIG. 14. Because of the surface area of the picking member 72 engaging the end note and the frictional properties of the outer bounding surface 80, the force urging the end note 78 to move from the stack generally overcomes the resistance force of the stripping members. This is because the stripping members have a smaller surface area and/or a different frictional coefficient resulting in less resistance force than the moving force of the picking member. The stripping members however provide sufficient resistance to resist generally all but the end note 78 from moving from the stack. This is because the notes in the stack other than the end note, are not directly engaged with the picking member and do not experience the same degree of force urging them to move from the stack.

As the end note 78 is moved from the stack the thickness thereof may be sensed by the doubles detector 84. The doubles detector 84 is operatively connected to the controller and at least one signal from the doubles detector provides an indication as to whether a single or a multiple note has been pulled from the stack. In circumstances where multiple notes are sensed, the controller may cause the picking member to operate to stop rotating in the counterclockwise direction as shown in FIG. 14, and instead to rotate in a clockwise direction. When the picking member 72 rotates in a clockwise direction to pull sheets back into the stack 42, the stripping members 82 are enabled to cooperatively rotate in a counterclockwise direction as shown in FIG. 14. This is due to the one-way clutch associated with each of the stripping members. As a result the sheets are returned to the stack. Thereafter the controller 22 may again operate so as to rotate picking member 72 in a counterclockwise direction and an attempt is again made to pick a single end note from the stack.

In circumstances where the doubles detector 84 senses only a single note passing from the stack, the controller operates a drive or other suitable moving mechanism to cause the carry away rolls 86 to engage and move the sheet to the transport 54. It should be understood that the steps described as being taken responsive to operation of the controller are exemplary. In some embodiments of the invention the controller may cause the machine to operate to direct double notes to a divert bin or other storage area rather than attempting to repeatedly pick a single note.

Figure 2:
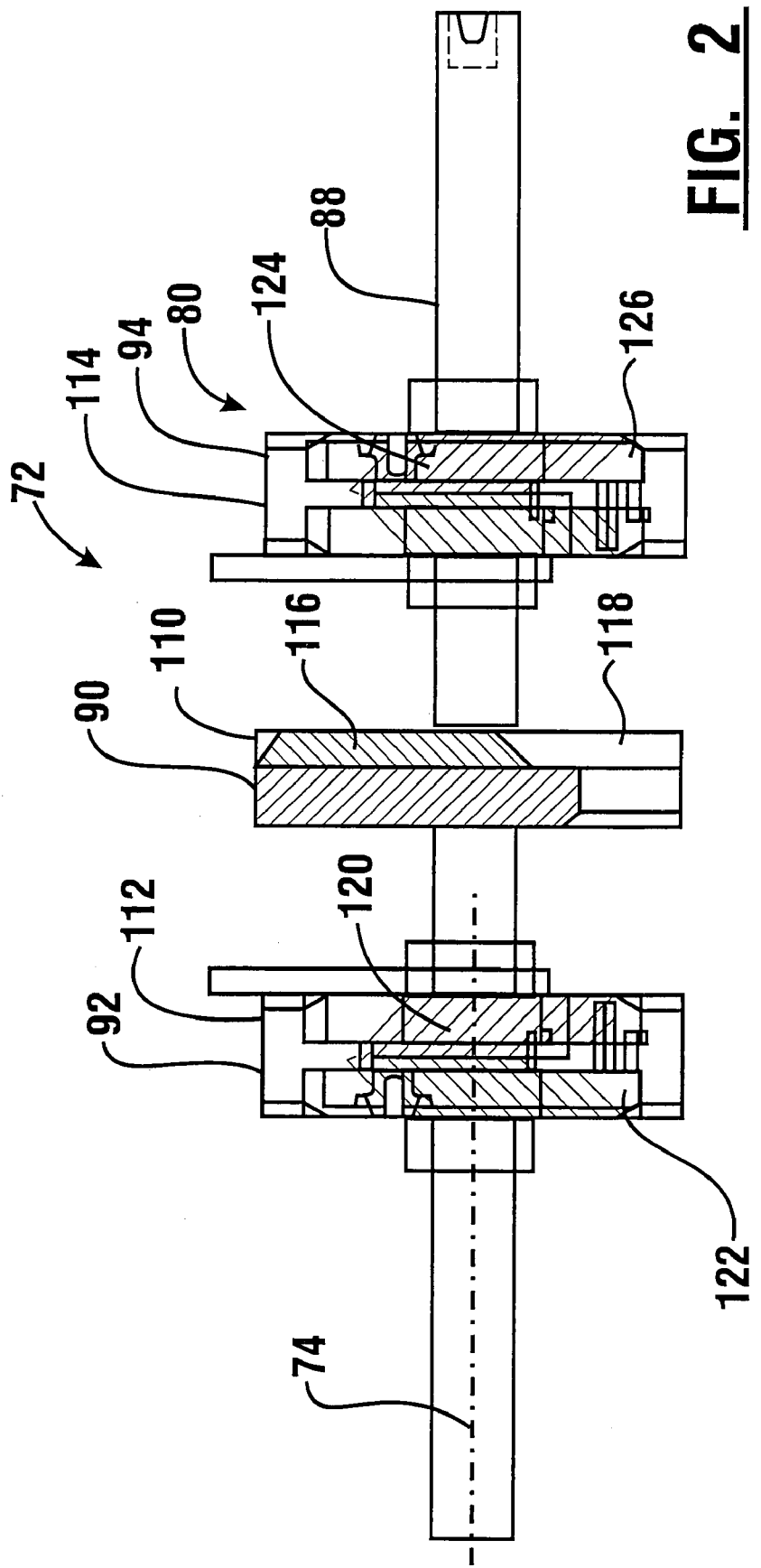
FIG. 2 is a side view of a picking member used in an exemplary embodiment of the present invention.
Figure 3:
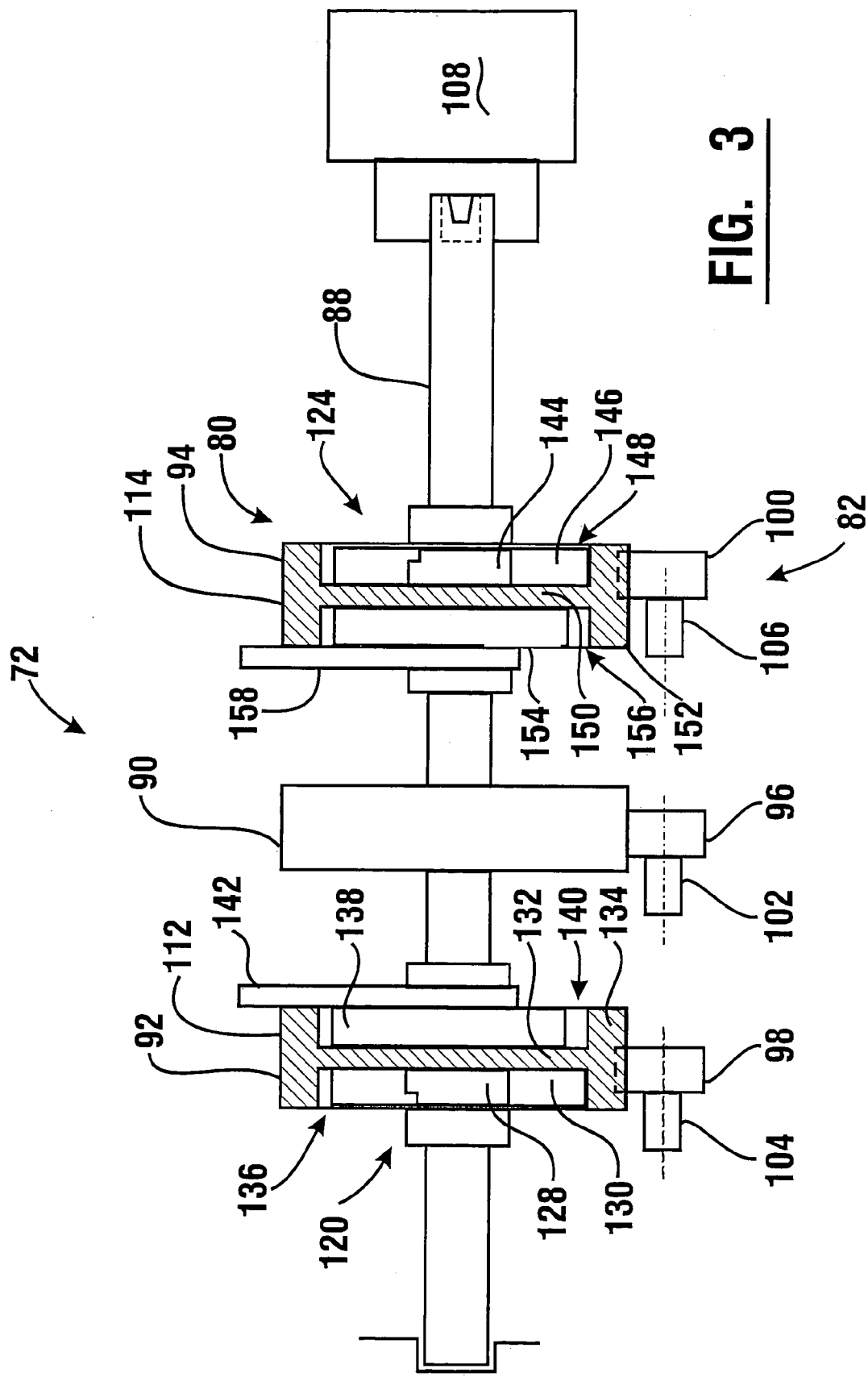
FIG. 3 is a cross sectional view of the picking member shown in FIG. 2 in operative connection with a drive in the machine.

The picking member of the exemplary embodiment of the present invention is shown in greater detail in FIGS. 2 and 3. The picking member 72 includes a central shaft 88. Three separated cylindrical portions are supported on the shaft. These cylindrical portions include a central portion 90. Disposed on a first axial side of cylindrical portion 90 is a first outboard portion 92. Disposed in an opposed axial direction from central cylindrical portion is a second outboard portion 94.

As shown in FIG. 3 each cylindrical portion 90, 92 and 94 has an associated one of the stripping members 82 in abutting relation therewith, indicated 96, 98 and 100 respectively. Each of the stripping members has an associated one-way clutch 102, 104 and 106 operatively connected therewith. Each of the one-way clutches as previously discussed, enables only one-way rotation of the stripping member. The stripping member is enabled to rotate only when sheets are being pulled back into the stack. However when sheets are being picked the stripping members remain generally stationary.

As shown schematically in FIG. 3, shaft 88 is operatively connected with a drive 108 which selectively rotates the shaft responsive to signals from the controller. As also shown in FIG. 3, in the exemplary embodiment stripping member 96 which is in abutting relation with the central portion 90 is somewhat angularly disposed from stripping members 98 and 100 which are in abutting relation with the outboard portions 92 and 94 respectively. In the exemplary form of the invention, stripping member 96 is disposed somewhat angularly forward of the other stripping members such that notes tend to engage the central stripping member during picking prior to engaging stripping members 98 and 100. Of course in other embodiments of the invention other approaches, configurations and types of stripping members and picking members may be used.

As shown in FIG. 2 the outer bounding surface 80 of the picking member includes an outer surface 110 of cylindrical portion 90, as well as outer surface 112 of cylindrical portion 92 and outer surface 114 of cylindrical portion 94. Outer surface 110 includes thereon a ribbed relatively high friction portion 116. The balance of the outer surface 110 has a relatively lower friction portion 118. High friction portion 116 applies an engaging force to the end note bounding the stack which is generally sufficient to engage and move the end note from the stack. The low friction portion 118 is generally enabled to move relative to the end note without causing the note to be moved from the stack. In the exemplary embodiment this construction facilitates reliably picking a single note each time the picking member is rotated one turn. This construction further provides spacing between notes sequentially picked from the stack. Such spacing facilitates identifying and handling of notes.

Outer surface 112 of cylindrical portion 92 likewise includes a ribbed, relatively high friction portion 120 on the outer surface thereof. Outer surface 112 also includes a relatively lower friction portion 122 which surrounds the high friction portion. The angular position of high friction portion 120 generally corresponds to high friction portion 116 on the central portion 90. As is the case with the other relatively high and low friction portions, high friction portion 120 applies force to the end note generally sufficient to engage and move it from the stack, while the relatively lower friction portion is enabled to move in engagement with the end note without causing it to be disposed from the stack. Similarly as shown in FIG. 2 cylindrical portion 94 also includes a generally high friction portion 124 and a generally lower friction portion 126. The high and low friction portions on the cylindrical portion 94 angularly correspond to the high and low friction portions on the other cylindrical portions of the picking member.

As most clearly shown in the partial cross sectional view in FIG. 3, within the high friction portion 120 of cylindrical portion 92, is an arcuate segment 128. Arcuate segment 128 occupies a portion of the axial width of the cylindrical portion toward the outboard side of the picking member. The arcuate segment 128 is supported on a movable member 130. Movable member 130 as later discussed in detail, is movable relative to the cylindrical portion and the picking member in a manner which enables arcuate segment 128 to move radially outward relative to the bounding surface bounding the picking member. In the exemplary form of the invention the cylindrical portion 92 is generally I-shaped in transverse cross section and includes a central web portion 132. The web portion 132 terminates in cross section in a flange portion 134 which supports the outer surface 112 thereon. The movable member 130 is movable in a recess 136 on a first longitudinal side of the web member 132.

A cam 138 is positioned in a recess 140 which extends on opposed longitudinal side from recess 136. Cam 138 is in supporting connection with the shaft 88. Cam 138 is also in supporting connection with a support member portion 142. The support member portion 142 operates to hold the cam 138 stationary as the shaft 88 and cylindrical portion 92 rotates.

Cylindrical portion 94 includes structures which are generally a mirror image of those associated with cylindrical portion 92. The high friction portion of outer surface 114 includes an arcuate segment 144 which is supported on a movable member 146. The movable member 146 is positioned in a recess 148 which is bounded by a web portion 150 and a flange portion 152 of cylindrical portion 94.

A cam 154 is positioned in a recess 156 on an opposed longitudinal side from recess 148. Cam 154 is in supporting connection with the shaft 88 and is held stationary relative to the shaft by a support member portion 158.

Figure 4:
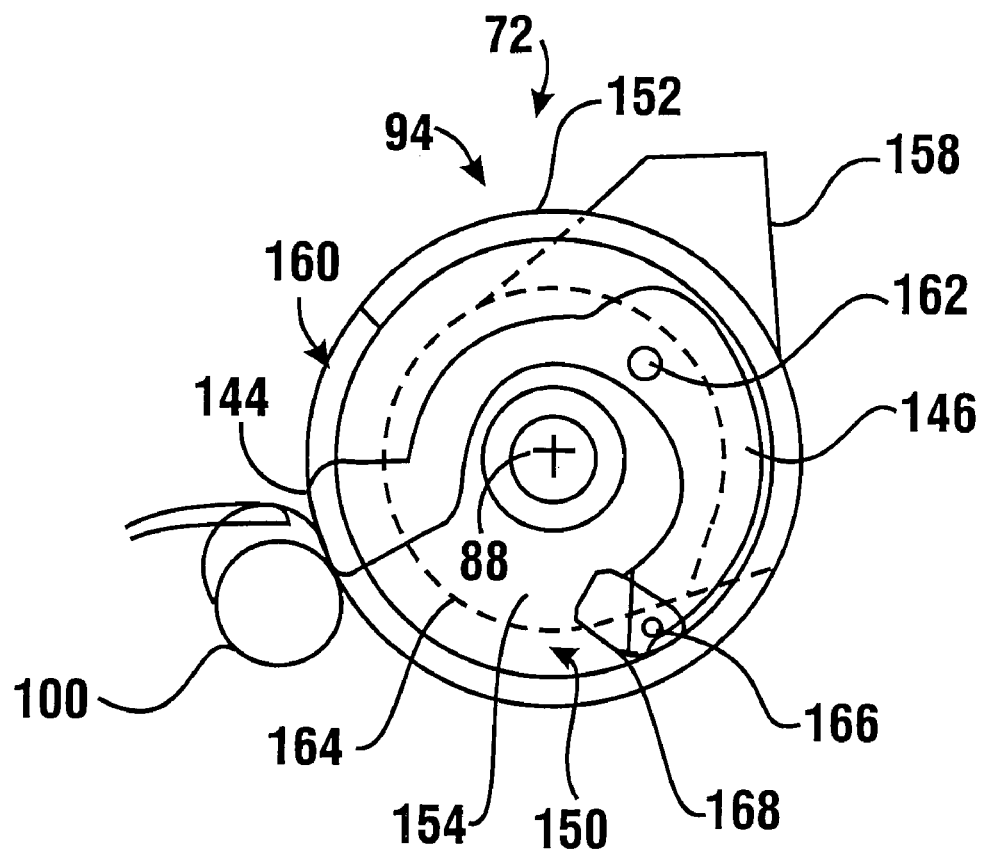
FIG. 4 is a side view of the picking member shown in FIG. 3.

As the operation of the cylindrical portions 92 and 94 of the picking member are similar, an explanation of the operation of the picking member will be described with reference to cylindrical portion 94. As best seen in FIG. 4, the segment 144 extends through an opening 160 in the flange portion 152 of cylindrical portion 94. The exemplary movable member 146 is generally horseshoe shaped and is supported on the picking member through a pivot connection 162. The pivot connection supports the movable member 146 through the web portion 150.

The cam 154 is bounded by a cam surface 164. A cam follower portion 166 is supported on the movable member 146 at an end opposed of the arcuate segment 144. The cam follower portion extends through an opening 168 in the web portion 150. This enables the cam follower portion 166 to engage the cam surface 164 of the cam 154. As can be appreciated, this arrangement enables the position of the arcuate segment 144 to be controlled as the picking member rotates due to the engagement of the cam follower 166 with the cam surface 164.

The overall operation of the exemplary picking member 72 is explained with reference to FIGS. 5 and 6. As indicated in FIG. 5, during normal operation of the picking member the high friction portions on the picking members engage an end note 78 bounding the stack. The high friction portions move the note generally engaged and at the same speed as the picking member, past the stripping member 82 so that the end note is moved from the stack. During this normal operation the note moves in synchronized relation with the movement of the outer bounding surface 80 of the picking member 72. As a result during normal operation the velocity of the end note indicated by arrow N corresponds generally to the velocity of the outer surface 80 of the picking member represented by arrow P. Arrow F corresponds to the direction of the force applied to the stack which holds the end note 78 in engaged relation with the picking member 72.

FIG. 6 represents the operation of the picking member 72 of the exemplary embodiment when an end note 78 fails to move in coordinated relation with the picking member. In such circumstances the velocity and displacement of the picking member is greater than the corresponding velocity and movement of the end note 78. The high friction arcuate segments 128, 144 which serve as engaging portions, because they are enabled to move relative to the picking member 72, tend to maintain engaged relation with the end note. This is represented by the arcuate segment 144 in FIG. 6. Because the engaging portion of the arcuate segment 144 remains engaged with the end note and is movable relative to the picking member, when the angular movement of the picking member exceeds the movement of the engaging portion of segment 144, the segment 144 moves radially outward relative to outer bounding surface 80. The movement of the engaging portion further radially outward relative to the axis of rotation 74 increases the engaging force on the end note urging it to move from the stack. As can be appreciated from the later detailed description of the movable member, the engaging portions tend to move further radially outward providing increasing engaging force, with an increase in difference between the movement of the picking member and the engaging portion. This increasing force on the end note tends to cause the-end note to begin moving past the stripping members 82 so that the note can be picked. As the end note begins to move in coordinated relation with the picking member, the engaging portions may begin to move radially inward. In the exemplary embodiment the action of the cam follower portion and the cam surface operate to assure that the engaging portions are moved radially inward to the level of the outer bounding surface 80 by the time the engaging portions rotate to a position adjacent to the stripping members 82. This assures that the engaging portions and the notes are not damaged.

Figure 7:
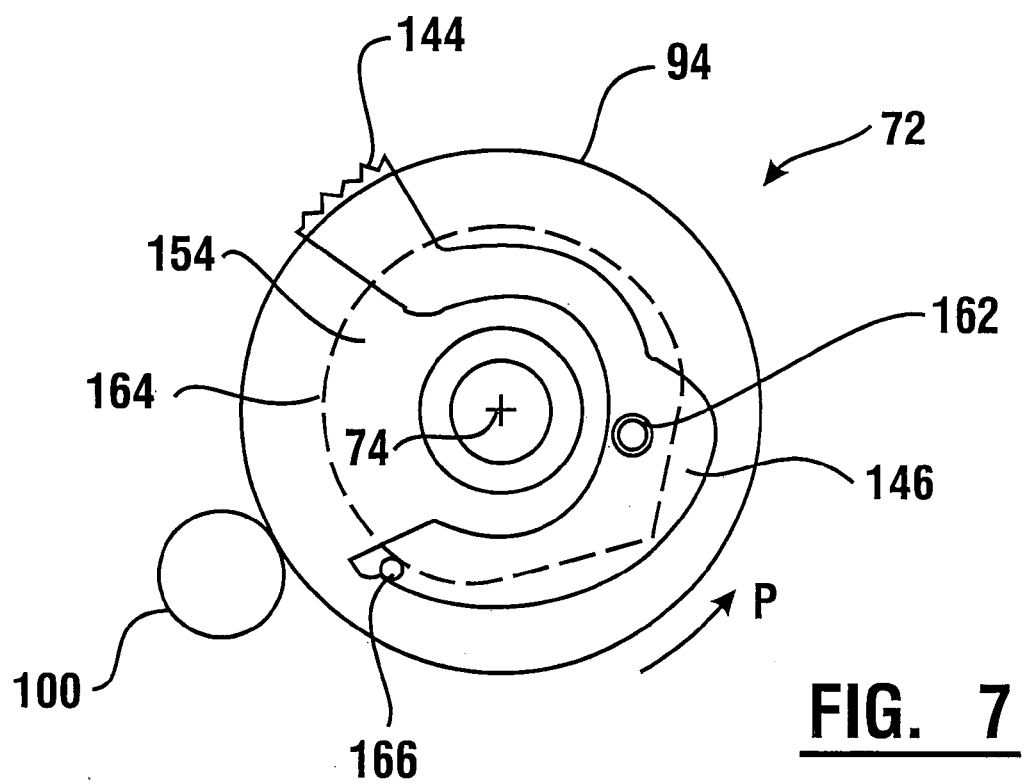
FIGS. 7–10 are side schematic views showing a sequence of positions of the engaging portion of the picking member and the operation of the cam surface to retract the engaging member as the picking member rotates.

FIGS. 7–10 show the exemplary operation of the picking member 72 with regard to cylindrical portion 94 of the picking member. It should be understood that cylindrical portion 92 is a mirror image thereof and works in a similar manner during picking. As represented in FIG. 7, the picking member 72 rotates in the direction of arrow P. Assuming that an end note engaged with the engaging portion which is included on segment 144 is not moving in synchronization with the picking member, the segment 144 rotates in a first direction about pivot connection 162. This results because the segment 144 is engaged with the note and the angular movement thereof does not correspond to the angular movement of the picking member 72 about the axis 74. Segment 144 moves radially outward relative to axis 74. The radially outward movement of segment 144 is limited by the engagement of the cam follower portion 166 with the cam portion: 164 of cam 154.

As can be appreciated, the outward movement of the engaging portion on segment 144 applies increasing engaging force on the end note responsive to the end note not moving with the picking member. In addition the engaging portion of segment 144 operates to move further radially outward with an increasing difference between the movement of the picking member and the movement of the note. This outward movement may continue until the segment 144 reaches the full extent of its travel as limited by the cam surface.

Figure 8:
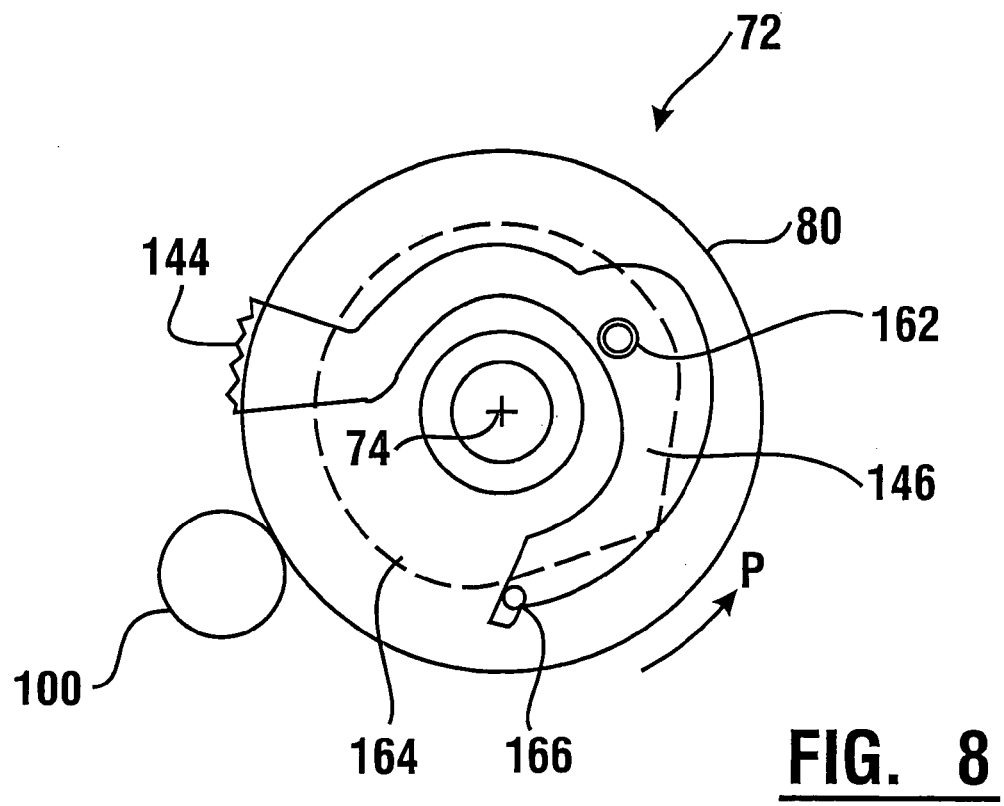

As shown in FIG. 8, if the end note has not initially moved in coordinated relation with the picking member, the engaging portion of the arcuate segment 144 will generally remain extended radially outward relative to the outer bounding surface of the picking member as the picking member further rotates. This provides additional force tending to assure that the note is moved from the stack. It should be appreciated that once the note begins moving, if note movement begins to exceed that of the picking member, the engaging portion of the arcuate segment 144 will begin to retract radially inward toward the outer bounding surface 80. Generally however once the engaging portion has extended radially outward, it will remain outwardly extended to the extent permitted by the engagement of the cam follower portion 166 with the cam surface 164.

Figure 9:
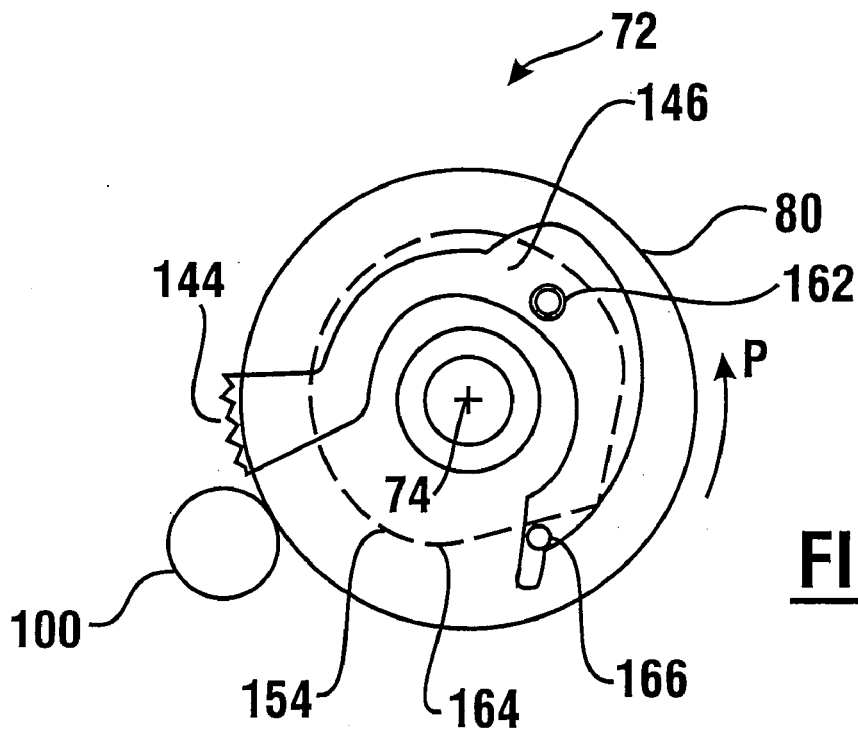

As shown in FIG. 9, as the picking member 72 rotates further toward the position where the engaging portion of the arcuate segment 144 approaches the stripping members, the profile of the cam surface 164 causes the cam follower portion 166 to cause the movable member 146 to rotate relative to the pivot connection 162. As shown in FIG. 9 the cam surface tends to rotate. the movable member 146 in a generally opposed rotational direction about pivot connection 162, a direction in which the movable member rotates to extend the arcuate segment. As a result, as the picking member rotates so that the arcuate segment approaches the stripping member, the arcuate segment tends to move radially inward toward the outer bounding surface 80.

Figure 10:
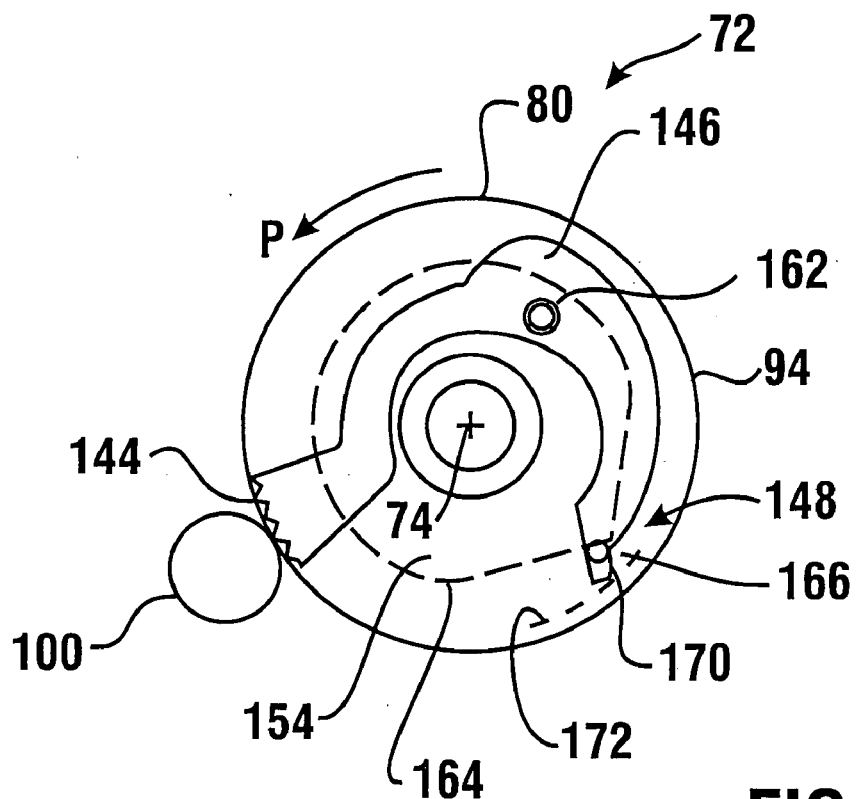

As shown in FIG. 10 once the picking member 72 has rotated to the point where the engaging portion of segment 144 is in abutting relation with the stripping member, the operation of the cam surface 164 and the cam follower portion 166 has caused the engaging portion to be retracted through movement of the movable member 146. The outer surface of segment 144 at this point is moved to generally conform with the outer bounding surface 80 of the picking member. In addition as the engaging portion on the segment 144 retracts radially inward, the engaging portion applies a decreasing engaging force to the end note as the end note is moved between the picking member and the stripping member. This decreasing force not only avoids collisions between the engaging portion and the stripping members, but it also prevents possible damage to the mechanism as well as to the notes being picked.

As shown in FIG. 10 the exemplary form of the invention includes a stop portion 170 on the movable member 146. The stop portion 170 engages a surface 172 bounding recess 148. The stop portion prevents the engaging portion on the segment 144 from being moved radially inward substantially beyond the outer bounding surface 80 of the picking member.

As can be appreciated this exemplary embodiment of the picking member provides increasing engaging force on the end note responsive to the end note not moving with the picking member. As a result additional picking force is applied in only those circumstances where it is required to move the end note from the stack. In circumstances where notes are soiled, have high surface tension or are of slippery consistency, additional moving force is usually automatically applied. Further the exemplary form of the picking member also enables compensating for wear or reduced friction with soiling that may result from extended use of a picking member. In this way the exemplary form of the picking member is able to compensate for those conditions which might otherwise result in a decrease in note picking reliability.

It should further be understood that while in the exemplary form of the picking member the engaging portion is moved radially outward and applies additional picking force based on the relative movement between the end note and the picking member, in other embodiments other approaches may be used. Such approaches may include for example, other devices and systems for determining a difference in relative movement between the notes being picked and the picking member, and moving in engaging portion to apply additional engaging force in response thereto. Although the exemplary form of the invention uses a mechanical type system to accomplish this, electronic and electromechanical systems may be used in other embodiments.

A further useful aspect of the exemplary form of the picking member and its operation in connection with dispensing mechanisms, is that it may be readily retrofit to an existing automated banking machine. The exemplary form of the invention enables a service technician to access an interior area of an ATM such as by unlocking a door to a secure chest portion. Once access is gained to the note handling mechanism, the technician may remove an existing picking member which does not include the features of the radially movable engaging portions, and to install a picking member 72 in place thereof. In the exemplary form of the invention the support member portions 142 and 158 are configured to engage existing surfaces within the housing of the ATM so as to hold the cams stationary as the picking member rotates. Once installed in the ATM, the door to the secure chest portion is closed and locked.

Picking member 72 is constructed to have the same general profile as picking members that do not incorporate the exemplary form of the present invention. Thus, installation of the exemplary picking member is readily made to improve the operation of the machine. It should further be understood that the programming of the controller 22 also often need not be changed to accommodate the installation of the picking member 72. Except as described herein, the operation of the picking member 72 is similar to that of a picking member which may be replaced in terms of moving and retracting notes.

Figure 12:
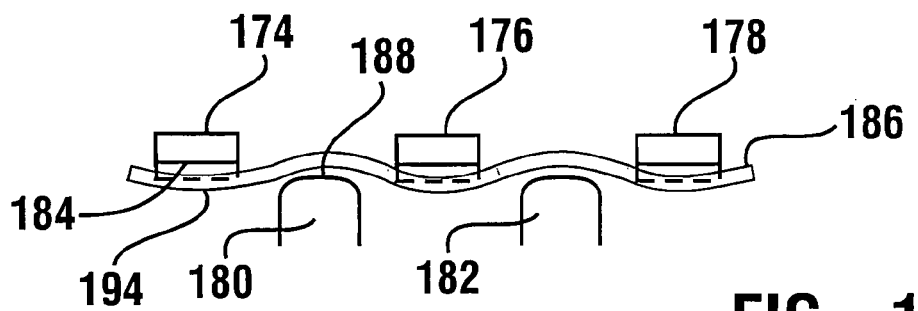
FIG. 12 is a side cross sectional view of the sheet transport showing a sheet in engagement with a plurality of belt flights and projecting member portions.

In the exemplary embodiment of the invention a note transport such as note transport 54, includes features to reduce the risk that notes may become stuck or jammed in the transport. As previously discussed in connection with FIG. 1, note transport 54 includes a plurality of continuous belts 56 which extend about sets of rollers 58. It should be understood that the transport 54 may include belts that extend the entire length of the transport or may have several belts which span sections of the transport. In an exemplary form of the present invention the continuous belts are arranged so that the transport includes a plurality of generally parallel belt flights. These belt flights are represented in FIG. 12 by belt flights 174, 176 and 178. Each of the belt flights extend along a longitudinal direction of the transport, in which longitudinal direction sheets are moved. The belt flights are moved through operation of a drive or similar moving mechanism which is controlled responsive to operation of the controller 22 and which drives the rollers upon which the belts are supported.

As shown in FIG. 12, disposed transversely intermediate of each adjacent pair of belt flights, are projecting member portions 180, 182. As can be readily seen from FIG. 12, each of the belt flights has a first sheet engaging surface represented by surface 184 of belt flight 174, which faces in a first facing direction toward a sheet 186 which extends in the transport. The projecting member portions each include a second sheet engaging surface represented by surface 188 of projecting member portion 180. The second sheet engaging surface 188 faces in a second facing direction which is generally opposed of the first facing direction. As will be appreciated the first and second facing directions in which the sheet engaging surfaces of the belt flights and the projecting member portions extend respectively, are both generally normal of the longitudinal direction in which the sheets move.

Figure 13:
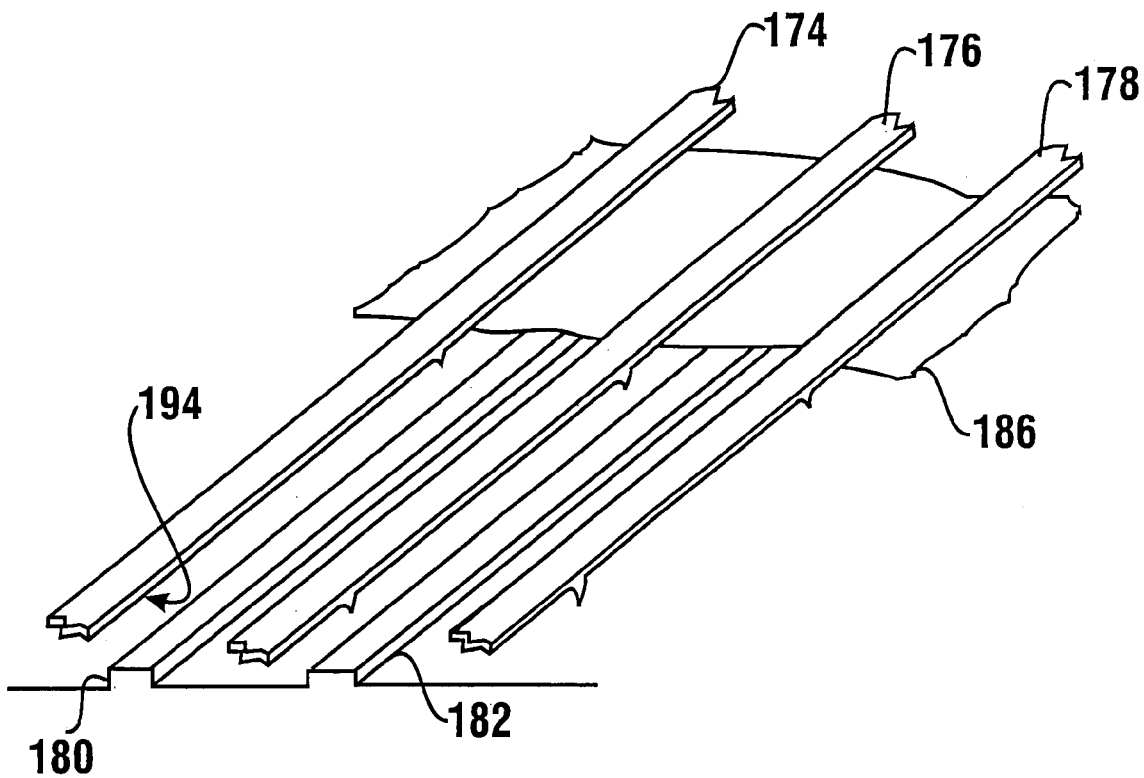
FIG. 13 is an isometric view of a sheet transport including belt flights of the type shown in FIG. 11 operating to move a sheet through the transport.

As can be appreciated from FIGS. 12 and 13, the configuration of the first belt flights and the sheet engaging member portion is such that a sheet that is moved into intermediate relation between the first sheet engaging surface of the belt flights and the second sheet engaging surfaces of the projection member portions, is deformed in a wavelike configuration so that the sheet is engaged with the belt flights. As a result when the belt flights move, the sheet 186 moves in engagement therewith.

As can be appreciated from FIG. 14, the sheet transport 54 is enabled to accept sheets such as a sheet 190 through openings such as opening 192. As can be appreciated, from FIG. 14, a sheet passing through the opening in the projecting member portions moves in engagement with the first belt flights to become trapped in sandwiched relation between the belt flights and the projecting member portions. The sheet once trapped in this manner is caused to be moved along with the belt flights to a desired location within the machine responsive to signals from the controller.

As mentioned previously, occasionally sheets such as bank notes become stuck in transports of this type. This may result due to various conditions which prevent the notes from moving in coordinated relation with the belt flights. In the exemplary embodiment of the present invention, conventional type belts which have in the past been used in transports of this type are replaced with alternative belts which reduce the risk that sheets will become stuck. Specifically while prior belts have a generally smooth continuous sheet engaging surface, the alternative belts used in the exemplary form of the present invention include at least one longitudinally spaced projection which extends in the first facing direction from the sheet engaging surface of the belt. In a more preferred exemplary form of the present invention such longitudinally spaced projections extend at spaced intervals on the first sheet engaging surface of the belt. The presence of such longitudinally spaced extending projections engage sheets that might otherwise not move in the transport and move them to the desired location.

Figure 11:
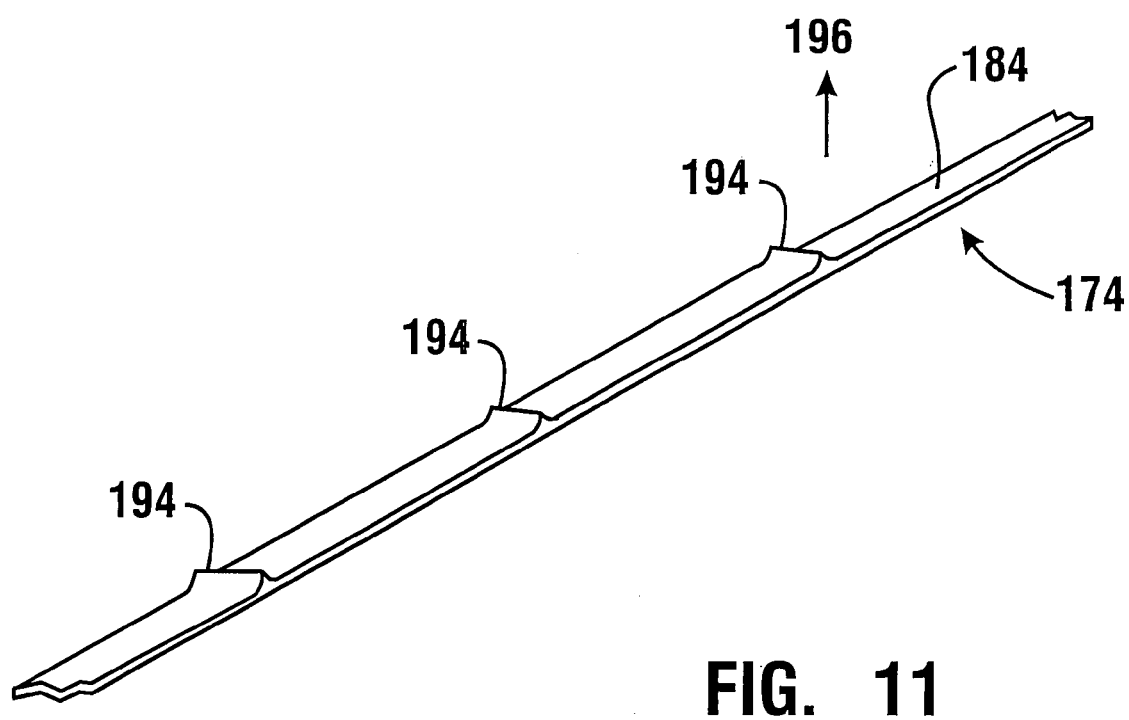
FIG. 11 is an isometric view of a portion of a belt flight including longitudinally spaced projections thereon.

FIG. 11 shows an isometric view of belt flight 174 with the first sheet engaging surface 184 thereof turned 180 degrees from that shown in FIG. 13. The first sheet engaging surface 184 includes a plurality of longitudinally spaced projections 194. The projections 194 extend generally in the first facing direction represented by arrow 196. In the exemplary form of the invention, the projections 194 are deformable, resilient and spaced from one another a distance that is greater than the length of the sheets that are moved through the associated transport in the longitudinal direction. This enables a sheet to extend between the adjacent longitudinally spaced projections. It should be understood however that other embodiments of the invention may have projections with other properties and the projections spaced more closely together. Other alternative embodiments of the invention may have the projections spaced far apart, even to the extent of including only one such projection on the continuous sheet engaging surface of a belt.

In embodiments of the invention all of the belts used in connection with a transport may include projections thereon. However in some embodiments it may be desirable only to replace certain belts with alternate belts including such projections. For example in the transport including three belt flights shown in FIG. 13, it may be desirable only to replace the middle belt with an alternate belt. Alternatively it may be desirable to replace the two outward belts with an alternate belt, leaving the middle belt as having a generally smooth continuous outer surface. Various approaches to replacing the belts may be taken depending on the particular type of documents being transported.

As shown in FIG. 13 embodiments of the invention may have multiple belts arranged such that the projections that extend from the first sheet engaging surfaces of the belts are generally transversely aligned. In this way each of the longitudinally spaced projections will maintain generally the same spaced relation relative to the other projections as the belts are moved from the transport. Alternate embodiments of the invention may have the belts installed such that there is no predetermined relationship between the projections on each respective adjacent belt. In each situation benefit is obtained as the projections facilitate movement of sheets in the transport.

Figure 15:
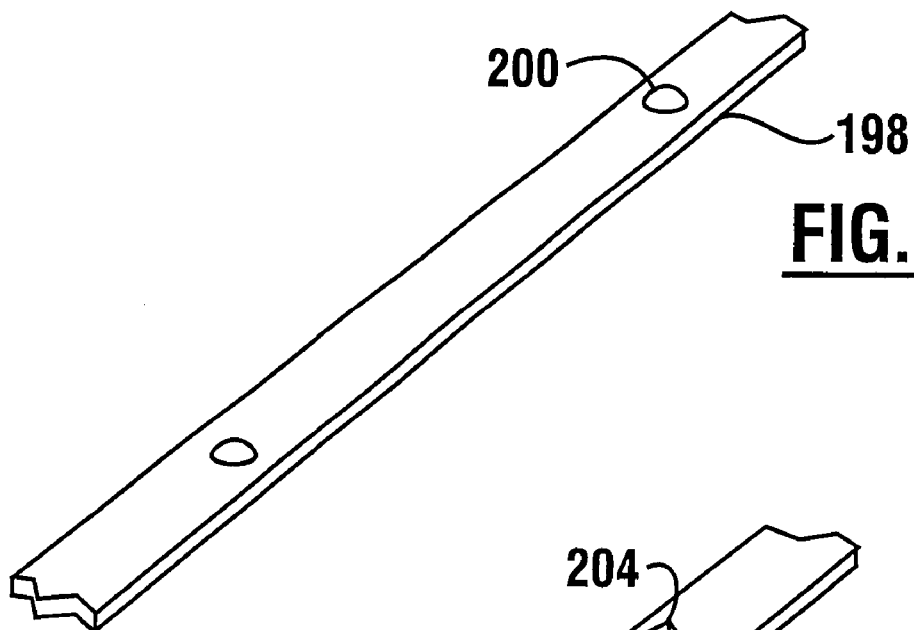
FIGS. 15–17 show alternative exemplary forms of projections positioned on belt flights which may be used in connection with sheet transports including the improvement of the present invention.
Figure 16:
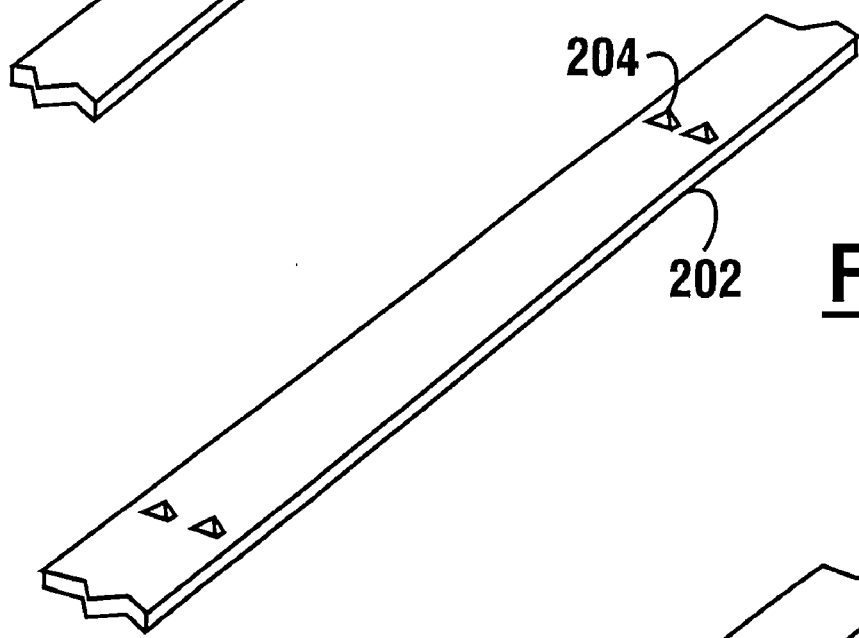
Figure 17:
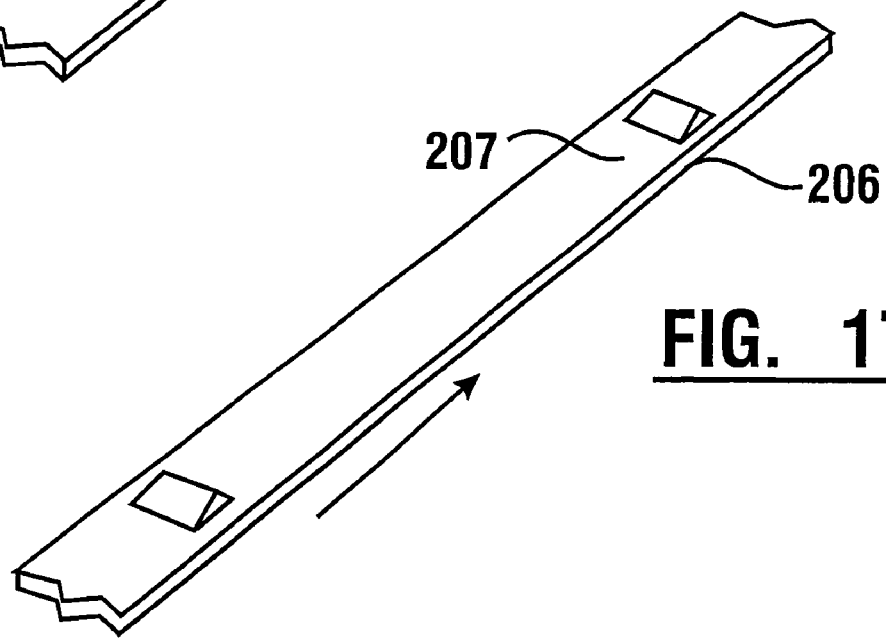

It should be understood that the configuration of belt flight 174 with the longitudinally spaced projections which extend across the first sheet engaging surface of the belt is exemplary. In other embodiments of the invention other types of projection configurations may be used. For example, FIG. 15 shows a belt flight 198. Belt flight 198 includes bubble type projections 200. FIG. 16 shows a further alternate belt flight 202 which has adjacent cone-like projections 204. FIG. 17 shows yet a further alternate belt flight 206. Belt flight 206 includes ramp-like projections 207. It should be understood that these belt and projection configurations are exemplary and in other embodiments other configurations may be used.

The exemplary form of the transport improvements of the present invention is designed for use in connection with existing transports which move sheets such as bank notes in an automated banking machine. Belts which include the improvement are made to extend about existing sets of rollers within the machines and to replace existing transport belts which have generally smooth continuous sheet engaging surfaces about the entire periphery thereof. To improve the performance of the transports in such machines, a service person must open the housing of the machine such as by unlocking and opening a door of a secure chest. The service person is then enabled to remove the existing transport belt from a set of rollers which support and move such belt. With the prior belt removed from the transport, an alternative belt of one of the types described herein including longitudinally spaced projections is installed in supporting connection with the set of rollers. The service person may then close and lock the door of the secure chest of the ATM. Sheets may be then moved in the transport urged not only by the relatively smooth portions of the sheet engaging surface of the belt, but further urged to move by engagement with the projections thereon. As can be appreciated, the projections on the belts provide additional urging force that is generally sufficient to move sheets that otherwise might slip or become stuck in a transport.

It should be appreciated that in the exemplary embodiment, the alternate belts described may be used in connection with transport 54 as well as transport 60. The principles of the invention may also be applied to other devices which move sheets within the machine. For example belts which include longitudinally spaced projections of the type described herein may be used in connection with a system for moving stacks of sheets such as is shown in U.S. Pat. No. 5,507,481, the disclosure of which is incorporated herein by reference. In such transports the projecting member portions comprise moving belt flights which move in coordinated relation with the facing belt flights and serve to transport stacks in between. Alternative belts including projecting portions thereon may be used to move stacks of sheets that are in between and enable movement of such stacks more reliably. As is explained in the incorporated disclosure, such transports in which the projecting member portions comprise moving belt flights enable reliably moving stacks of notes or connected sheets such as passbooks and checkbooks within an automated banking machine.

The principles of the present invention may also be applied to other types of stack and sheet transports including for example, stack accumulation and presentation mechanisms such as is found in U.S. Pat. No. 5,435,542, the disclosure of which is also incorporated herein by reference. Of course the principles of the invention may be applied to other transport mechanisms as well. It should be understood that the improved sheet dispensing functions achieved through utilization of the principles of the present invention may be incorporated in automated banking machines with the improved transport features to achieve improved reliability in moving and delivering sheets within the automated banking machine. Of course it should also be understood that in some embodiments the improved picking capabilities will be implemented without the improved transport capabilities and vice versa. The principles of the invention may also be applied to other configurations of picking members and devices as well as sheet transports.

In an exemplary embodiment, cassettes or canisters can be labeled to identify and indicate the content of media therein. For example, a multi-media canister may use a mechanical button arrangement to represent items of data relating to the canister and its content. The use and operation of information indication buttons for a canister is described in detail in the disclosure of U.S. Pat. No. 4,871,085, which has been incorporated herein by reference. A button (or movable cassette information indicator member) arrangement may be reflective of cassette ownership, cassette serial number, and media description (e.g., denomination code, height, thickness). A button arrangement can be read by the automated banking machine via a media dispenser. The buttons can contact an electrical switch actuator of a dispenser component. In an exemplary embodiment, button contact surfaces can include gold plating.

However, the changing of an information indication button arrangement may require the cassette or canister to be opened in order for service personnel to access the buttons. Additionally, certain button arrangements may require that some button holes remain empty of buttons. Thus, the possibility of losing unused removed buttons during handling exists. What is needed is a cassette that enables unused buttons to remain therewith and that permits a button arrangement to be changed without requiring opening of the cassette.

Figure 18:
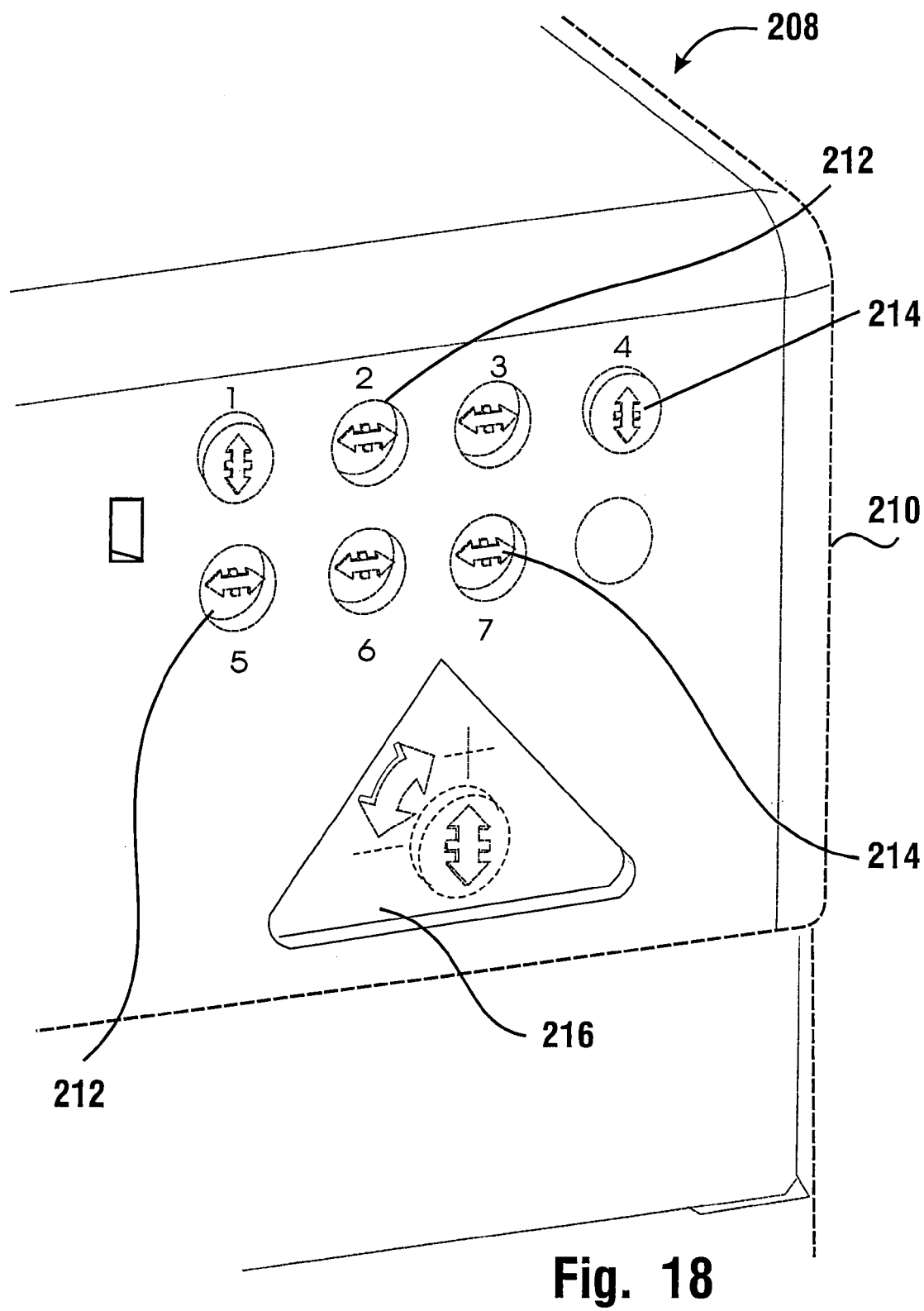
FIG. 18 shows a media cassette arrangement including indicator buttons.

FIG. 18 shows a portion of a media cassette 208. The cassette includes a housing 210, button holes 212, and buttons 214. The buttons can have an outward end or head. The buttons can be elongated and have an axis. The position of the buttons can be changed (or adjusted or reconfigured) to correspondingly change (or alter) the cassette information that is represented by the position of the buttons. The buttons can be axially moved (e.g., repositioned) outward and inward relative to the cassette housing (or outer surface of the cassette) by rotation thereof. For example, a button may be rotated counterclockwise approximately 90 degrees to move the button head from an inward location or position (e.g., recessed or retracted inward from the housing outer surface) to an outward location or position (e.g., extended outward from the housing outer surface). Of course, distances or angles less than or greater than 90 degrees may be used. An outwardly positioned button can be read or sensed by the machine. When a button is in an inward position, the button head may be flush with a cassette outer surface or inward of the outer surface. An ATM may be arranged such that an inwardly positioned button cannot be read (or detected or sensed) by the machine, whereas an outwardly positioned button can be read.

A button may be similar to a screw. A button may have threads which permit its movement relative to the cassette housing. A button head may have a groove or slot arrangement which is adapted to receive the end of a conventional rotation device, such as a screw driver. Alternatively, a button head may have a unique groove or protrusion arrangement which requires a special tool to engage and move the button. Thus, for reasons of security, only authorized personnel may have access to the special tool.

A button head may be accessed from outside of the cassette. That is, authorized service personnel may access the buttons without first opening the cassette. Thus, a cassette need not be opened to change or modify a button arrangement. For example, a cassette fully loaded with currency need not have the currency removed in order to rearrange buttons.

A button can be operatively engaged to a cassette to remain therewith. The end of a button opposite the button head may be removably fixed to the cassette. For example, the end may have a securing device, such as a pin or flange or tab, to prevent removal of the button by outward movement. Thus, a button may have a fixed or predetermined limit to its outward extent. Likewise, a button may also have limited movement in its inward direction. A button may be removably attached to a cassette while the cassette lid is open. That is, the securement of a button to the cassette may be of such an arrangement that the button may not be removed or disengaged from a cassette without first opening the cassette.

The cassette housing 210 may have a symbol 216 (or emblem or label or indicia) thereon representative or indicative of open and closed button positions. As shown, the symbol 216 includes a representation of a button head. The symbol indicates, via an arrow, which way to turn or rotate a button to move it between a closed position and an open position. The symbol also shows that a button head arrow in the vertical or upward direction is indicative of the positive (+) or outward button position. Likewise, the symbol shows that a button head arrow in the horizontal or sideways direction is indicative of the negative (−) or inward button position. Thus, a button moved so that its arrow is in the vertical position is "on" and can be detected or read by the machine. Likewise, a button moved so that its arrow is in the horizontal position is "off" and cannot be detected by the machine.

FIG. 18 shows eight button holes and seven buttons. Seven of the button holes are labeled with indicia 1–7. Two buttons (at holes 1 and 4) are in an "on" (extended) position and five buttons (at holes 2–3 and 5–7) in an "off" (retracted) position. Of course greater or fewer button holes and buttons may be used. The empty button hole can be used for other purposes, such as to indicate a low media condition.

Figure 19:
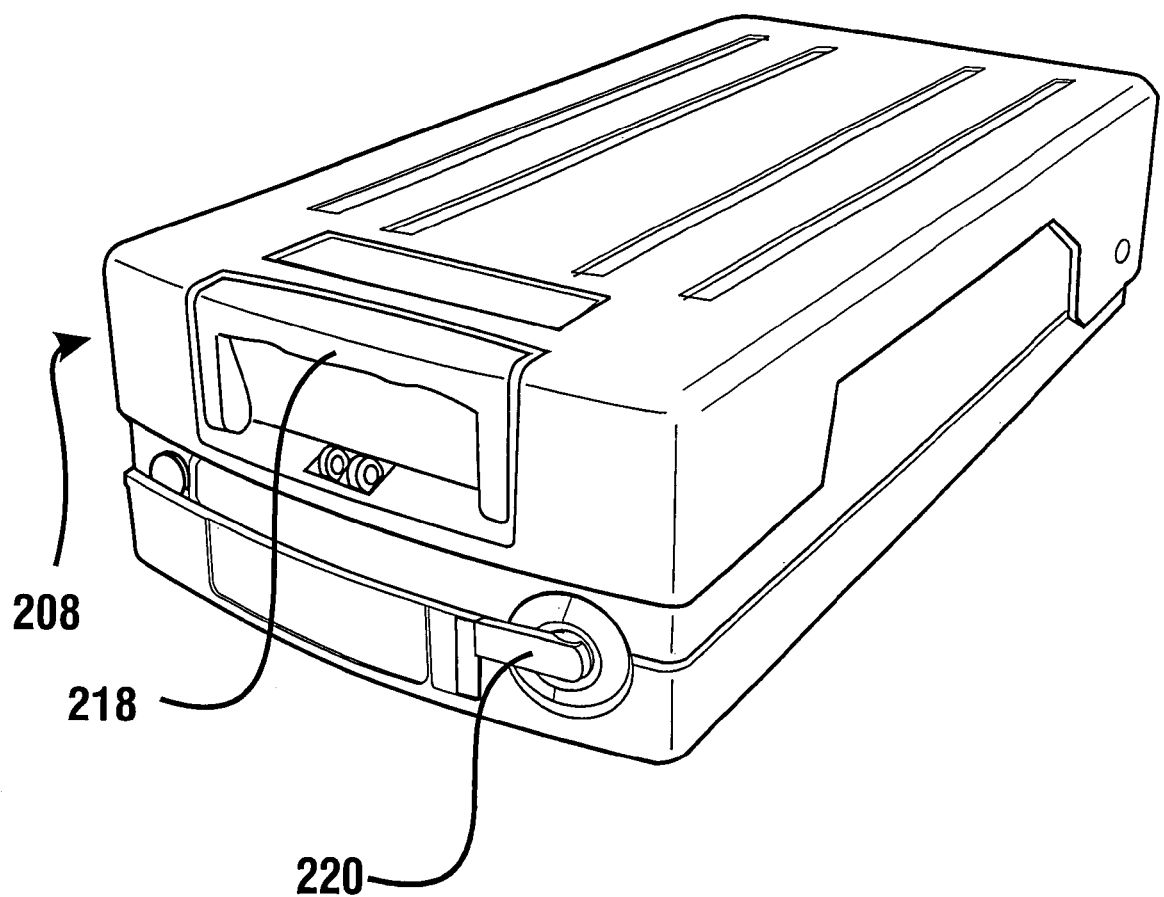
FIG. 19 shows a front angled view of the cassette housing of FIG. 18.
Figure 20:
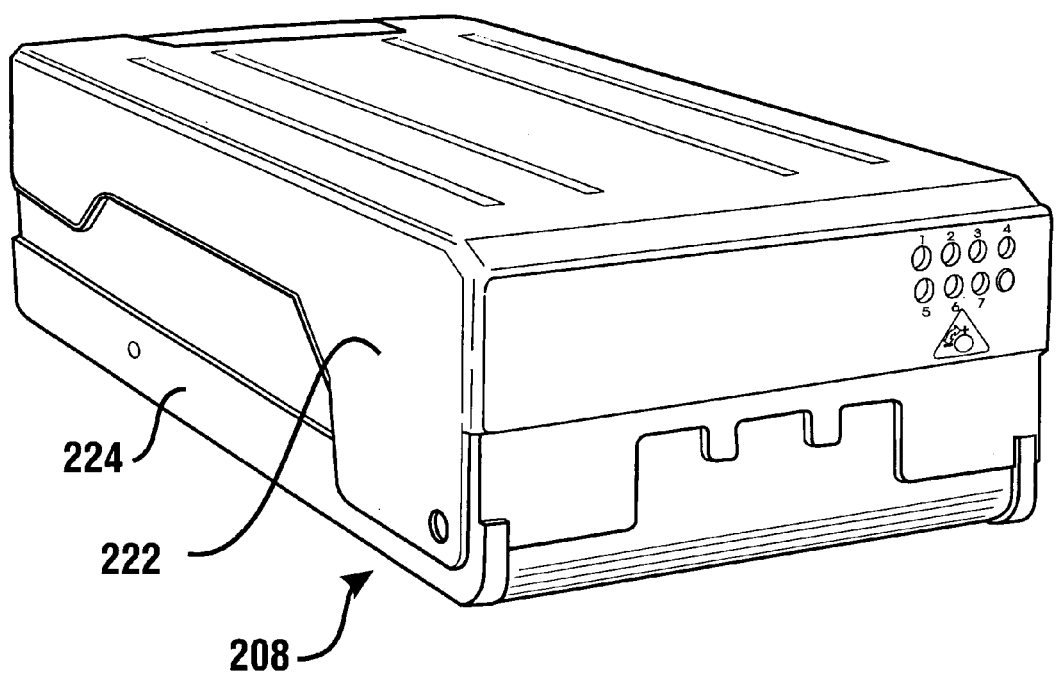
FIG. 20 shows a rear angled view of the cassette housing of FIG. 18.

FIGS. 19 and 20 show respective front and rear angled views of the cassette housing of FIG. 18. FIG. 19 also shows a cassette handle 218 and a cassette lever 220. FIG. 20 also shows a cassette lid 222 and base 224. Service personnel may carry the cassette via the handle. The lever may be used in opening the cassette.

Figure 21:
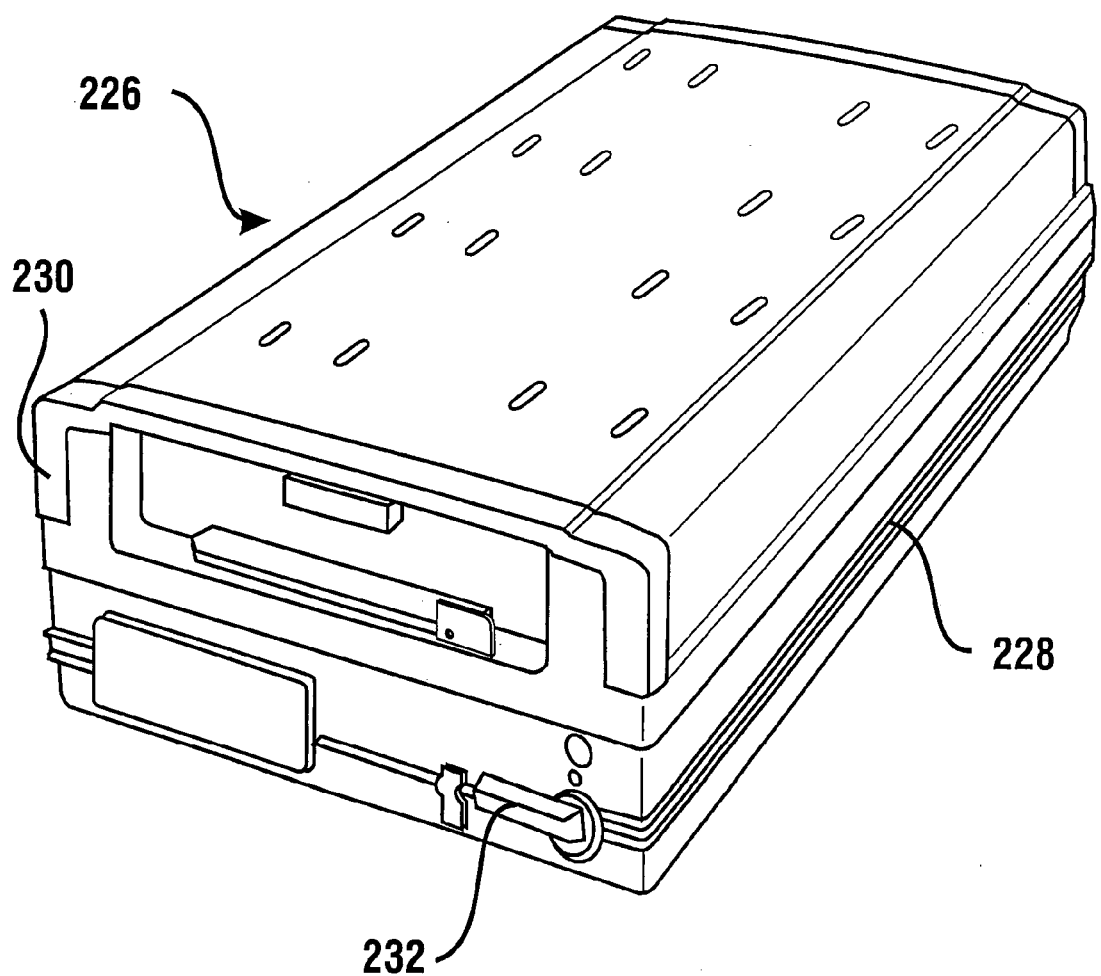
FIG. 21 shows a front view of an alternative cassette housing.
Figure 22:
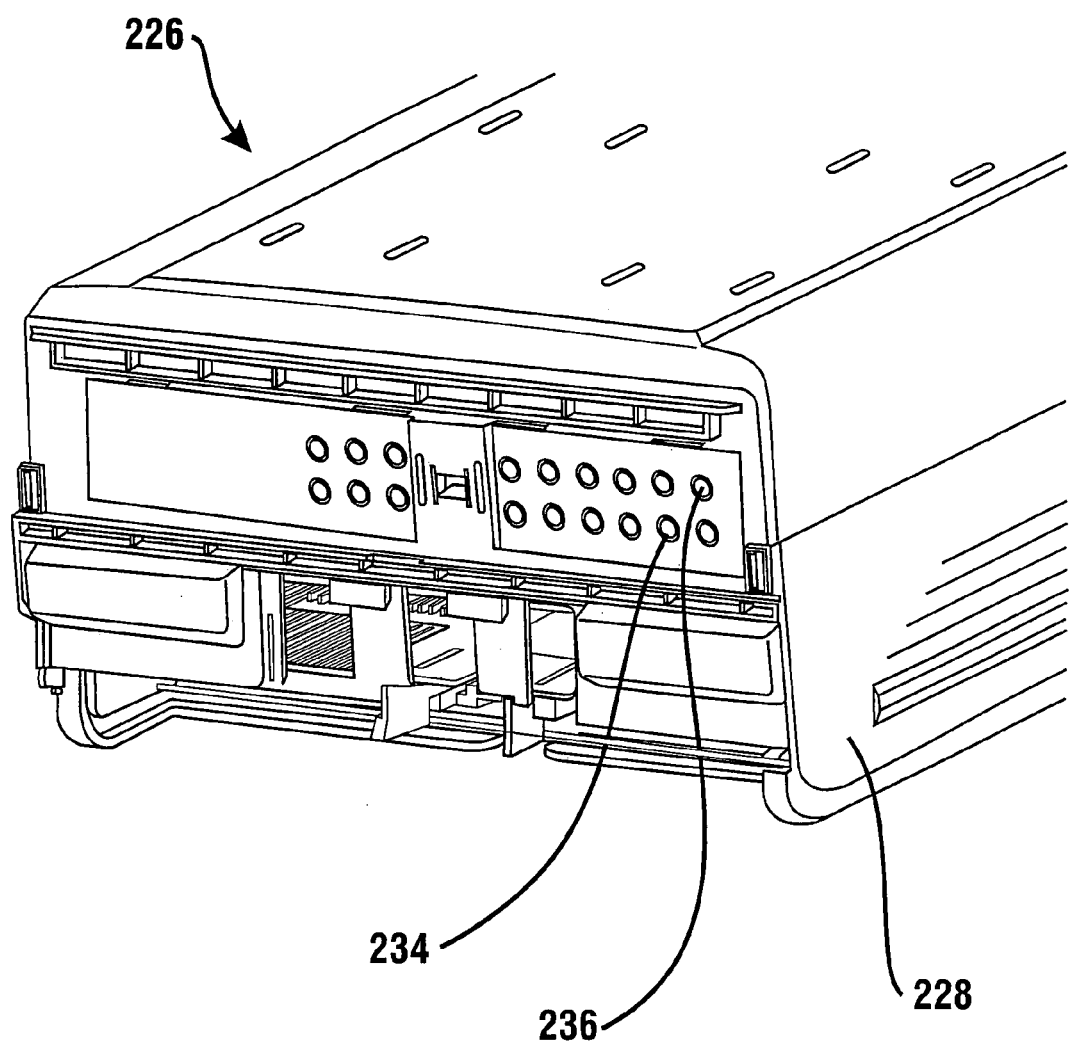
FIG. 22 shows a rear view of the cassette housing of FIG. 21.

FIGS. 21 and 22 show respective front and rear views of an alternative cassette 226. FIG. 21 also shows a cassette housing 228, handle 230, and a lever 232. FIG. 22 shows the cassette housing 228 having a configuration of eighteen button holes 234. The button holes may have indicia adjacent thereto to represent their usage. For example, a button hole 236 to be used by a media low indicator may be labeled "ML", which can be representative of "media low." Other configurations and labels may be used. For example, a media cassette may have twenty-eight button holes which can be equivalent to 28 bits. A cassette may also use buttons to indicate the presence of a cassette, a cassette latched condition, and/or a media (e.g., money) low condition to an automated banking machine.

As discussed in incorporated U.S. Pat. No. 4,871,085, a low currency condition in a cassette can be indicated or signaled by using an indication contact button. However, sometimes too large an amount of surplus currency is often remaining in a cassette when a low currency condition is indicated. In certain situations it would be more efficient to be able to dispense more of the cassette currency before a service call is required. Thus, an ability to adjust what constitutes a media-low condition in a cassette would be beneficial. An exemplary embodiment permits such adjustment, refinement, or fine tuning of a media-low indicator arrangement.

Figure 23:
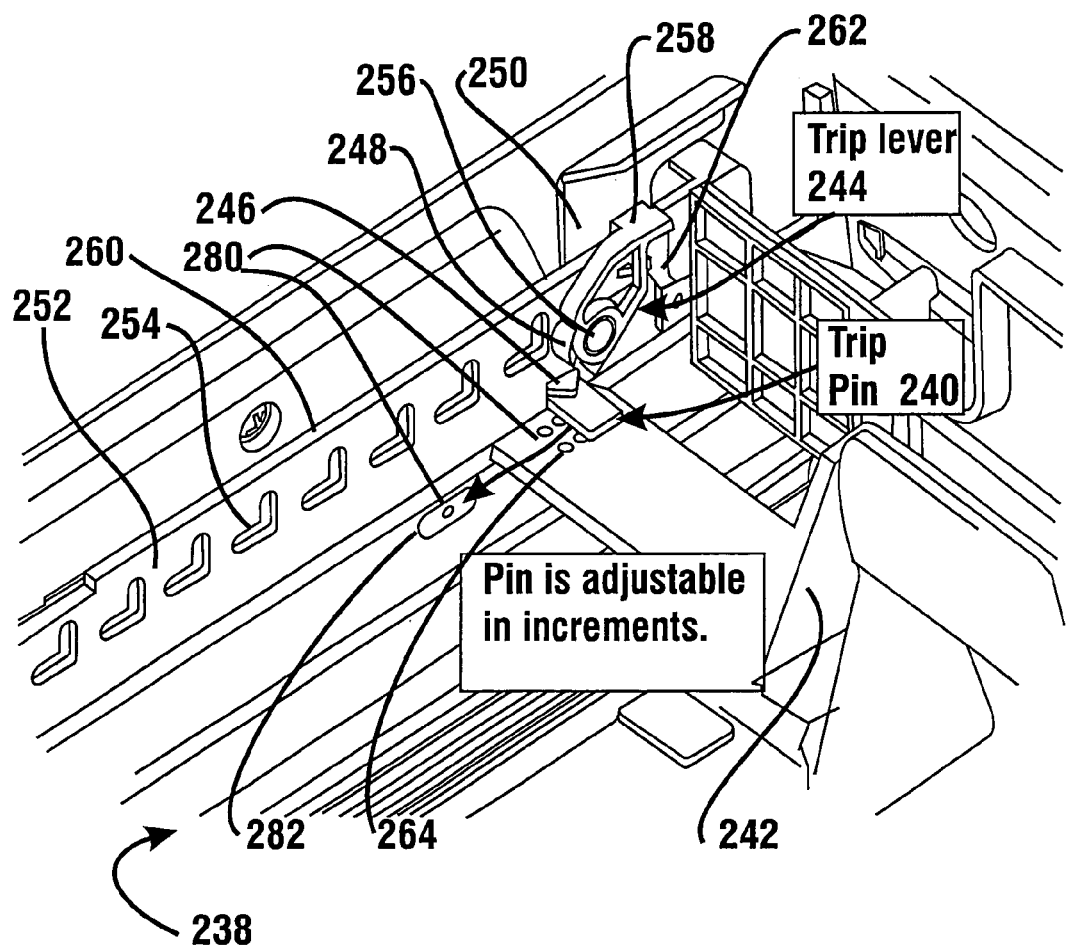
FIG. 23 shows a low media indicator arrangement for a cassette.

FIG. 23 shows a low media indicator arrangement 238 for a cassette. A pin 240 movable with (e.g., located on or attached to) a push plate body 242 is operative to trip a lever 244 in triggering a low media condition. The push plate body can be biased (e.g., spring biased) to push (or provide a force on) media toward a media exit portion of the cassette. The trip pin is operative to cause actuation of a media-condition (e.g., media low) indicator device (e.g., indicator button or indicator button mechanism) responsive to media attaining a predetermined media state in the cassette. The trip pin may have a head 246 which can abut or engage a trip lever head 248 to move the trip lever generally parallel to the movement of the push plate (e.g., in a horizontal direction). The heads may be angled cams. The trip lever may be moved to drive a media-low actuator (or actuator arm) 250. A spring-loaded actuator arm may be used.

A low media actuator may include an indicating contact button, although other devices may also be used to indicate a low media condition to an automated banking machine. For example, a lever (or actuator arm) may be arranged such that movement thereof may be directly detected or sensed by a machine component to indicate a low media condition, without (or in addition to) the use of an indicator button. Still, other indicating relationships and arrangements may be used.

A cassette wall portion 252 can include a plurality of slots 254 (or openings). A trip lever 244 can be operatively attached to an actuator arm 250 via a connector 256 (e.g., pin or screw or bolt) extending through a slot 254. That is, the trip lever and the actuator arm may be connected with the wall therebetween or intermediate thereof (e.g., the trip lever on one side of the wall and the actuator arm on the opposite side of the wall). The connector 256 is operative to slide along a slot 254.

A trip lever 244 (or latch or arm) can move in both a pivoting (e.g., rotational) direction and a lateral direction (i.e., the direction generally parallel to the movement of the push plate). The trip lever is operative to pivot about an axis of the connector. The trip lever can include a stop (or ledge or flange) 258. The stop 258 is operative to engage a step (or shelf) 260 of the cassette wall 252. The engagement is operative to prevent the trip lever from rotating downward past the step. The trip lever can also be weighted in a laterally downstream portion 262 thereof.

As media is depleted, the push plate moves the trip pin. The trip pin head can eventually contact the trip lever head. With additional push plate movement the trip lever is pushed by the trip pin in the lateral direction. That is, the force due to the weighted portion of the lever can prevent rotation of the lever while the lever has the ability to slide in the slot. The trip lever can be pushed laterally until the connector reaches the downstream end of the slot (e.g., the end of the slot nearest an indicator button hole). With the connector positioned against the end of the slot the actuator arm is extended in its media-low position (e.g., a position which can cause an indicator button to extend from a button hole).

With the connector positioned against the end of the slot, further push plate movement can cause the trip lever to overcome the force due the weighted portion and begin to pivot. The trip lever can pivot a distance such that trip pin head can eventually slide past the trip lever head. Without any trip pin force acting on the trip lever the weighted portion can cause the trip lever to pivot in the opposite direction until the stop again engages the step.

The trip pin 240 (e.g., abutting device or tripping device) can be an adjustable trip pin. The pin can be rearranged or repositioned on a push plate. The embodiment of FIG. 23 provides for a trip pin to have three different trip settings. Of course other arrangements may have greater or fewer settings. In an exemplary embodiment, an adjustable pin can be arranged to fine tune a low media condition to range levels in millimeters. For example, a trip pin may be adjustable in 2 mm increments. Of course larger or smaller length increments are within the scope of the exemplary embodiment.

A trip pin (or member) may be removably securable to a push plate (or device) at various positions longitudinally spaced along the push plate (or push device) in a direction generally parallel to the movement of cassette media. A trip pin 240 can be removably attached to a push plate portion 242. For example, the connection may include a snap fit type of connection or a tongue and groove type of connection. That is, a trip pin may have a plural projections which are adapted to fit into or mate with respective recesses of a push plate portion. FIG. 23 shows recesses 264. A connection arrangement may have plural spaced or disposed connection areas. For example, a connection arrangement may have pairs of connectors. A connection may be similar to a LEGO® block type of connection. Other manners of attachment, connection, or fastening may also be used.

Alternatively, a trip pin may be slidably secured to a push plate body. The push plate body could have one or more slots. The slots could extend in the push plate in the (longitudinal) direction of media (and push plate) movement. The trip pin could be operative to slide along the slots. The trip pin may have a (lower) flange at one end to retain securement to the push plate body. The trip pin could be fixed or secured at a specific position along the slots. A securing (or locking) device could be used to secure the trip pin at a specific position. Hence, a trip pin could be secured to the push plate body (or member operatively connected thereto) at a first slot position and then later securely repositioned at a second slot position. The trip pin arranged at the first position (or first setting) could be operative to cause actuation (e.g., trip) of an indicator device prior to having the trip pin arranged at the second position (or second setting). That is, a trip pin at one setting can cause (or trigger) a cassette media-low indicator to be actuated (or operated or set into action) at a first predetermined currency volume level condition (or state), whereas the trip pin at a different setting can cause the same cassette indicator to be actuated at a different predetermined currency volume level condition. Thus, the actuation of a media-low indicator at a corresponding predetermined media-low state can be arranged by positioning the trip pin to trip the indicator when the media reaches the predetermined media-low state. Actuation of a media-low indicator can be directly responsive to the trip pin setting.

Alternatively, a trip pin may be rotatably secured to a push plate body. For example, a trip pin may be turnable like a dial or knob. For example, a trip pin may be rotated to one of four different settings. A trip pin may have different sized heads. Each head could be rotated into position engage a trip lever to reflect different media-low levels. Each respective head could be used to trip the same media-low indicator at respective different times. In certain embodiments a trip pin head may be rotatable while the cassette is in an ATM. Thus, trip settings could be automatically changed by the ATM to vary trips settings of a particular cassette. For example, a cassette may carry two different types of media with one media using a first trip pin head and the other media a second trip pin head. Also, a single trip pin head may itself be rotatable. The head could have plural different sized lever engagement points thereon. For example, the head may have four engagement points spaced at 90 degrees. Thus, the trip pin head may be rotated to determine a particular media-low setting.

Alternatively, a push plate may have plural trip pins fixedly attached thereto or integral therewith (e.g., of one-piece therewith). That is, the pins may remain with the push plate (i.e., instead of being removed therefrom). In an embodiment the pins can be recessed or hidden in or below a push plate, and then elevated, extended, or revealed during usage thereof. For example, a pin may be spring biased toward an extended operating position. When the recessed pin is moved perpendicular to and outward from push plate movement it can pop up (e.g., be biased upward in a pivoting direction) into an operating position. After use, the pin can be lowered (e.g., moved against the spring into a position parallel with the push plate surface) and then pushed back into the push plate.

Furthermore, trip pins may be of different sizes or dimensions. For example, trip pins may have lever-engaging heads of different lengths. Thus, a first trip pin having a head of a first length may be attached to a push plate (or some other component which is movable as a paper stack lessens in length). The first trip pin may be attached to the push plate by using a first groove (or slot) pattern arrangement. The first trip pin may be replaced by a second trip pin having a head of longer length. The second trip pin may be attached to the push plate using the same groove pattern (connection) arrangement that was used by the first trip pin. Thus, a low media volume (or length of currency stack) condition would be indicated sooner using the second trip pin than with the first trip pin. That is, the longer head portion of the second trip pin would trip the trip lever before the shorter head portion of the first trip pin.

It should be understood that combinations of (a) adjusting where a trip pin is attached to a push plate, and (b) adjusting trip pin head sizes may be used. Such combinations can further provide fine tuning of low media (or empty media) conditions.

An adjustable trip pin may be set at a particular trip position based on the thickness of the particular currency which is to be loaded in the cassette. For example, a cassette may need a longer stack of thicker (e.g., worn or older) notes in order to have the same number of notes as in a smaller stack of thinner (e.g., new) notes. The thickness of currencies may also vary among nations. Hence, a pin may be arranged to trip earlier for thicker notes and later for thinner notes.

Additionally, it may be beneficial to replenish an ATM cassette (or cassettes) prior to losing the ability to dispense a specific denomination of currency (or the ability to dispense any currency). An adjustable trip pin may be set at a particular trip position based on cassette service response time ability. For example, a first ATM located at a bank building (having bank employees) may have a faster service response time than a second ATM situated at a remote location which is distant from service personnel. That is, a bank employee who works in the bank building (and is notified of a low currency condition) may be able to quickly replenish a currency cassette in the first ATM without leaving the bank, whereas a longer length of time may be needed for an entity to replenish the second ATM. The servicing of the second ATM may require lengthy travel time. Of course other service response time scenarios may occur, such as having an ATM located near an ATM maintenance and/or service center.

Thus, where a relatively longer response time is needed, an adjustable trip pin may be set so that it trips a low condition lever relatively early (e.g., a relatively large portion of a currency stack remains in the cassette at trip time). Contrarily, where a relatively shorter response time is needed, an adjustable pin may be set so that it trips a low condition lever relatively late (e.g., a relatively small portion of a currency stack remains in the cassette at trip time).

In other situations service personnel may only want to know if a cassette has been emptied of its contents. For example, a cassette may have been pre-loaded with media such as coupons. The coupon promoter may have set a specific limit on the number of coupons to be dispensed. Hence, once the cassette is empty it is not to be reloaded with any more of the coupons. Thus, an adjustable trip pin may be set so as to be able to indicate an empty cassette condition.

In alternative embodiments a trip lever can be adjustable. That is, a trip lever may be removed and relocated to a different cassette wall slot. Levers of different sizes and lengths may also be used. Combinations of adjustable and interchangeable trip pins and trip levers can further provide fine tuning of low media (or empty media) conditions. For example, a trip pin and a trip lever can be arranged to accurately indicate a fully empty cassette condition.

Furthermore, a sequence of trip indicators using one or more trip levers may be used. Thus, a machine and/or service personnel may be able to receive numerous notices concerning the indicated level of media remaining in a particular cassette. Each subsequent notice can be reflective of a lesser amount of media remaining in a cassette. For example, a trip pin may pivot a first trip lever to cause a signaling of a first media low condition (which may correspond to the number of notes or the value of notes remaining in the cassette). The first trip lever may be allowed to pivot to permit the trip pin to slide there beyond toward the next (second) trip lever in the sequence. The trip pin may then proceed onward toward the second lever to cause its tripping (i.e., the second tripping in the sequence). Additionally, the slots in a cassette wall may have spacing therebetween of different lengths. That is, the space between two adjacent slots may be greater than the space between two other adjacent slots. Other arrangements may use slots of varying lengths for use with different sized trip levers. That is, a slot may have a greater length than an adjacent slot.

During rough handling or transport a cassette may be dropped or receive vehicle induced vibration. Thus, in certain situations a media-low indicator mechanism of a cassette may trip prematurely. Because of a premature trip, a fully loaded cassette may indicate that it needs replenishing. An exemplary embodiment prevents a media-low indicator mechanism from tripping prematurely. For example, a replenished media cassette can have its low media condition actuator system locked during transport to prevent false firings or trips. The locking arrangement of the exemplary embodiment can be used to reduce or prevent service calls due to false firings of media low mechanisms.

A spring loaded actuator arm can be moved to indicate a low media condition. For example, a previously discussed trip lever may be used to trip, fire, or release the actuator arm. An actuator arm may be used to extend an indicator button through a button hole. The actuator arm can be biased away from its indicating position.

Figure 24:
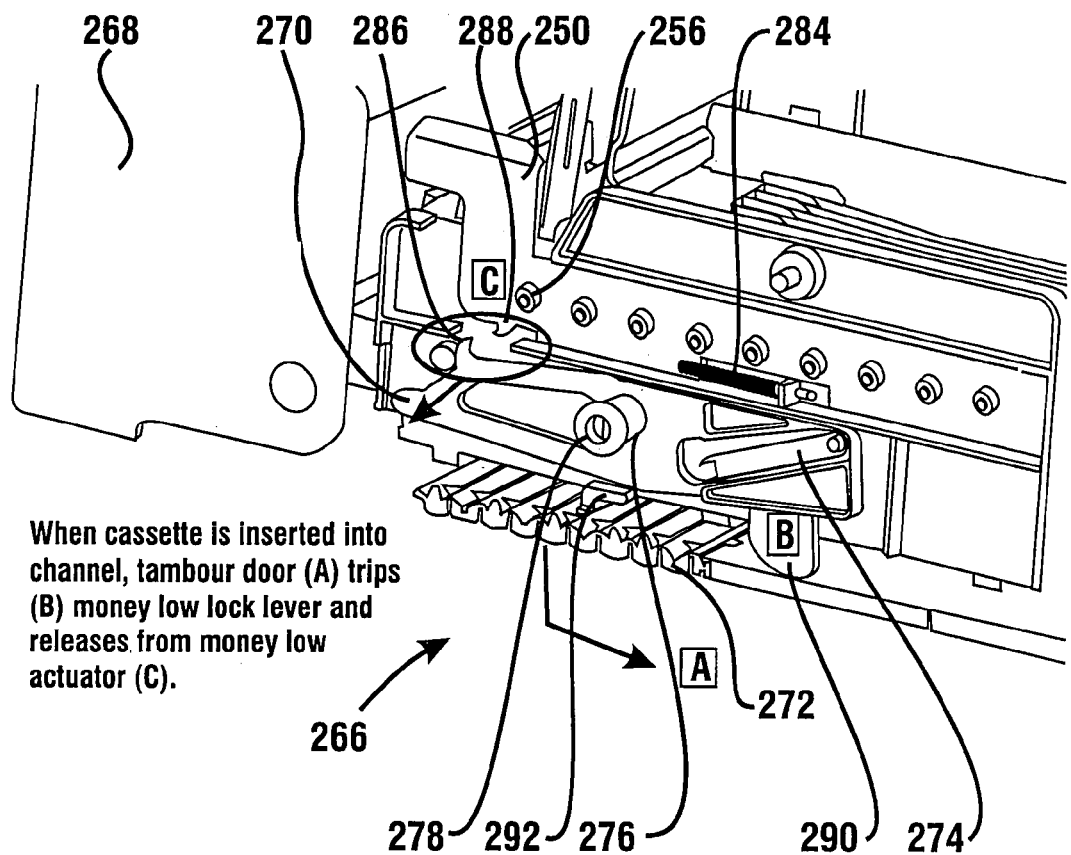
FIG. 24 shows a media low lockout arrangement in an unlocked position.
Figure 25:
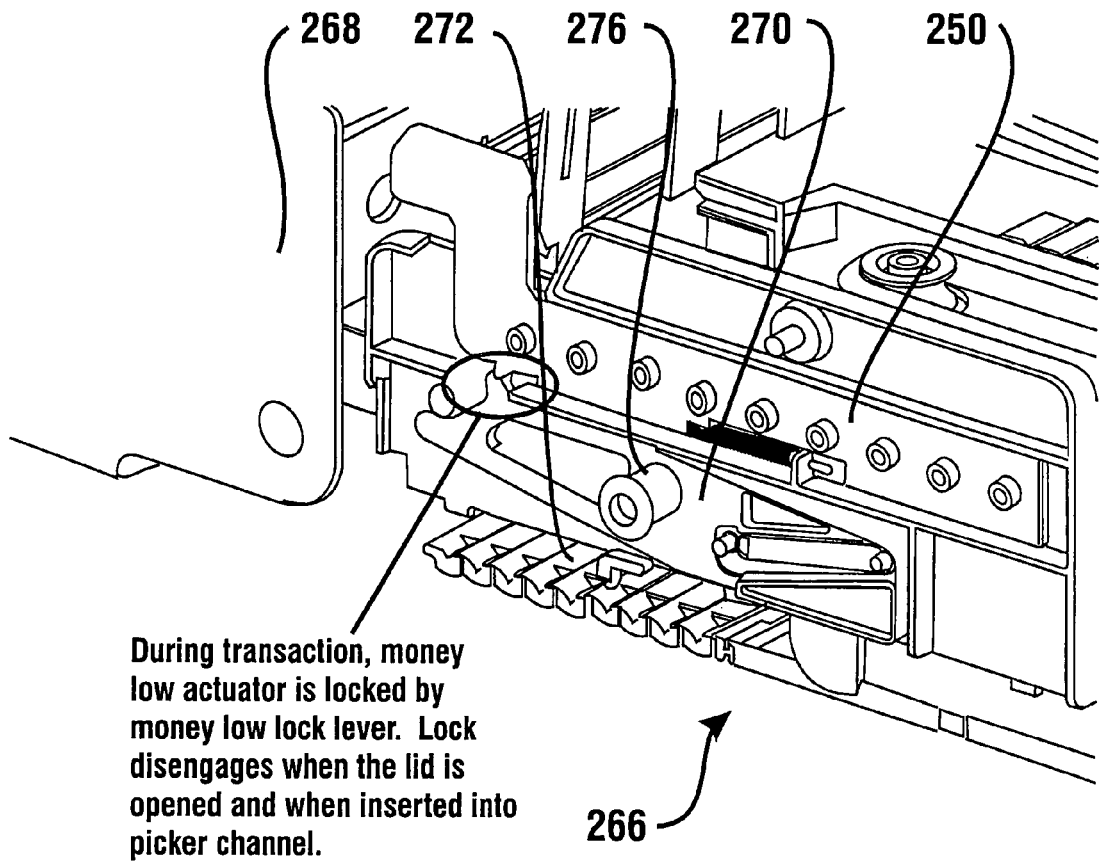
FIG. 25 shows a media low lockout arrangement in a locked position.
Figure 26:
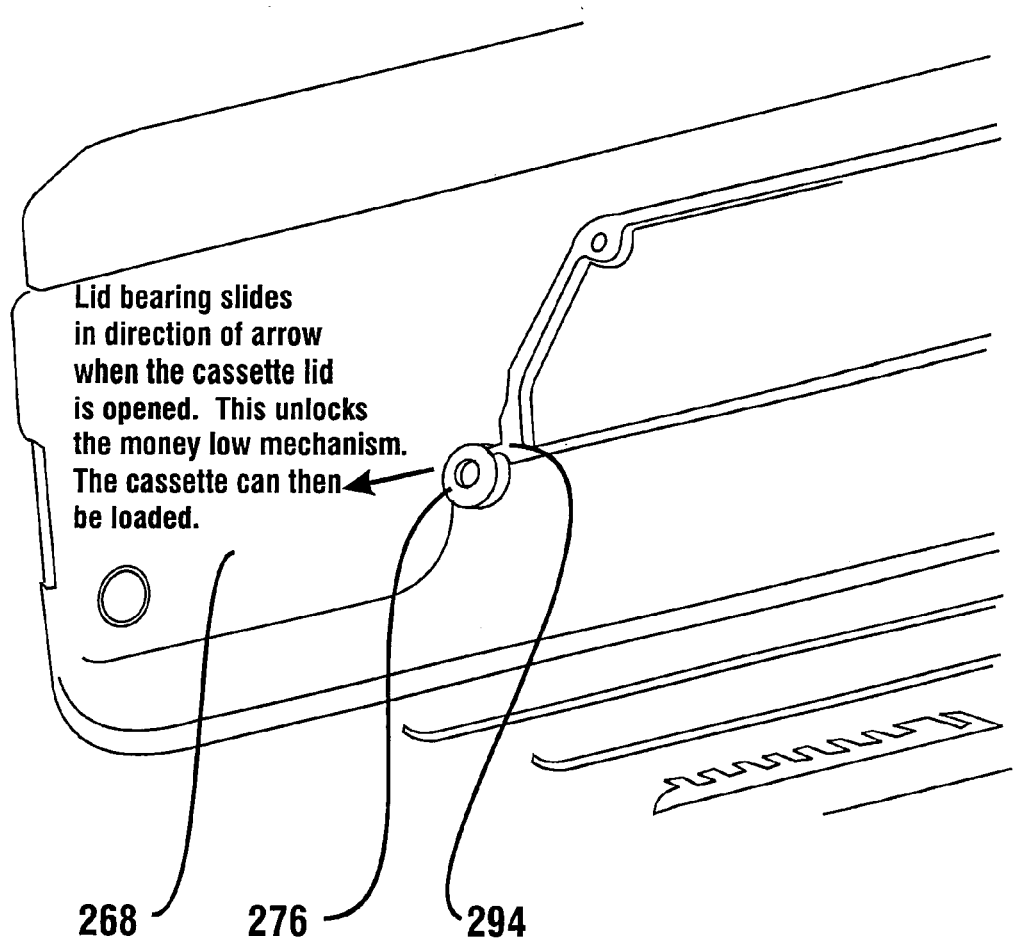
FIG. 26 shows a cassette with its lid closed.

FIG. 24 shows a cassette portion 266 in which a media low lockout arrangement is in an unlocked (or open) position. The cassette lid 268 is also shown as in an open position. FIG. 25 shows the cassette portion 266 in which the media low lockout arrangement is in a locked (or closed) position. FIG. 26 shows the cassette with the lid 268 closed. FIG. 24 also shows the cassette portion having a spring loaded media low actuator arm 250, media low lock lever 270, and a door 272 (e.g., a tambour door). The lock lever 270 can be spring loaded by a spring 274. The lock lever can be biased by the spring toward its unlocking position, as shown in FIG. 24. FIG. 24 shows the spring in its normal (or resting) biasing state. One end of the spring may be attached to the lock lever and the other end to a portion of the cassette.

The lock lever can be pivoted (or rotated) about a shaft 276 (or pin). The shaft may be flanged 278 at an end thereof to help hold the lock lever thereon. An opposite end 280 of the shaft can extend into (or through) a shaft slot 282 in a cassette wall portion 252, as shown in FIG. 23. The opposite end may also be flanged to maintain the shaft 276 in (or relative to) the shaft slot. The shaft is movable in the shaft slot. The shaft may be movable in a direction generally parallel to the direction of arrow A. As explained in more detail hereafter, the shaft may be moved by a portion of the cassette lid 268. The lid portion being able to bear against the shaft to cause movement thereof.

The actuator arm 250 can be biased by a spring 284 in the direction of arrow A. That is, the actuator arm can normally be biased to the right in FIG. 24. The actuator arm can be moved to the left in FIG. 24 to indicate a low media condition. The actuator arm 250 can generally be moved the length of a horizontal slot 254 in the cassette wall portion 252, as previously discussed with regard to FIG. 23.

The lock lever has an engagement portion 286 (projection or tab or finger) which is adapted to correspondingly engage an engagement portion 288 (projection or tab or finger) of the actuator arm in a locking relationship. That is, the lever finger 286, when in an upward locking position, can engage the actuator finger 288 to prevent movement of the actuator arm toward the left as shown in FIG. 25. The lever finger and the actuator finger can both have a backside angled cam surface. Should the lever be in a locking position with the lever finger behind the actuator finger, then the angled surfaces may assist movement of the actuator finger past the lever finger. That is, even though a lock lever may be in an upward locking position behind the actuator finger, the actuator arm may be able to slide there past, e.g., slide toward the right in FIG. 24.

The tambour door 272 may be opened in a recessing or retracting manner. For example, the door can be opened by moving in the direction of arrow A in FIG. 24. Opening of the door can permit a picker mechanism to be properly positioned to pick media from the cassette. The door can be automatically opened upon insertion of the cassette into a machine. Further operation of cassette doors is known and need not be discussed herein.

The lock lever 270 is operative to hold the actuator arm 250 in a locked position during cassette handling and transport. For example, the actuator arm may be locked during the time period following a cassette replenishing and prior to placing the replenished cassette in an automated banking machine. The actuator arm may also be locked during the time period between cassette removal from a machine and opening of the cassette lid.

When the cassette is inserted into a dispenser picker channel of an automated banking machine, the lock lever is operative to be automatically moved away from its holding (or locking) position. Upon movement of the lock lever, the lock lever engagement finger 286 is operative to disengage from the actuator arm engagement finger 288. Then, when a low media condition is reached, the actuator arm is free to be moved against the biasing force of its spring to assist in indicating a low media condition.

Locking and unlocking of the spring loaded actuator arm can be controlled by both the tambour door and by the cassette lid. The lock lever can be moved (or tripped) to an unlocking position by the tambour door. A fully loaded cassette having the actuator arm locked can be inserted into a machine. Upon insertion of the cassette into the machine the door can be opened. As the door is opened, it is operative to engage and move a flange 290 (or arm or portion or extension) of the locking lever 270. For example, the lock lever flange 290 may be moved by engagement with a latch 292 (or catch) on or associated with the tambour door 272. As the door is moved opened, the latch is operative to engage and move the locking lever flange 290. Alternatively, an end of the tambour door itself may be operative to engage and move the lock lever flange. Movement of the lock lever flange 290 (in the direction of arrow A) is operative to cause the lock lever 270 to pivot about the shaft 276. The pivoting action is operative to free (or release or unlock) the actuator arm from its locked condition. That is, the lock lever engagement finger 286 is operative to disengage from the actuator arm engagement finger 288. The open tambour door 272 is operative to maintain (or retain) the lock lever 270 in its unlocking position.

A cassette may need to be removed from an automated banking machine for several reasons, including replenishment. A cassette may be removed from a machine while an actuator arm is in an indicating position. Also, a low media condition may have been indicated, but before a replenishment service could be performed the cassette was emptied of media. Alternatively, a machine may be programmed to empty a cassette prior to replenishment.

Prior to removal of an empty cassette, a media pusher plate may have moved the trip pin past the last trip lever. Thus, the cassette actuator arm, due to action of its return spring, would have returned to its non-indicating position. Upon cassette removal, the tambour door is operative to move toward a closing position. With closing movement of the door the lock lever is no longer held by a door latch in an unlocking position. Thus, the lock lever, due to action of its spring, pivots back to a locking position and traps (or locks) the actuator arm in its non-indicating position. That is, a lock lever finger is operative to be moved to again lockingly engage an actuator arm finger. Hence, during cassette transport (or travel) from the machine to a replenishment work station the actuator arm can again be held in a locked (or secured) condition.

In another scenario a cassette may be removed from an automated banking machine with the actuator arm in an indicating position (e.g., with the actuator arm causing an indicating button to extend through a button hole). For example, the cassette may be removed subsequent to a low media indication but prior to the trip pin passing the trip lever. The cassette may still contain media (i.e., cassette not empty). During removal of the partly filled cassette the tambour door would release the lock lever to return to its locking position. The lever finger would engage the backside (right side in FIG. 24) of the actuator finger. The angled cam surfaces of the lever finger and the actuator finger may be in locked engaging relationship. The engagement may prevent the actuator arm from sliding past the lock lever. For example, even with the push plate withdrawn the engagement may be of greater force than that of the actuator arm return spring. Thus, the lever would operate to lock the actuator arm in its indicating position (in its leftmost slot position in FIG. 24).

The actuator arm (whether locked in an indicating position or a non-indicating position) can be automatically released from its locked position upon opening of the cassette lid. With the cassette lid being opened, a lid bearing member 294 is operative to permit movement of the shaft 276 in the direction of arrow B, as shown in FIG. 26. Movement of the shaft causes the lock lever 270 to pivot and unlock the actuator arm 250. That is, opening of a cassette (e.g., a cassette with the tambour door closed and the cassette out of a machine) is operative to unlock the actuator arm. Contrarily, closing of the cassette lid is operative to move the shaft in an opposite direction to lock the actuator arm.

FIG. 24 shows the shaft in a lid open position. FIG. 25 shows the shaft in a lid closed position. FIG. 26 shows that the shaft is operative to be moved from its lid closed position to its lid open position.

Having the actuator arm unlocked or free during servicing can be beneficial. For example, a free actuator arm during opening of the lid can ensure commonality of initial locking conditions; can permit testing of actuator arm movement and the actuator arm spring operation; may assist in media reloading operations; and may assist in accessing and replacement of cassette components.

With a lid in an open state, a cassette can be replenished or reloaded (loaded or filled). For example, a cassette may be loaded manually or by an automated loading machine. Upon closing the lid, the lock lever is moved to lock the actuator arm in its non-indicating position. A replenished cassette can be transported to an automated banking machine.

A lock lever can be automatically moved to lock an actuator arm responsive to the lid be closed at a work station or the tambour door being closed in a machine. That is, the locking arrangement permits an actuator arm to be automatically locked for all transport. Thus, a media-low indicator mechanism can be properly secured during transport.

As discussed in incorporated U.S. Pat. No. 4,871,085, information regarding a media cassette can be indicated or signaled to an automated banking machine by using one or more indication buttons. An arrangement of buttons can be representative of a cassette and its content, such as cassette ownership, cassette serial number, and currency denomination. Information regarding a particular representative characteristic of a cassette can be passed to an automated banking machine via physical contact between one or more buttons and a component of an automated banking machine. For example, a media-low condition may be indicated by causing contact between a button and a component of an automated banking machine via movement of the contact button. Other cassette buttons may come into contact with a component of an automated banking machine upon insertion of the cassette into the machine.

In an exemplary embodiment discussed in more detail herein, a media cassette may use other arrangements or techniques to indicate cassette content information to an automated banking machine. Unlike communication involving mechanical buttons for physical contact, the exemplary embodiment permits communication to occur without requiring physical contact. For example, a cassette may use an indicator member such as a non-contact transponder to communicate with the automated banking machine. Radio frequency (e.g., radio waves) can be one manner in which to communicate in a non-contact relationship, e.g., communication not based on physical contact. Other types of remote communication may also be used.

A cassette may have one or more radio frequency identification (RFID) tags (or devices or indicator members) which contain data indicative or reflective of cassette content information. RFID tags can operate on the RS backscatter principle. Data communication may occur between the RFID tags and an automated banking machine. Data communication may also occur between the RFID tags and a computer at a service center work station.

A canister or cassette may use non-contact RFID tags instead of or in addition to information indication contact buttons. One or more tags may be removably attached or mounted to a cassette (e.g., thereon or therein). Alternatively, tags may be permanently affixed to a cassette, such as embedded in a (plastic) portion of a cassette.

RFID tags are operative to store information therein representative of the canister and its content, such as cassette ownership, cassette serial number, and currency denomination. In an exemplary embodiment, tags can contain much more cassette-related data than can be represented by an indication button arrangement. For example, in the exemplary embodiment, tags may contain information reflective of logging data (e.g., dates, media counters, handler's name or ID) and media description (e.g., type, height, length, thickness). A tag may carry a unique cassette identification number of 32 bits or longer. The tags are also capable of storing more information in a smaller space in comparison to a mechanical indication button arrangement.

RFID tags, unlike buttons, do not require contact (e.g., mechanical or electrical contact) with a media dispenser component. Thus, the contactless tags can prevent damage (wear and tear) thereto and/or to the dispenser, and may further prevent possible jams associated with mechanical buttons.

RFID tags may have read-only or rewritable memory for storage of cassette information. RFID tags may have a memory which can be changed or modified by service personnel. The tag memory may be programmable. For example, a service work station may have a device operative to communicate with an RFID tag to change and/or read the data contained therein. A hand-held RFID tag communication device may also be used.

Alternatively, a tag may have unchangeable data. In such alternative situations, a combination of read-only tags may need to be assigned or attached to a particular cassette to fully represent its information content. A cassette may also have a combination of read-only and programmable tags.

Each media cassette in an automated banking machine can be equipped with an RFID tag. A reader device is operative to remotely read the tag data. The reader device may be associated with a dispenser feed channel. The reader is operative to read tag data while the tag is in physically contactless relationship with the machine. Thus, a tag reader can be spaced from the tag. It follows that communication between a cassette information tag and an ATM can occur without requiring physical contact, which would occur with the use of previously discussed buttons.

When a cassette having an RFID tag is inserted into a dispenser feed channel of a machine, reader circuitry associated with the dispenser feed channel can interrogate the tag to receive information about the particular cassette. The reader circuitry may comprise a circuit card assembly. In an exemplary embodiment, a tag may be of a type that does not need a power source (e.g., battery), but lives on the RF energy provided by the reader. The information exchanged between an RFID tag and a reader may be encrypted to provide additional security. Thus, a reader may comprise a decoder in decoding circuitry.

Figure 27:
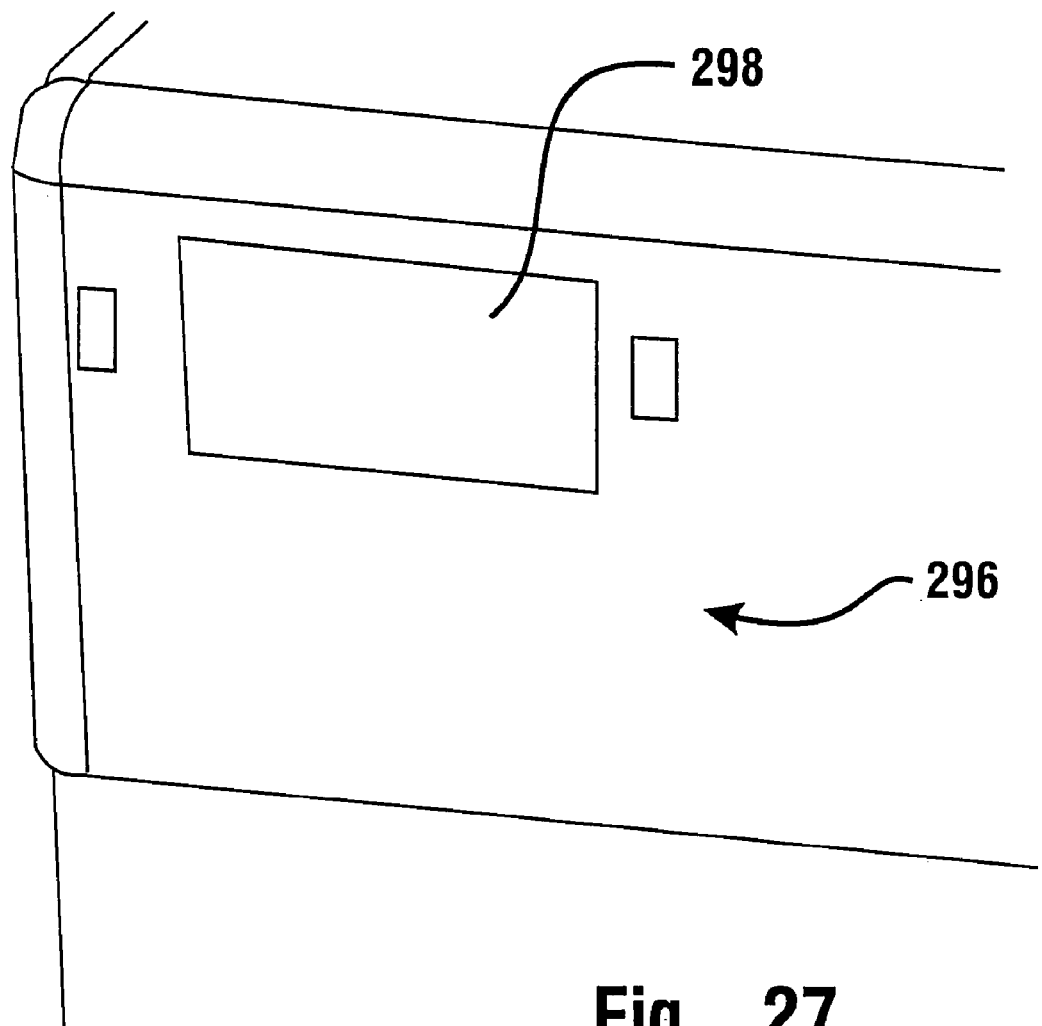
FIG. 27 shows a cassette portion including an RFID tag.
Figure 28:
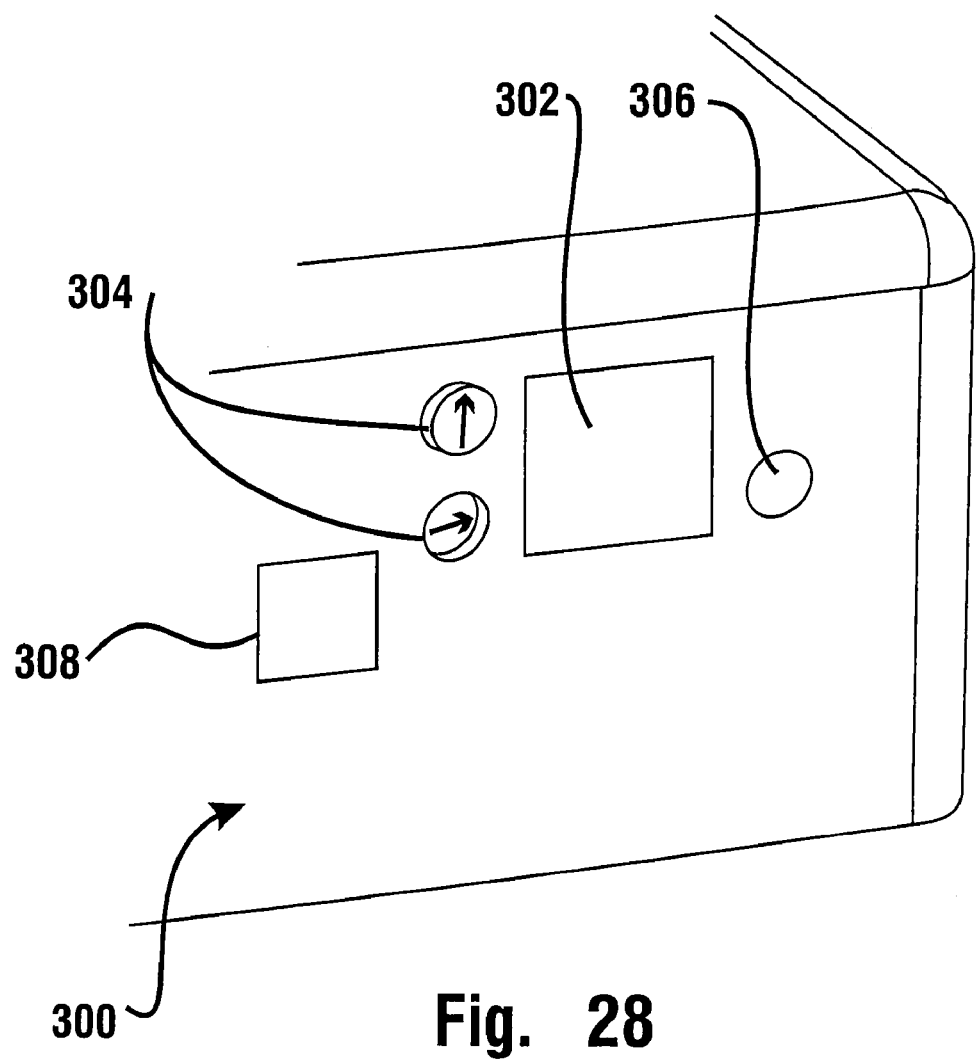
FIG. 28 shows a cassette having an RFID tag adjacent indication contact buttons.

FIG. 27 shows a portion of a cassette 296 having an RFID tag 298. FIG. 28 shows a portion of an alternative cassette 300 having an RFID tag 302 in a location typically reserved for information indication contact buttons. That is, the tag 302 is positioned at a button location. Alternatively, a modified cassette may have certain buttons replaced by the tag. Buttons 304 are also shown. A button hole 306 which may be useful for indication of a media-low condition is also shown. One or more buttons 304 may be used to indicate to the machine that the cassette has an RFID tag. Machines may be operative to read both buttons and RFID tags.

Contactless (and wireless) technology can also be used to indicate to the automated banking machine the presence of a cassette, a properly positioned cassette in a dispenser channel, and/or a media (e.g., money) low condition. A cassette latched condition may also be indicated. That is, buttons which are operative to indicate the latching position of a cassette may also be replaced in using a contactless cassette.

In an exemplary embodiment the sensing of the position of a cassette may be implemented by using one or more sensors. Although not limited thereto, low cost, high accuracy Eddy current type distance sensors may be used. A sensor can be part of a sensor circuit associated with a dispenser feed channel. A target (e.g., a metal target such as Ferrite) or indicator member can be attached to or embedded into a cassette (which may comprise plastic). The sensor is operative to accurately measure the distance between the indicator member (e.g., target) and the sensor (or another object). A cassette may be determined to be properly positioned in a machine (or a work station) if the target is sensed to be within a predetermined or acceptable range of the sensor. That is, a cassette may be deemed properly positioned if it is determined to be close enough to the sensor. A machine processor can determine from the sensor data whether the cassette is properly positioned. One or more targets and/or sensors may be used. Likewise, a contactless target/sensor arrangement can be used to determine if a cassette is properly positioned in a work station. FIG. 28 further shows the cassette portion 300 having a target 308. It should be understood that a cassette may have numerous locations at which a target may be positioned.

A contactless sensor arrangement may also be used to determine a low media condition in a cassette. The arrangement can be similar to an arrangement for sensing cassette position. A movable target (e.g., Ferrite) can be associated with a cassette instead of a button. A low media sensor can be used to corresponding measure the distance between the target and the sensor. One or more targets and/or sensors may be used. A target reaching a particular position can be indicative of low media (e.g., money) remaining in the cassette. The accuracy requirement for a low media sensor may be less than that for a cassette position sensor. For example, a low media target may be closer when sensed (e.g., may have been moved closer prior to sensing). Therefore, a low media sensor arrangement may be capable of using a smaller moving target. Alternatively, a highly accurate sensor/target arrangement may be used, such as in attempting to determine the exact number of notes or bills remaining in a cassette.

Figure 29:
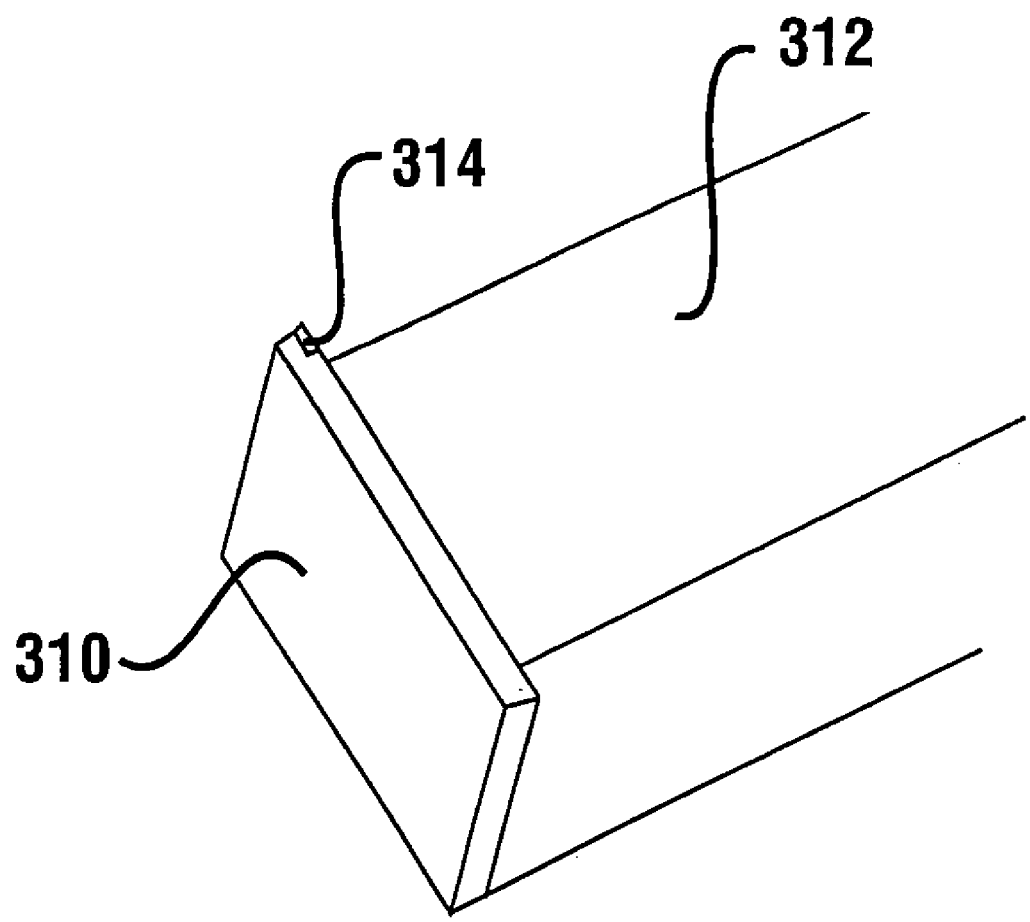
FIG. 29 shows a push plate having a target.

A low media target may be mechanically moved progressively in response to spring pressure or other mechanisms. For example, the target may be attached to or embedded in a push plate (e.g., currency follower plate) of a cassette. FIG. 29 shows a push plate 310 and a stack of media 312. The push plate has a target 314. Alternatively, a target may be first moved in correspondence with a cassette reaching a low media condition. A sensor could be operative to detect the movement of the target. Furthermore, a target may first become detectable only after a cassette has reached a low media condition. For example, a target could be shielded from detection at an acceptable media condition. Later the target could become unshielded at the low media condition. Of course other sensor/target arrangements and/or devices may be used, such as a range finder (e.g., laser range finder). A global positioning system (GPS) or component thereof may also be used.

As previously discussed, an RFID tag may include data representative of a cassette and its content. For example, an RFID tag may include data reflective of currency code, currency denomination, and the unique serial number of the cassette.

In an exemplary embodiment, an automated banking machine can be operative to read an RFID tag to obtain the initial or current amount of currency in a cassette. The machine may also be operative to keep a running count of the currency currently in a cassette. This may be accomplished by keeping a record of the number of bills initially in a cassette minus the bills removed from the cassette.

An automated banking machine can be operatively connected to other machines on a network (e.g., an ATM banking network, which may include the Internet). In an exemplary embodiment the network can track information (e.g., currency data) related to a particular cassette by recognizing its unique serial number. It follows that the network can ascertain information (e.g., currency data) related to a particular machine. It further follows that the network can ascertain information (e.g., currency data) related to each machine in the network. The network information (e.g., currency data) can be updated periodically or continuously. For example, the network information can be in real time.

The network may include one or more computers. An automated banking machine may have at least one computer. The network may includes a host which can communicate with each machine. The communication may involve the Internet and/or a proprietary network.

The tracking ability enables a customer (e.g., a host bank) to know the exact amount of currency (e.g., amount, value, types, etc.) circulating within their ATM banking system or network. The arrangement enables a network operator to provide better cash management. Machine currency amounts can be adjusted accordingly, e.g., currency can be added or removed from the system. Currency of a particular denomination can be ordered. Thus, cash management, cash replenishment control, and banking network efficiency can be enhanced.

The ability to track individual cassettes via their serial number permits improved network efficiency. For example, problem cassettes can be identified. A particular cassette may be linked or associated with a certain number of failures. These failures may have involved different machines. That is, the same cassette can be linked to failures in various machines. Tracking of the particular cassette enables it to be identified for maintenance, repair, or replacement.

An RFID tag may also include trackable data. For example, certain data may be reflective of the entity (person or persons) responsible for handling a cassette, including the entity who loaded the cassette. Thus, particular cassettes can be linked to particular entities. Thus, the ability to track individual cassettes in a banking network can enable security to be improved.

RFID tags can be operative to read, log (store), and report the cassette data. All actions associated with a cassette can be logged into an RFID tag. For example, RFID tags may be used in providing trackable information relating to cassette serial number, cassette ownership, currency nationality, currency denomination, currency length, currency height, currency thickness, loaded currency amount, times, dates, handler ID, machine serial number, cassette age, repair records, etc.

The use of RF can eliminate mechanical contact between cassettes and dispenser feed channels. Of course the use of radio frequency is one example of non-contacting remote communication. It should be understood that other types of non-contacting information communication may be used instead of (or in additional to) radio frequency or radio waves.

A cassette may also have an electronic lock. For example, a cassette may have an electronic keypad lock. The electronic keypad lock may replace (or be in addition to) a key lock. Each unique cassette can have a different access code or combination. The code of an electronic lock cassette can be changed.

An electronic lock cassette can be equipped with a battery pack. The battery pack can be charged in a non-contacting manner. For example, the cassette can have an inductive charging port associated with the battery. The battery can be recharged via the inductive charging port.

A locking arrangement can include a locking latch, such as a bar or lever. A latch bar can be movable between a locking position and a non-locking position. A latch bar in a locking position can prevent the cassette from being opened. An electronic lock cassette can use a drive device to operate the latch bar. For example, a solenoid or motor can be used to drive the locking latch bar. The drive device can operate off of a battery.

An electronic programmable keypad can be used with an electronic lock of a cassette. The keypad can be programmed to receive multiple cassette access codes. That is, more than one access code or combination may be able to unlock the cassette. Additionally, plural access codes may need to be entered to unlock a cassette. For example, a user ID followed by a password may be needed for gaining entry to the interior of a cassette. Furthermore, codes or IDs entered into a keypad can be recorded (e.g., stored in a memory) by the electronic lock. Dates and times of access (or attempted access) can also be recorded. Thus, an audit trail of cassette access can be recorded.

After a key code is entered (or a sequence of codes) then the cassette can be unlocked. A solenoid or motor can be engaged or driven by a battery. The solenoid can operate to move a latch bar from a locking position to an open position. The cassette can then be opened, such as by opening the cassette lid or cover. The opening, loading, and closing of a cassette can be performed manually. In alternative handling arrangements the functions of opening, loading, and closing of a cassette may be performed by a cassette handling machine.

An electronic locking arrangement can increase security in comparison to mechanical key locks. The use of tangible keys can be eliminated. Each cassette can have a different access code. Thus, loss of a single code would not endanger other cassettes. Furthermore, the access code of a cassette can be changed. For example, a cassette may have its access code changed upon each entry therein. An electronic lock may also be arranged to prevent closure of a cassette until its access code is changed.

Upon closing a cassette cover or lid, the cover may be automatically locked. Mechanical arrangements for automatically locking a latch bar may be used. For example, a latch bar may be spring actuated so that closure of the cover returns the latch bar to a locking position. Alternatively, the latch bar may be driven to a locking position by a drive device. A cassette may also have a visual indicator (e.g., LED display) denoting locked and unlocked conditions. Alternatively, a contactless sensor arrangement (as previously discussed) may be used to sense whether a cassette latch bar is in (or has been moved to) a locking position.

Figure 30:
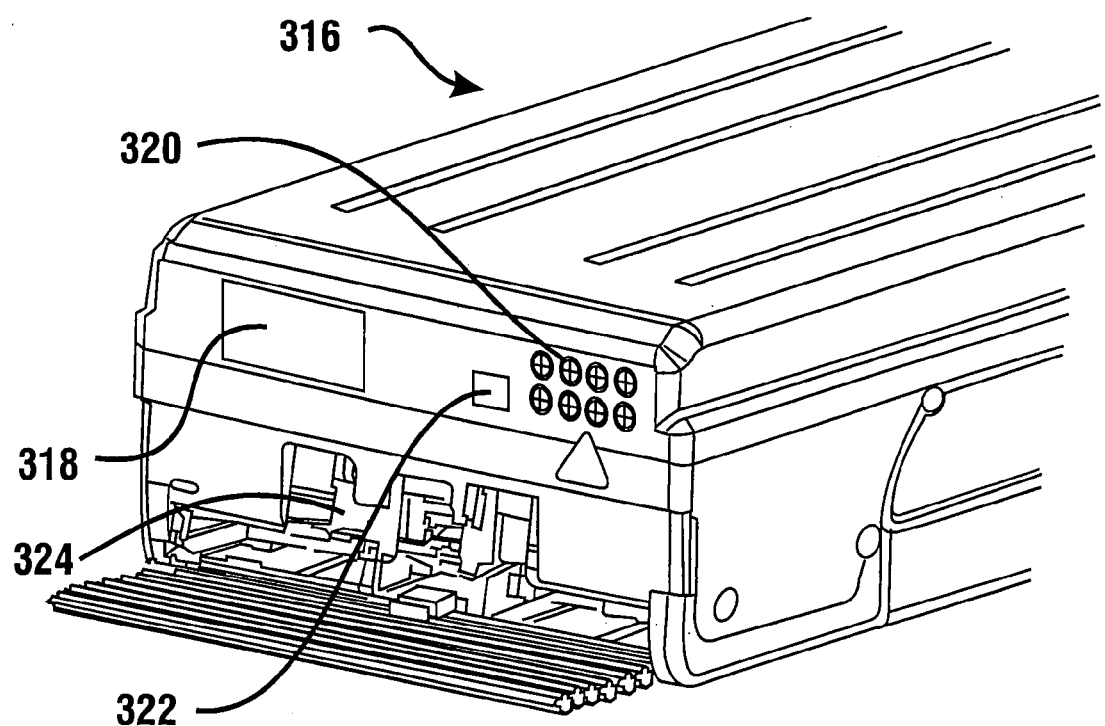
FIG. 30 shows a cassette with an RFID area, an indication button area, and an-inductive charging port area.

FIG. 30 shows a rear portion of a cassette 316. The cassette has an RFID area 318, an indication contact button area 320, and an inductive charging port 322. A picker/note engagement area 324 is also shown. Of course other arrangements may be used. For example, the port location and the RFID location may be switched.

Figure 31:
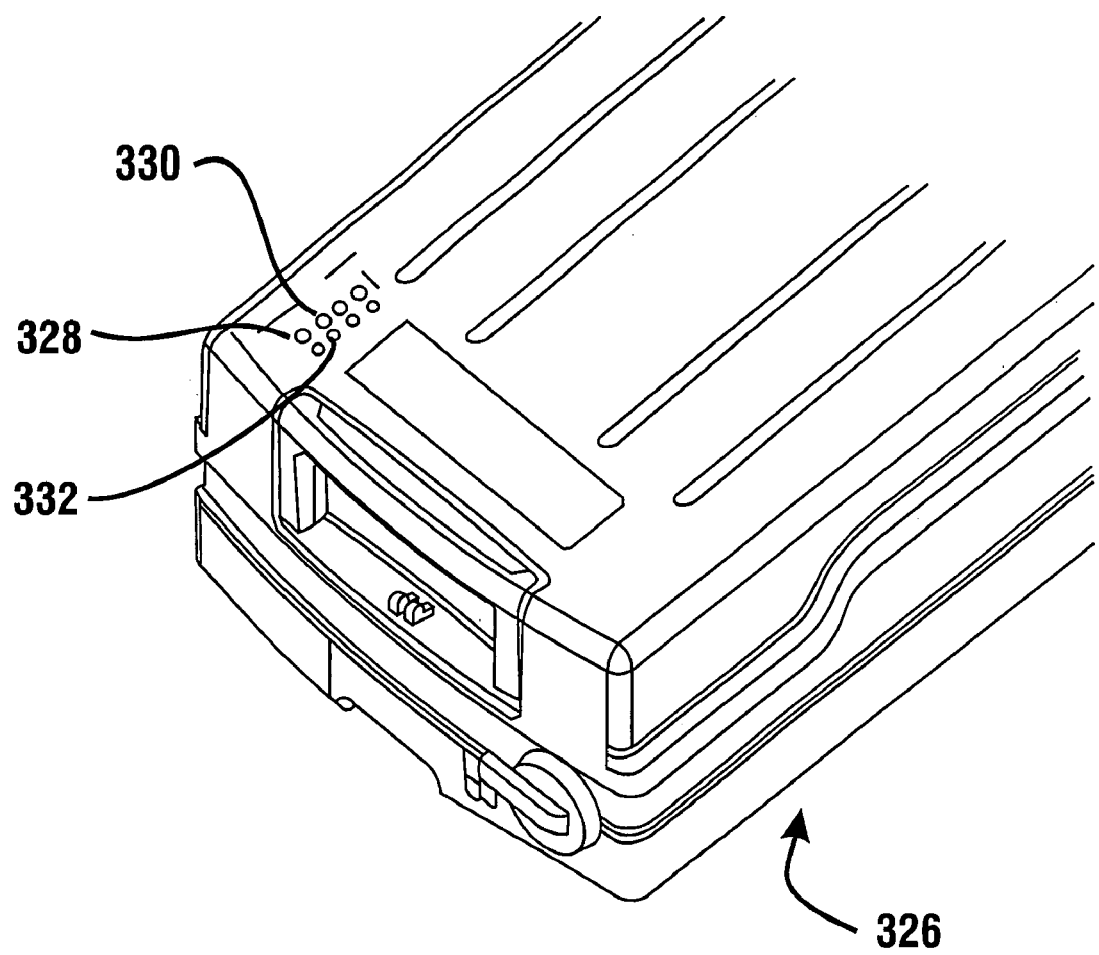
FIG. 31 shows a cassette portion with a programmable keypad area.

FIG. 31 shows a closed cassette 326 with a programmable keypad area 328 on a top portion thereof. The keypad area includes buttons 330 and LEDs 332. The LEDs (i.e., light emitting diodes) can be operative to signal which button or buttons have been pushed or keyed. Of course, input devices other than push buttons may be used. For example, an input device may be operative to sense touch. The keypad is operative to receive an access code to open the cassette.

Figure 32:
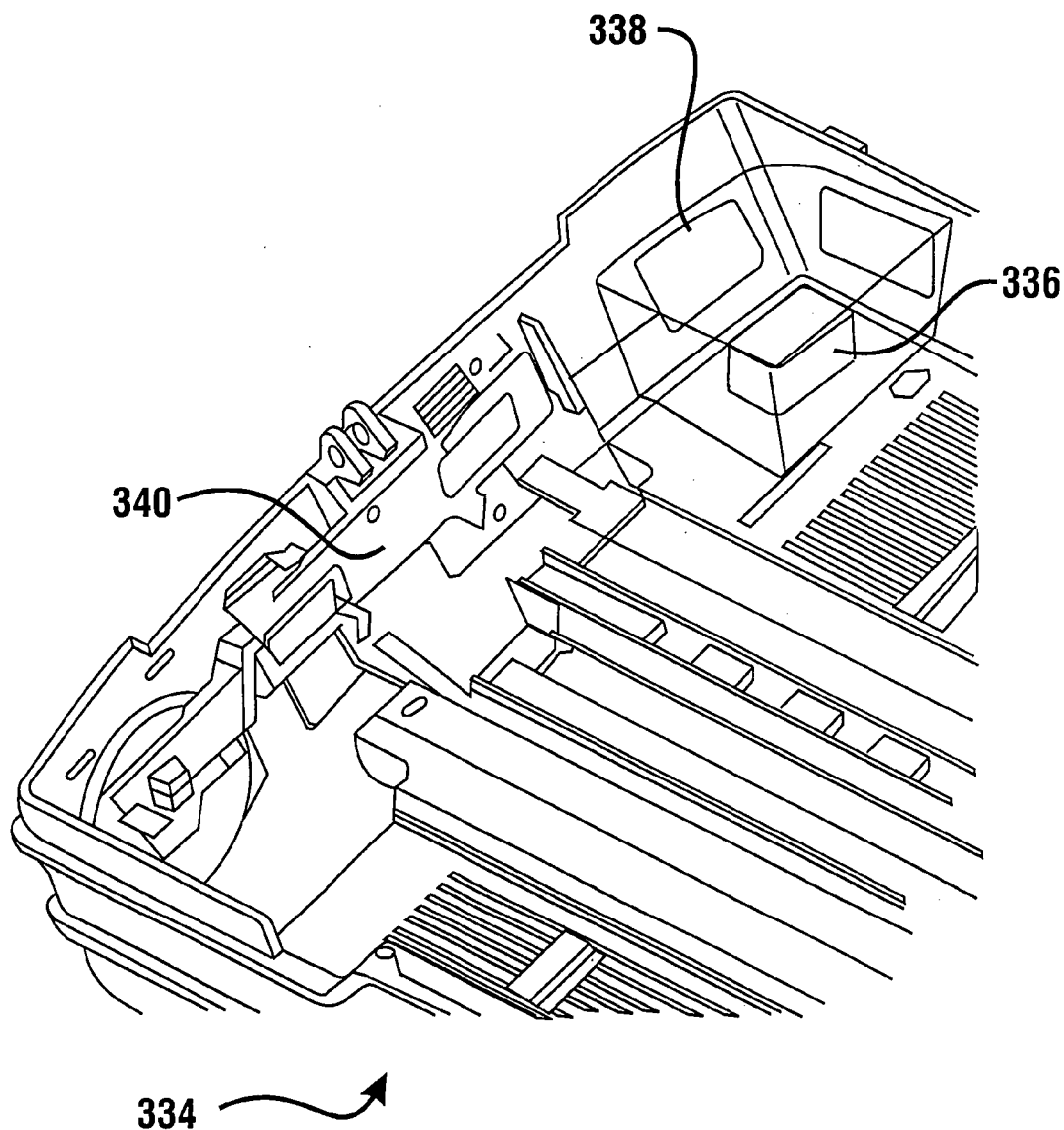
FIG. 32 shows a battery pack in a cassette.

FIG. 32 shows a cassette portion 334 with a battery pack 336, solenoid 338, and a latch bar 340 in operative connection. A keypad area can be externally located adjacent (e.g., above or sideways of) the solenoid and/or battery pack. The solenoid can be initiated by the keypad to drive the latch bar. A processor may also be operatively connected with the keypad and battery. The latch bar may be of a conventional configuration.

Figure 33:
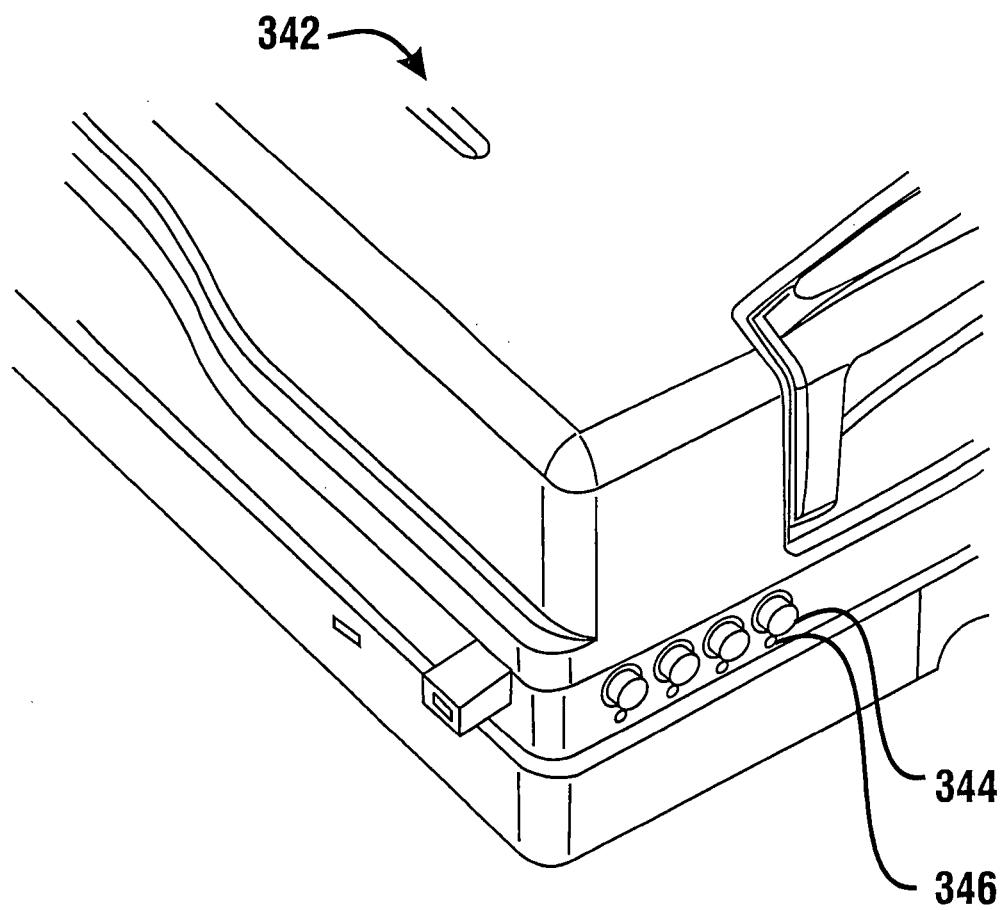
FIG. 33 shows a programmable locking button and LED arrangement.

FIG. 33 shows a cassette 342 with programmable locking buttons 344 and adjacent LEDs 346. The buttons are shown as spaced or separated, axially extending, and of similar cylindrical shape. Each button has a corresponding LED located there beneath. The LEDs are shown as spaced and of similar circular shape. Each of the buttons can be identical. Likewise, each of the LEDs can be identical. The buttons and LEDs extend from a common surface. Although four buttons and four LEDs are shown, it should be understood that a cassette may have greater or fewer numbers thereof.

Figure 34:
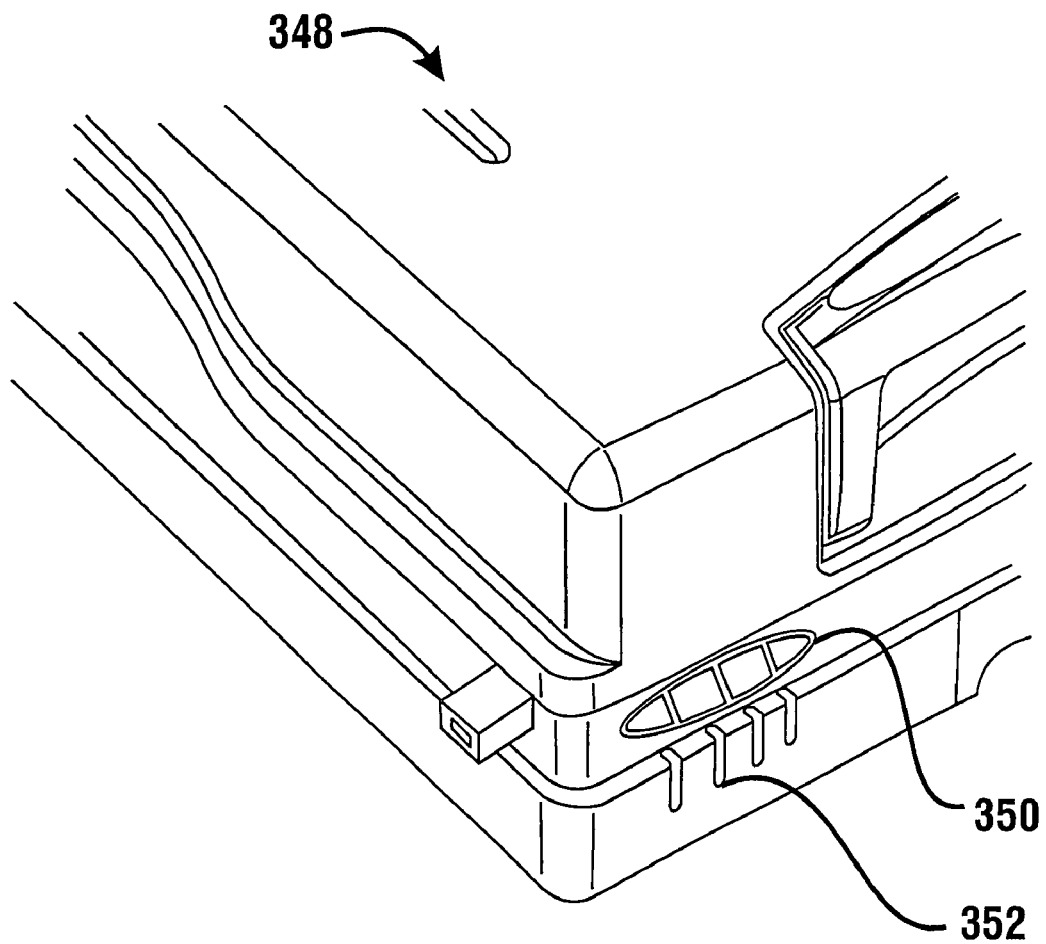
FIG. 34 shows another programmable locking button and LED arrangement.

FIG. 34 also shows a cassette 348 with programmable locking buttons 350 and adjacent LEDs 352. The buttons are shown as dissimilar and closely arranged to an adjacent button. Each button forms part of a segmented oval. The LEDs are shown as spaced, and of similar elongated shape. The buttons and LEDs may extend from, be flush with, or be recessed into a cassette surface. Each LED may also be positioned on adjacent cassette surfaces. For example, a first portion of an elongated LED may axially extend generally perpendicular to a second portion thereof. Thus, an LED may be visible from two different directions, e.g., top and side views.

Figure 35:
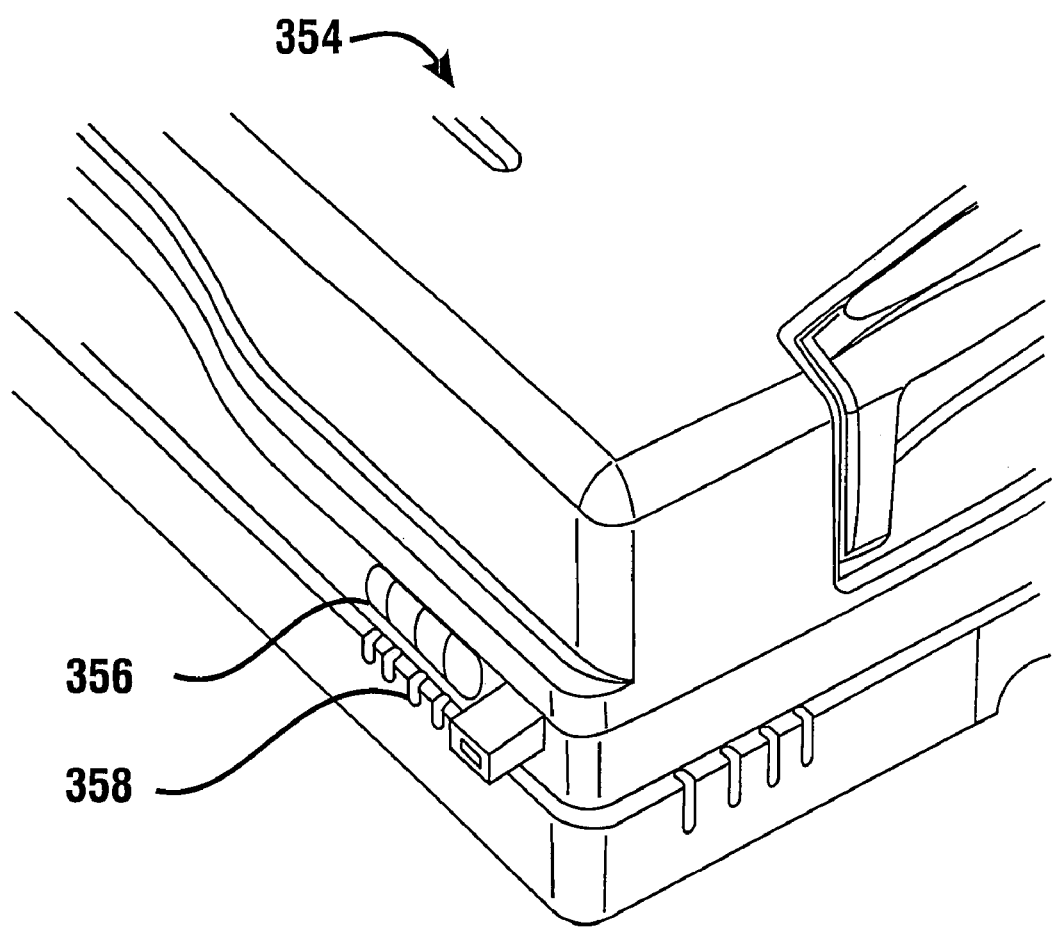
FIG. 35 shows a further programmable locking button and LED arrangement.

FIG. 35 shows a cassette 354 with programmable locking buttons 356 and adjacent LEDs 358. The buttons form a rectangular area with the ends in the elongated direction rounded. In comparison to FIG. 34, the LEDs are shorter in the elongated direction (e.g., have less length) but have a greater width (e.g., larger thickness). The button/LED arrangements of FIGS. 34 and 35 are also positioned at different cassette locations.

Figure 36:
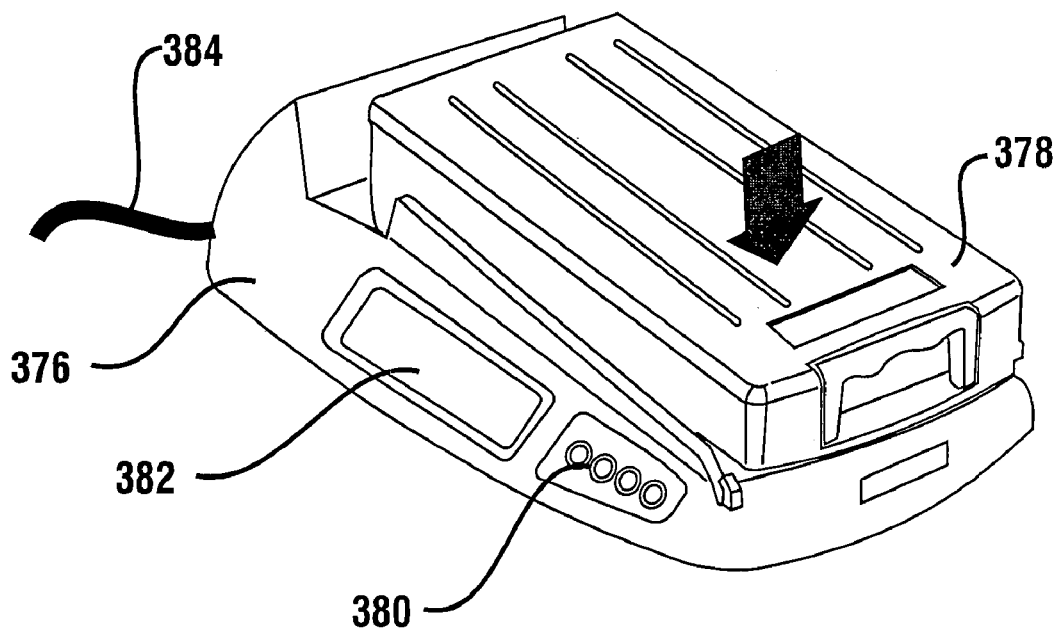
FIG. 36 shows a cassette and tray arrangement.
Figure 37:
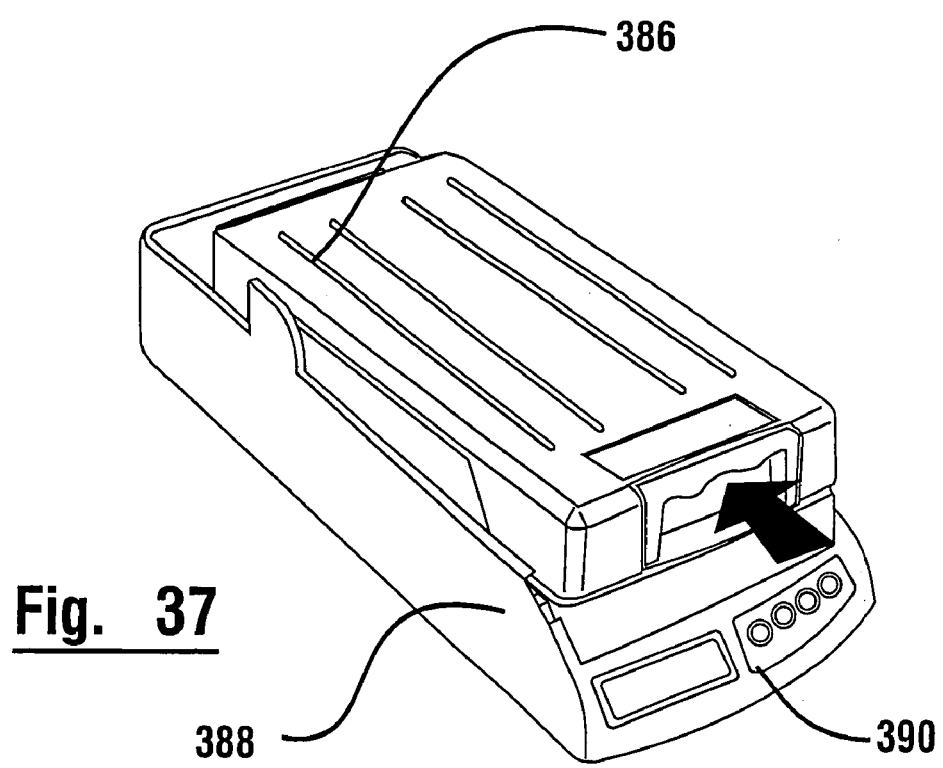
FIG. 37 shows another cassette and tray arrangement.
Figure 38:
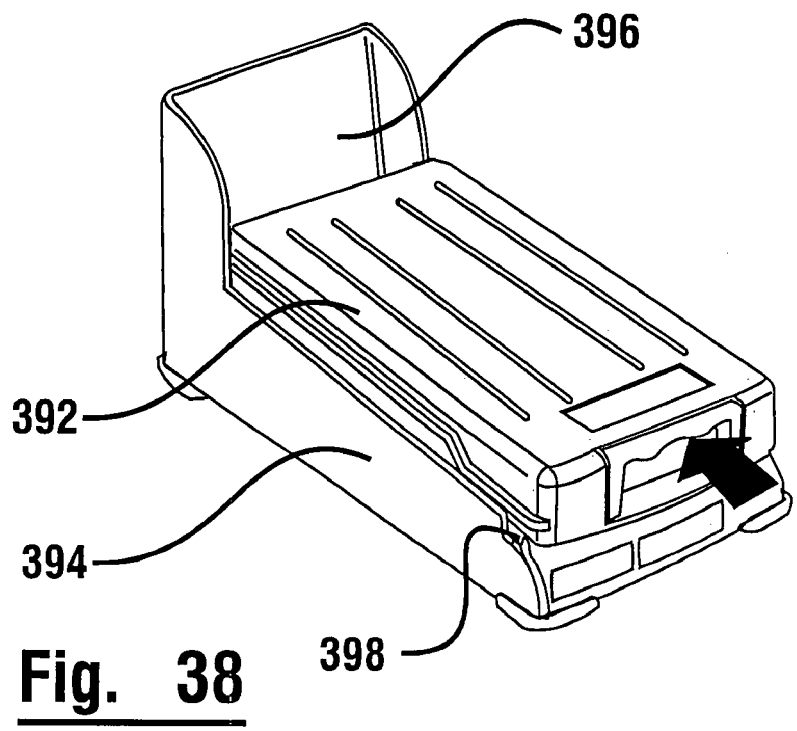
FIG. 38 shows a further cassette and tray arrangement.

FIGS. 36, 37, and 38 show different work station tray (or base) arrangements operative to receive a cassette. A tray can permit service personnel to communicate with a cassette. The communication may be remote. An RFID tag may also be programmed while a cassette is in a tray.

Figure 39:
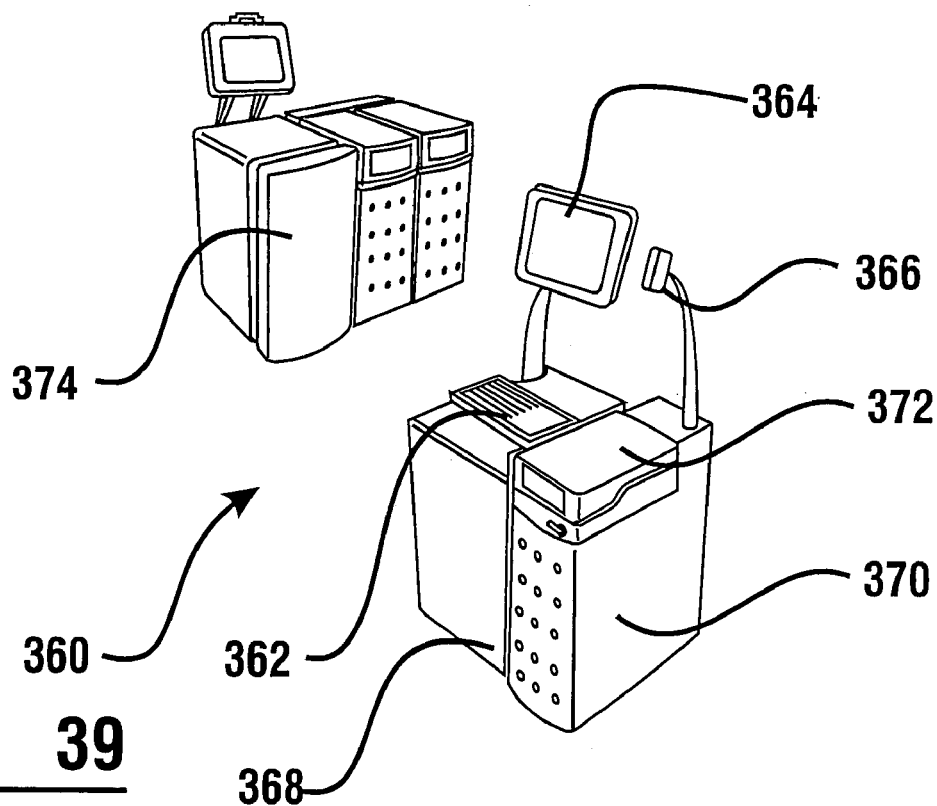
FIG. 39 shows a cassette work station area.

FIG. 39 shows a work station area 360. A work station can include one or more computers and memory storage devices. Cassettes can be serviced at a work station. For example, a cassette can be replenished or have maintenance performed thereon at a work station. An RFID tag of a cassette can also be modified or read at a work station. A keyboard and a display can be used to communicate information between service personnel and an RFID tag. The serial number of a cassette can be read. Information directed to the history of a particular cassette may be displayed. FIG. 39 also shows a work station 370 having a keyboard 362, display screen 364, camera 366, storage area 368, and a cassette 372. The work station area 360 also has another work station 374.

A cassette may be opened at a work station tray. In an alternative embodiment, a tray is operative to remotely communicate with a cassette to unlock the cassette. For example, as an additional layer of security, a cassette may be without an external keypad thereon. Programmable locking buttons can be arranged on the tray. The buttons can be operated to receive an access code to open a cassette. The access code can be operative to trip a solenoid to drive the latch bar to an unlocking position. A tray can also have an LCD panel for displaying cassette content information or information relating to an access code.

FIG. 36 shows a tray 376 in which a cassette 378 may be lowered therein, as demonstrated by the arrow. A cassette in a tray may be partly surrounded on four sides. A cassette maybe locked or latched into a tray. FIG. 36 also shows programmable locking buttons 380, an LCD panel 382, and a system port line 384. Alternatively, a base tray may be used in the field (i.e., at an ATM) to service a cassette, instead of at a work station.

FIGS. 37 and 38 show alternative arrangements in which a cassette may be slid into a tray, as demonstrated by the arrows. A cassette in a tray may be partly surrounded on three sides. FIG. 37 shows a cassette 386, a tray 388, and a programmable locking buttons and LED panel 390. FIG. 38 shows a cassette 392, a base 394 having a lid back rest 396, and a locking latch 398.

As previously discussed, media (e.g., currency, coupons, etc.) which is to be inserted into a cassette can vary in dimensions. For example, the length, width, and height of currency notes may vary from one country to another. The sizes of different denomination currency notes may also vary within the same country. However, media needs to be properly arranged within a cassette so that it can be properly removed by a picker mechanism. The size (e.g., height) of a particular type of media may limit its use to a particular sized cassette. Thus, different sized media may require corresponding different sized cassettes. It follows that a large number of different cassette configurations may be needed.

An exemplary embodiment is directed to a cassette that can be used with different types and sizes of media. The total number of cassette configurations can be reduced. Thus, costs can be reduced, parts count can be reduced, and reliability can be improved.

A single cassette of the exemplary embodiment can have different configurations. The cassette can be adjustable to contain different sized media. The cassette can have a rail system. The rail system can have one or more adjacent rails. For example, generally parallel rails may be spaced from each other in a direction generally perpendicular to their axes. The rail system can be adjustable. For example, the height of a rail may be adjustable. That is, a rail may be adjustable in the vertical direction. Hence, the same cassette can be adjusted to hold currency of a first height and currency of a second height.

Figure 40:
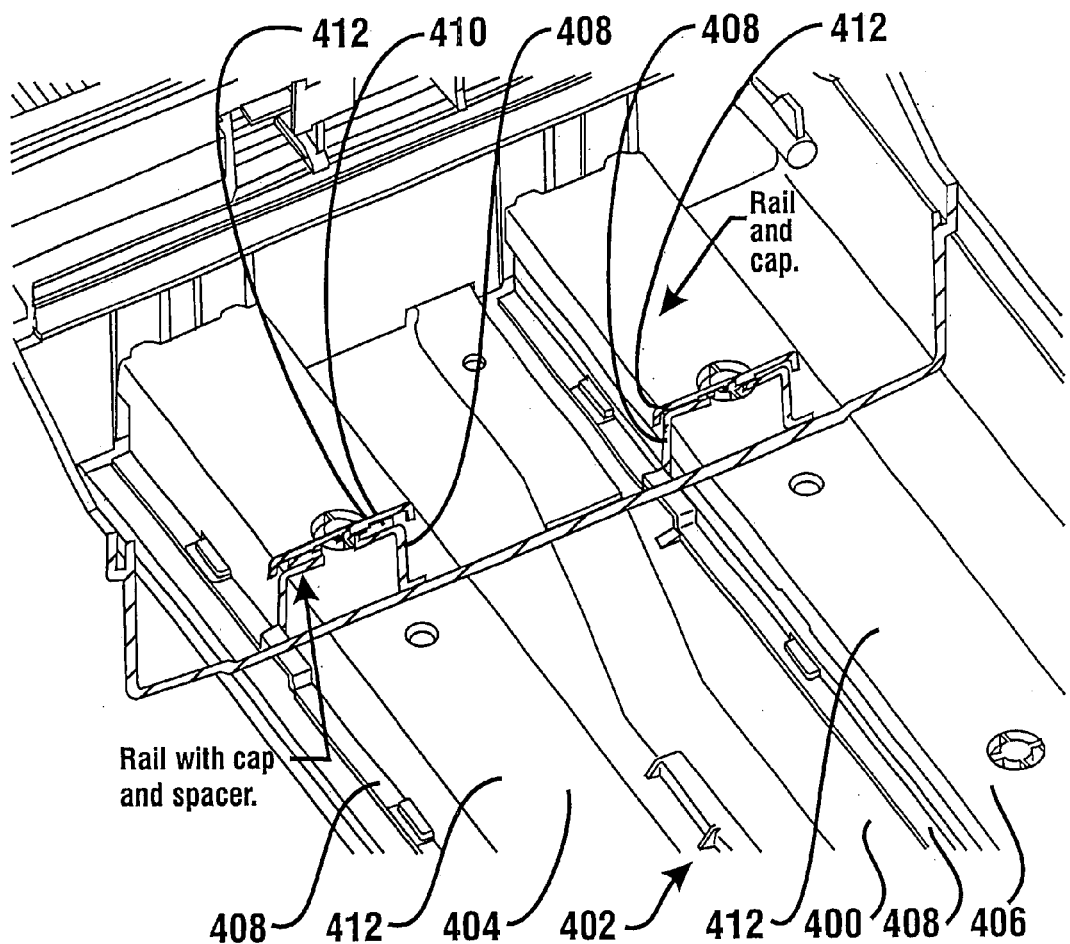
FIG. 40 shows a cassette rail system.

FIG. 40 shows a portion of a cassette lid 400 having a rail system. A rail system can be operatively connected to a cassette lid. FIG. 40 shows a rail system 402 having two rail assemblies 404, 406. However, it should be understood that greater or fewer number of rail assemblies may be used with a cassette. A rail system can be operative to guide, align, direct, engage, position, secure, and/or support media in a cassette. For example, a rail system can be used to prevent media in a stack of media in a cassette from becoming substantially vertically unaligned. That is, a rail system can be used to maintain cassette media in proper position.

A rail assembly can include a rail, cap, and/or spacer. For example, a rail assembly may have only a rail. Another rail assembly may have a rail and a cap (e.g., cover). A further rail assembly may have a rail and a spacer (or spacers) and a cap.

A cap is operative or adapted to be arranged adjacent a rail. A cap can be operatively connected to a rail. A cap can be removably connected to a rail. A cap can be used to extend the (vertically downward) height or distance of a rail assembly. A cap can be arranged to engage the top of media in a cassette. Of course a gap may be left between the media and the cap for play and/or to allow the media to slide (e.g., due to a pusher plate) relative to the cap.

A spacer is operative to be arranged adjacent a rail. A spacer is operative or adapted to be arranged intermediate or between a rail and a cap. A spacer can be operatively connected to both a rail and a cap. A spacer can be removably connected to a rail, or to a cap, or to both a rail and a cap. One or more spacers can be used to extend the (vertical) height of a rail assembly. That is, a rail assembly may have a plurality of spacers removably arranged intermediate a rail and a cap.

A rail can be integrally connected (e.g., fastened or of one-piece) to a cassette lid. A rail may be removably connected to a lid enabling the usage of different sized rails with the same lid. Thus, a rail assembly can be removably connected to a cassette lid.

With a cassette lid in a closed position, a rail assembly may be arranged to engage or abut media in the cassette. For example, a cassette currency note securement arrangement may have a cassette floor portion, currency notes engaging (e.g., resting on) the floor portion, a cap adapted to limit vertical movement of the notes, a spacer connected to the cap, a rail connected to the spacer, and the rail connected to the cassette lid. Of course, a rail assembly may be arranged in other note positioning configurations or combinations. For example, a note securement arrangement may have currency notes resting on a rail assembly.

Respective rails, caps, and spacers can be of different types, materials, shapes, and dimensions. Thus, a large assortment of different rail systems can be arranged in a sole cassette. For example, a rail and a cap may each have a generally U-shaped body with a substantially flat spacer therebetween. Furthermore, a rail/spacer/cap relationship of a first assembly may have a thickness different from a rail/spacer/cap relationship of a second assembly.

FIG. 40 also shows (and in broken lines the outline of) the rail assembly 404 having rail 408, spacer 410, and cap 412. FIG. 40 further shows (and in broken lines the outline of) the rail assembly 406 having rail 408 and cap 412. It should be understood that with equal rail and cap height, then the rail assembly 404 would be adapted to protrude toward a media stack a greater distance than the rail assembly 406.

Figure 41:
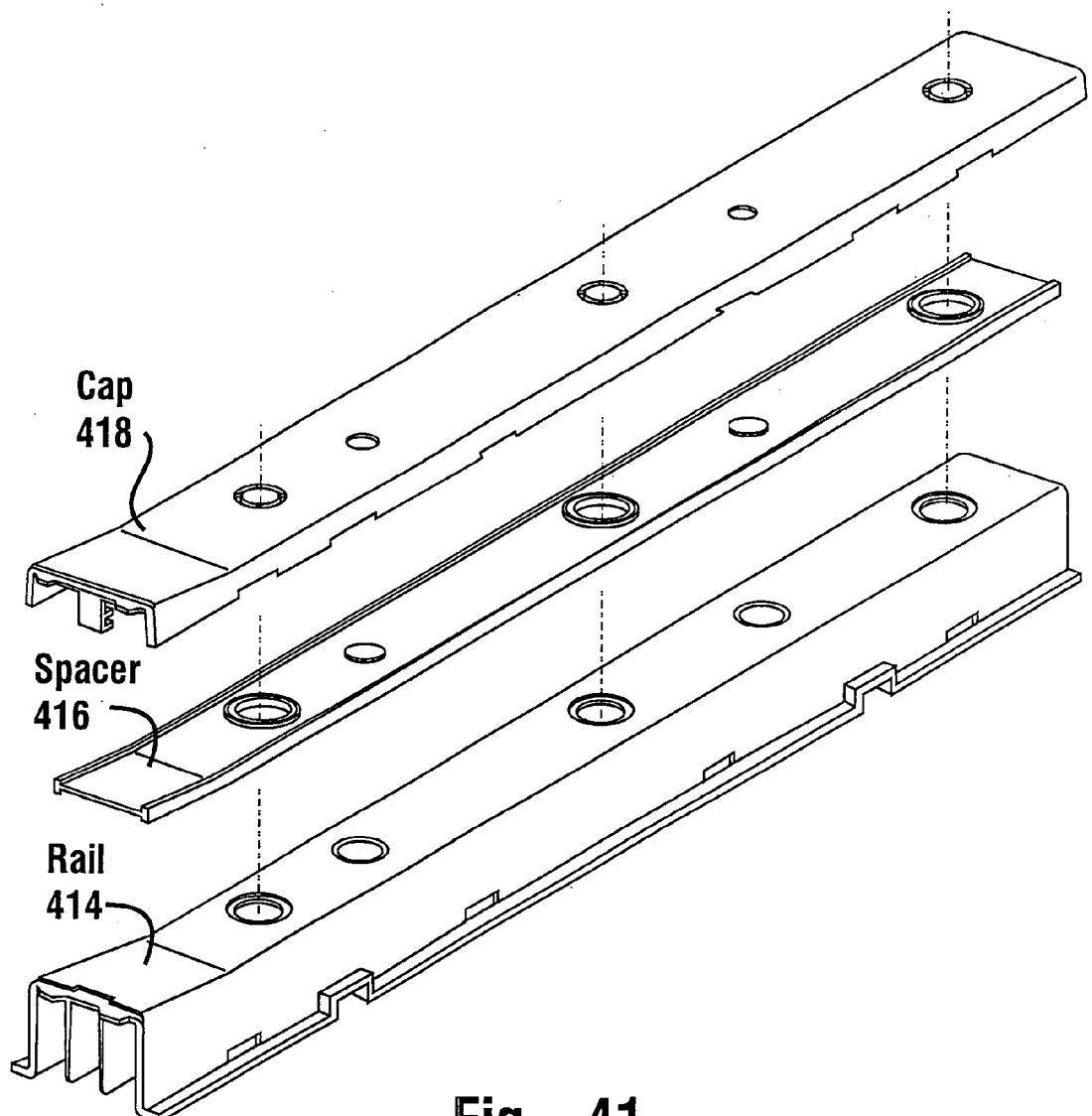
FIG. 41 shows a rail, spacer, and cap of a rail assembly.
Figure 42:
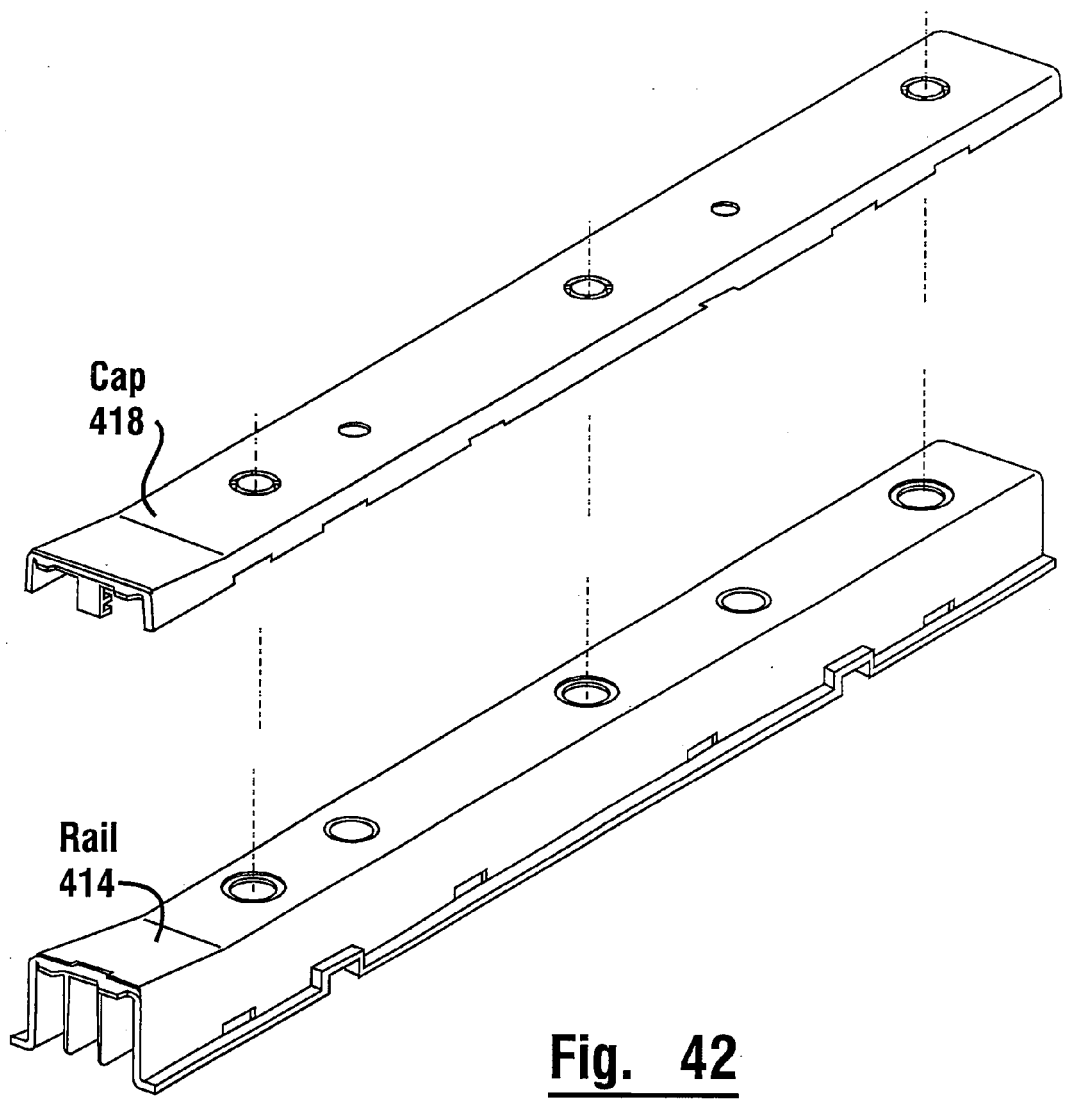
FIG. 42 shows a rail and cap of another rail assembly.

FIG. 41 shows a rail 414, spacer 416, and cap 418 which can be removably fastened together to comprise a rail assembly. FIG. 42 shows that the rail 414 and cap 418 can also be removably fastened together to comprise another rail assembly.

Figure 43:
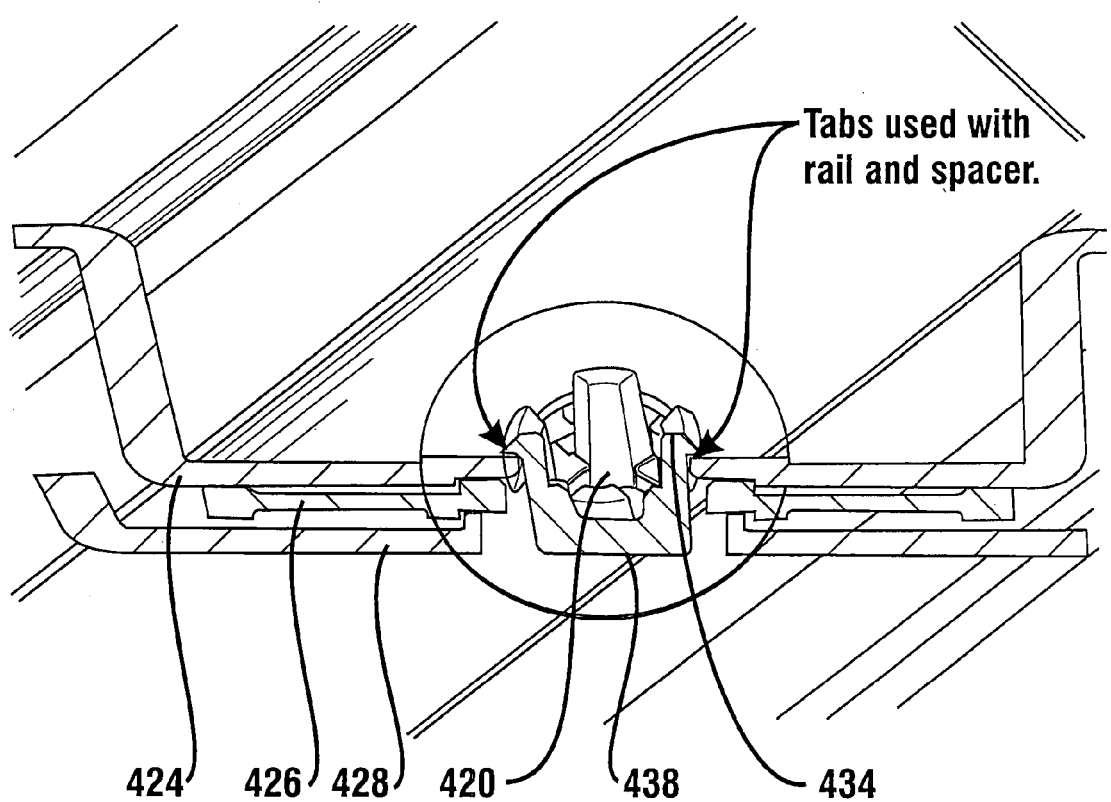
FIG. 43 shows a fastener arrangement securing together a rail, spacer, and cap of a rail assembly.
Figure 44:
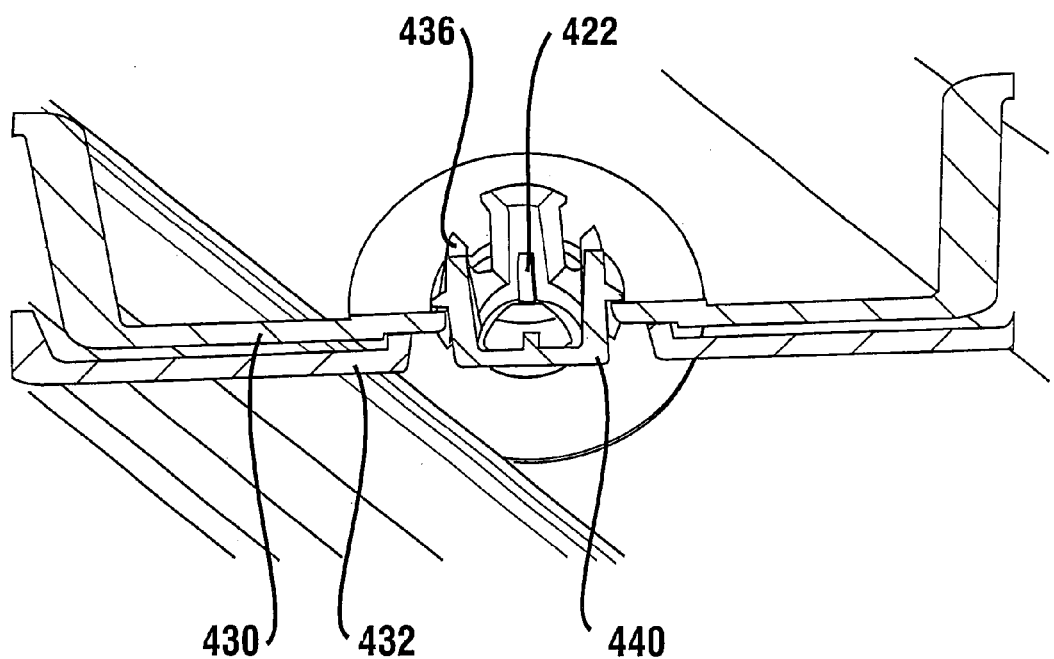
FIG. 44 shows a fastener arrangement securing together a rail and cap of another rail assembly.

A rail assembly may be secured together by a fastener or connector. The fastener may be removable. FIGS. 43 and 44 each show views from the underside of rails. That is, the side of the rail nearest the cassette lid. FIG. 43 shows a fastener 420 adapted to removably secure together rail assembly components (e.g., rail, spacer, and cap). FIG. 44 likewise shows a fastener 422. In FIG. 43 the broken lines represent a rail 424, spacer 426, and cap 428. In FIG. 44 the broken lines represent a rail 430 and a cap 432. Any type of fastener operative to removably connect rail assembly components can be used.

It should also be understood that rail assembly components (e.g., rail, spacer, and cap) may also have corresponding tongue and groove engagements for additional fastening and/or stability. A connection between two rail assembly components may be similar to a LEGO® block type of connection. For example, a spacer may have one or more tongues (or projections) on one side and one or more grooves (or slots) on the opposite side. The tongues of a first spacer could be aligned with the grooves of a second spacer to enable fastening engagement therebetween. Other manners of attachment, connection, or fastening may also be used.

In an exemplary embodiment a fastener may comprise resilient or flexible tabs or fingers (e.g., cantilever tabs). The fastener can be adapted to extend through aligned apertures (or holes or openings) in rail assembly components. The cantilever tabs can snap or expand outwardly into locking relation with the underside of a rail. A fastener may also have a head at an opposite end. The head may be adapted for tool engagement. The head may have a groove or projection to assist in fastener insertion and/or removal. When the fastener is in operative securing or locking position, the head can be flush with or recessed from the surface of a cap.

FIG. 43 shows the fastener 420 with tabs 434 and a head (outline) 438. FIG. 44 shows the fastener 422 with tabs 436 and a head (outline) 440. The engagement arrangement of FIG. 43 has a head to tabs distance longer than that of FIG. 44. This is because the combined thickness of the rail, spacer, and cap of FIG. 43 is greater than the combined thickness of the rail and cap of FIG. 44.

In alternative embodiments a cap may be biased (such as by a spring) toward engagement with a media stack. For example, a spring loaded cap may be in continuous supporting engagement with media.

The ability to create different rail assembly configurations enables the use of a standard or common or universal sized cassette for various sized media stacks. Thus, a universal cassette can be adjusted to fit various sized media. A cassette may be operative to act in a "one size fits all" manner. The same cassette can be reconfigured to hold currency of different sizes.

FIGS. 45–56 show examples of different rail assembly configurations for a universal cassette. The distance between the cassette floor and the cassette lid is the same (i.e., the distance "H") in each of the FIGS. 45–56. A cassette rail system can be configured or adjusted to correspond to media of different heights.

Figure 45:
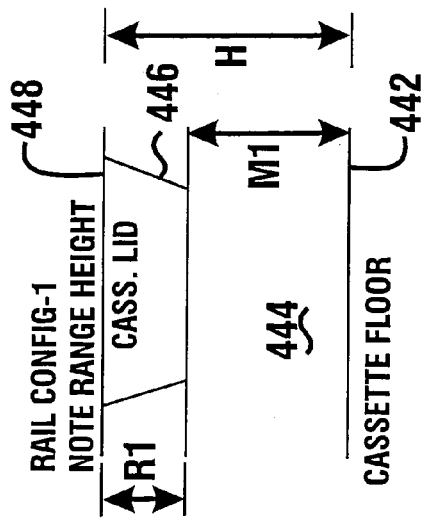
FIGS. 45–56 show examples of different rail assembly configurations for a cassette.

FIG. 45 shows a cassette floor 442, media 444, a rail 446, and a cassette lid 448. The rail assembly comprises only a rail.

Figure 46:
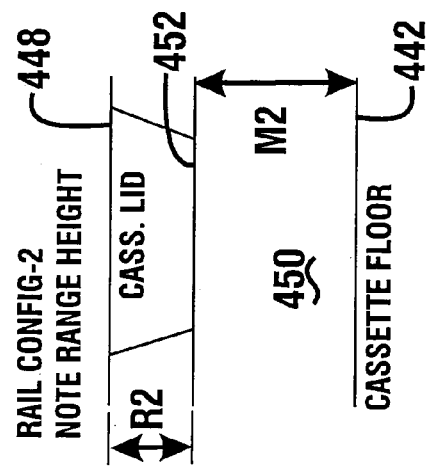

FIG. 46 shows the cassette floor 442, media 450, a rail 452, and the cassette lid 448. The media 450 of FIG. 46 has a height M2 which is less than the height M1 of the media 444 of FIG. 45. Correspondingly, the rail 452 of FIG. 46 has a height R2 which is greater than the height R1 of the rail 446 of FIG. 45.

Figure 47:
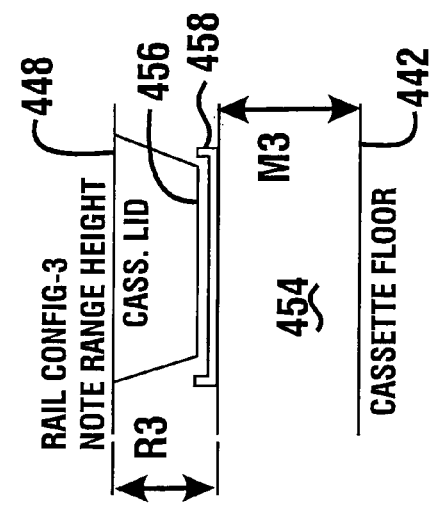
Figure 48:
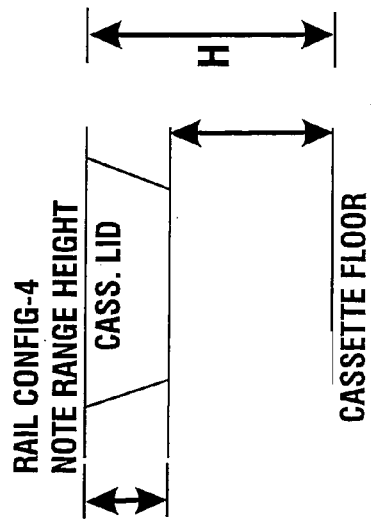
Figure 49:
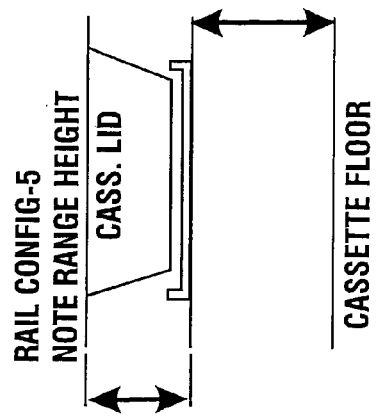
Figure 50:
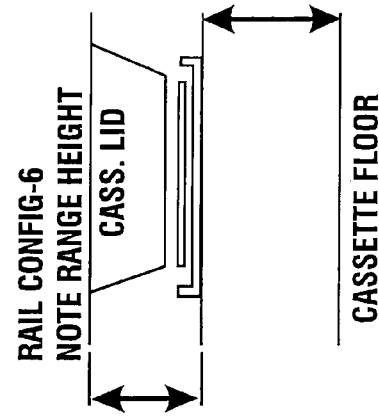
Figure 51:
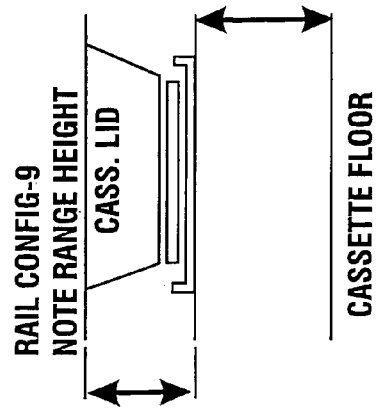
Figure 52:
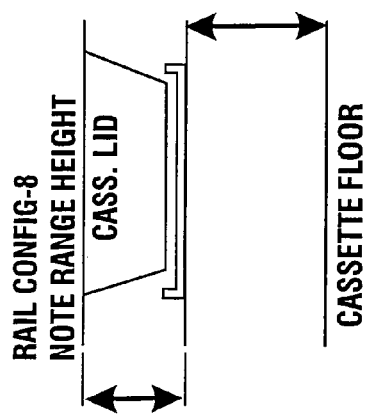
Figure 53:
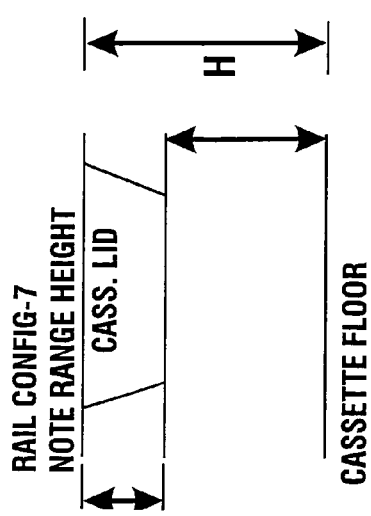

FIG. 47 shows the cassette floor 442, media 454, a rail 456, a cap 458, and the cassette lid 448. In FIG. 47 the media is of a height M3 which is less than the height M2 of the media 450 of FIG. 46. The rail 456 of FIG. 47 has a height R3 which is greater than the height R2 of the rail 452 of FIG. 46. Thus, the cap 458 can be used in the rail assembly of FIG. 47.

Figure 54:
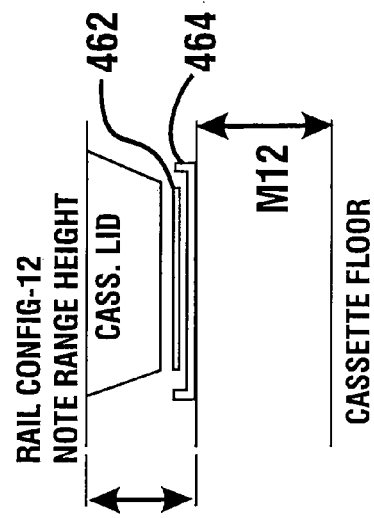
Figure 55:
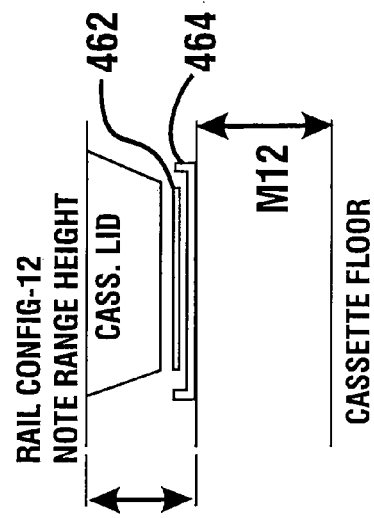
Figure 56:
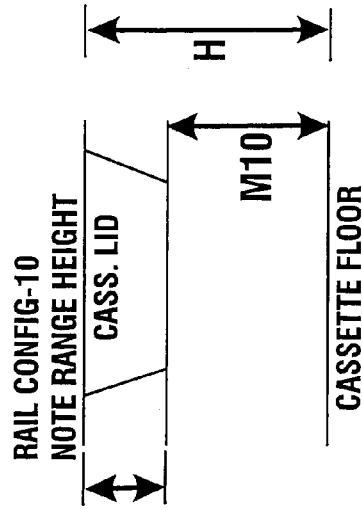

The media height M12 of FIG. 56 is less the media height M11 of FIG. 55 which is less than the media height M10 of FIG. 54. Thus, the rail assembly of FIG. 55 can have a cap 460. Likewise, the rail assembly of FIG. 56 can have both a spacer 462 and a cap 464. The other Figures show additional rail assembly arrangements with the universal cassette.

Of course either the same height rail or rails of differing heights may be used in FIGS. 54–56. Likewise, the same height cap maybe used in FIGS. 55–56 or caps of differing heights may be used. That is, the heights of rails, spacers, and caps (and cassette lids) can vary. A rail assembly can be configured responsive to or dependent on the height of media which is to be inserted into the cassette. Of course other universal cassettes can have other lid and floor arrangements. For example, other cassettes may have lids and floors of different sizes and spacings (e.g., heights).

Sometimes a cassette may be overloaded with media. That is, too much media was inserted into a cassette. A media overloaded cassette can lead to problems. For example, note jams, double notes, picking malfunctions, and cassette component wear may be associated with an overloaded cassette.

An exemplary embodiment prevents or reduces the use of a media overloaded (or overstuffed) cassette. In the exemplary embodiment a cassette lid can be prevented from closing if the cassette is overloaded with media.

A member or arm is adapted to be positioned in a cassette adjacent to a media stack. The arm may be resilient. The arm can be operative to bend or flex or tilt responsive to a force caused by the media stack of an overloaded cassette. That is, the arm can be operative to flex responsive to an overloaded media stack. For example, the arm can bend away from the stack.

The arm may be a separate component attached to the cassette. Alternatively, the arm may be attached to or integral (e.g., of one-piece) with a cassette component, such as a media stack push plate. The arm may be a push plate.

A push plate can have a resilient arm or portion extending from a base of the plate. That is, the plate can have a (lower) base portion thicker (and stronger) than an upper (tip) portion as taken in a cross-section view thereof. For example, a push plate taken in cross-section can have a pyramidal shape. Of course other shapes may also be used. The base can be secured in the cassette to resist movement by an overloaded media stack. However, the upper portion (e.g., resilient arm) can be operative to flex due to an overloaded media stack. A pusher plate component (e.g., a pusher plate tip) can flex away from the overloaded media due to the media pressing there against.

A cassette lid can have a rib (engagement portion, projection, tab, ledge, or catch) attached thereto or integral (e.g., of one-piece) therewith. The lid rib can be adapted to engage (or abut) a resilient arm when the arm is in a flexed (and engageable) position or condition. The engagement can prevent the lid from proceeding toward a closed position. Thus, the engagement can prevent the lid from being closed. With the lid prevented from closure, the individual loading or handling the cassette can access the situation and remove excess media. The arrangement can provide overstuff prevention or protection. With the arm in a non-flexed condition, the lid is operative to be closed.

Figure 57:
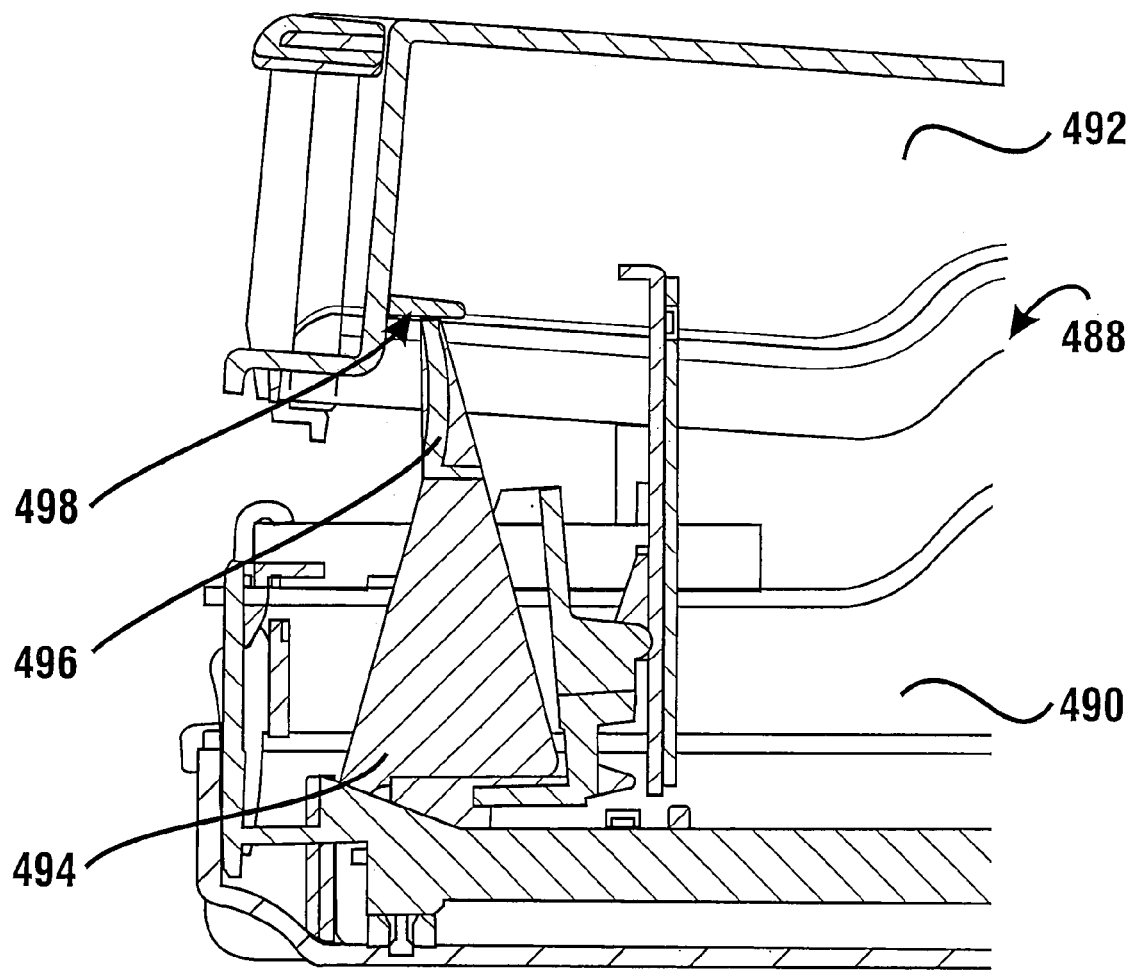
FIG. 57 shows a media stack overload prevention arrangement for a cassette.

FIG. 57 shows a media overload prevention arrangement 488 for a cassette. The arrangement includes a cassette 490, cassette lid 492, push plate base 494 and flexible arm portion 496, and lid rib 498. The arm portion 496 is shown in a flex condition operative to cause engaging contact with the rib 498. Thus, the lid 492 is prevented from closing.

In an alternative cassette overstuff protection arrangement, the contact of a rib with a flexed arm can cause generation of an output signal. For example, the contact can trip an electrical switch. An LED on the cassette or another type of output can be used to indicate to a loader an overloaded condition. In a further alternative arrangement the bending of the flex arm can be detected to cause generation of an output signal. For example, stress may be measurable in the arm. At a predetermined stress level an LED may be operated. The tripping of an LED may also cause information relating to the overloading (e.g., a loader's identification) to be stored in memory, such as in cassette memory.

An exemplary embodiment is directed to increasing security for media cassettes, such as currency cassettes in an automated banking machine. A security system may use biometric features in granting access to the currency cassettes.

In an exemplary embodiment, authorization and/or identification of an individual attempting to service an automated banking machine may be determined based on the individual's appearance and/or voice characteristics and/or other biometric information and/or card information. Hence, biometric features may be used to identify the individual. The use of biometric features may be accomplished in the manner disclosed in U.S. Pat. No. 6,023,688, the disclosure of which is fully incorporated herein by reference. For example, a security system may be configured to identify a user by a biometric input such as facial recognition, thumbprint, iris scan, voice (speech) recognition, or other characteristics or combinations thereof.

A security system may use facial recognition software in combination with a camera. The camera can be mounted to an ATM. The camera may also be used for customers using the ATM for transactions, or the camera may be separate therefrom. The camera can be an internally mounted USB video camera. The camera can be used to capture an image (e.g., digital image) of an individual (or entity) attempting to service or replenish the machine.

An ATM can have a locally held database of individuals or access to a network accessed database of individuals. The individuals in the database are authorized to be granted access to a security container (or area) of the machine. The security container can have the currency cassettes located therein. Facial recognition software can be used to determine or check (e.g., verify or confirm or deny) whether an individual exists in an authorized database. A processor can operate the software to compare a captured image to images in a database. The captured image may be represented by data corresponding thereto. Likewise, the database may include data representative of images. Thus, a comparison may include comparing data which corresponds to images. The software may be operated locally or through the network. That is, the comparison may be carried out locally or at a remote location.

Access to the security container may be controlled by a lock control device. The lock control device can be operatively connected with the facial recognition software. The lock control device can be changed to open the security container under different scenarios. For example, if an individual is positively identified by the facial recognition software, then the lock control device may permit direct access to (e.g., unlock or open) the security container.

Additionally, an ATM may have a dual combination lock (e.g., an electronic lock) associated with the security container. The lock control device may be arranged or programmed to receive two correct combinations or codes in order for the dual combination electronic lock to be placed in an unlocked condition. If an individual is positively identified the facial recognition software, then the lock control device may be arranged to automatically bypass the need for one of the two combinations. That is, a recognized individual may only need to enter only one combination. In such a scenario the servicing individual would still need to enter the second combination in order to gain access to the security container. Nevertheless, such an access arrangement may facilitate or quicken access to a secure area. Thus, the time necessary to replenish an ATM may be reduced.

In addition, a facial image of the service personnel can be recorded and stored in a database by the software application. Other data, such as the time and date of the granted access, may also be stored along with the facial image. The facial image may also be uploaded to a centralized database for centralized storage. A centralized processor may perform auditing functions using the approved facial image. For example, an authorized database may be updated with the approved facial image. That is, the approved new facial image may be used to replace an outdated facial image.

The serial number of a particular cassette may also be recorded and stored in the database along with the facial image of the individual having access to (or servicing) the particular cassette. Likewise, each cassette may have associated therewith a memory data file. A cassette data file may also include the serial number, the facial image data of individuals who were granted access thereto, and the dates and times.

The ability to capture image data of an individual servicing a particular cassette, and the ability to store the image data in correlated relation with other information (e.g., cassette serial number) can further facilitate cassette tracking and minimize fraud. The arrangement permits cradle to grave tracking of a cassette regarding access thereto. The information relating to cassette access can be combined with additional security tracking information (e.g., as previously discussed) regarding a particular cassette. The ability to track and use information for particular cassettes maybe accomplished in the manner disclosed in U.S. Pat. No. 6,109,522, the disclosure of which is fully incorporated herein by reference. Furthermore, a system for image capture and delivery functions may be of the type disclosed in U.S. application Ser. No. 09/991,748 filed Nov. 23, 2001, the disclosure of which is fully incorporated herein by reference. The system may include a Diebold AccuTrack™ digital video arrangement which is commercially available from Diebold, Incorporated, the assignee of the present invention.

Furthermore, with an ATM having a dual combination electronic lock, a person not entered in an authorized database can be required to enter both combinations to gain access. A record of such access by unauthorized persons can also be made. The record may include an image of the person along with the time and date, and the unrecognized combination.

A security system can be arranged so that only a small population of approved and registered service personnel can gain immediate access to a security container of an ATM. To further increase security, facially-recognized personnel may be required to also enter a correct combination to gain security container access. To increase security even further, facially-recognized personnel may be required to also correctly enter plural combinations to gain access to a security container. Other biometric features may also be required prior to granting access.

Other access arrangements may also be used. For example, requiring service personnel to provide a combination also allows the service personnel the opportunity to signal a silent alarm. The alarm may be tripped upon entry of a predetermined combination code or alarm password. Of course, a non-combination trip device may also be used.

Also, if the facial recognition software does not recognize an individual attempting to gain access to an automated banking machine (and/or an improper combination is entered), then a silent alarm could be tripped. The facial image of the non-recognized individual may also be stored in a database along with the date and time.

The security arrangement can also provide the ability to track access to a security container. For example, the individual granted access, along with the time and date, can be stored in a data file for future reference. Of course other data may also be stored in the data file, such as the amount of time that the individual had the security container open.

Alternative security systems may use facial recognition (and/or other biometric related) software for other applications. For example, a security system may be arranged for a cassette work station. For example, the camera 366 at the work station 370 of FIG. 39 may be used in capturing a digital image of an individual attempting to service or replenish a currency cassette. The image can be compared to an authorized database (as previously discussed) in determining whether the individual should be permitted access to the cassette interior.

In an exemplary embodiment a media dispenser (or some other component) of an automated banking machine may include a reject bin. The reject bin may comprise a specialized cassette or canister. The specialized cassette is operative to receive and store therein both diverted and retracted media. Diverted media (e.g., currency or notes or bills) can be that which was determined to have some type of problem (e.g., an unacceptable media condition) by the automated banking machine and is not to be presented to a customer (e.g., unpresentable media). Retracted media can be that which was presented to a customer of the automated banking machine but for some reason was not taken by the customer.

The specialized cassette (which may be referred herein as a reject cassette or a divert/retract cassette or a divert cassette) can have more than one compartment for media storage. The compartments can be separated by one or more partitions. Thus, diverted notes can be stored separately from retracted notes. A divert cassette can be inserted into an automated banking machine (e.g., ATM) in an empty condition (e.g., the compartments devoid of media).

Both diverted notes and the retracted notes can enter a divert cassette through a common media receiving opening of the divert cassette. A partition (e.g., compartment guide) can be operative to direct or guide media (e.g., notes) to different respective compartments (e.g., media storage areas) as the media enters the divert cassette. A partition can be actuated by a lever or cam associated with the divert cassette. Movement of a partition can be controlled by a machine controller, such as an ATM computer. The machine controller can be operative to keep a record of the notes placed in each compartment. The machine controller can also be operative to correlate retracted notes to a specific user account. Other information (e.g., date and time) concerning storage of notes in a divert cassette can also be stored by the machine controller in memory.

In an exemplary embodiment a divert cassette has two compartments or storage areas separated by a partition. In a first position (e.g., closed position) of the partition, the divert cassette is operative to receive diverted currency notes. For example, a diverted note may have been unidentifiable or detected as a double bill. The machine is operative to store diverted notes in a divert storage area of the divert/retract cassette.

In a second position (e.g., open position) of the partition, the divert cassette is operative to receive retracted currency notes. For example, a note or stack of notes presented to a customer may be retracted by the machine after a predetermined time period. The machine is operative to store retracted notes in a retract storage area of the divert/retract cassette. Thus, a divert/retract cassette can have dual note storage areas separated by a movable partition.

The separation of note storage areas prevents the mixing of retracted and diverted notes. The note separating arrangement of a divert cassette allows for enhanced reconciling of notes in daily transactions. For example, an allegation by an ATM user as not having received notes during a transaction can be confirmed or denied by reviewing the notes held in the retract storage area. The comparison can be accomplished with a reduction in note handling, e.g., without involving diverted notes. Thus, the resolving of transaction discrepancies can be simplified. The separation of notes can also be used in detecting a malfunctioning machine or component thereof.

A partition can be moved between open and closed positions by movement of a lever (or cam). The lever can be operatively connected to a drive link which in turn is operatively connected to the partition. The lever can be actuated by a drive mechanism in a dispenser of a machine. The drive mechanism can be operative to engage and move the lever to correspondingly move the partition. A conventional drive mechanism can be used for driving a lever. For example, a drive mechanism may include a drive motor or cylinder or solenoid. In a partition drive arrangement a motor may cause a lever to pivot or rotate which results in movement of the partition. In another partition drive arrangement a cylinder may cause a cam to move in a sliding direction (e.g., axially or horizontally) which also results in movement of the partition. A machine controller can be operative to operate a drive mechanism to move the lever or cam. Thus, a machine controller can be operative to control movement of a partition to keep diverted and retracted notes separated from each other in the same storage container or device.

A separator, such as a plate or sheet (which may be flexible), may also be used to separate note storage areas or compartments. The separator can be fixed or movable. The partition may include the separator. A separator may be attached to the partition. The separator may be flexible and/or retractable. For example, a partition component may be able to pivot relative to a separator. Also, a partition portion may be able to slide relative to a separator and be guided by the separator. A partition can have a separator attached thereto or integral (e.g., of one-piece) therewith.

A separator can be generally horizontally positioned at a vertical level to vertically separate upper and lower compartments. The divert compartment can be an upper compartment (e.g., above the separator) and the retract compartment can be a lower compartment (e.g., below the separator). Of course the divert and retract compartments may be switched. Additionally, compartments may have guides to assist in guiding, directing, positioning, and/or maintaining media placed therein.

An alternative arrangement may have a separator arranged in a generally vertical position to horizontally separate adjacent compartments (e.g., front and rear compartments). Adjacent compartments may also be offset by different angles. It should also be understood that a divert cassette can have a divert storage area and a retract storage area of different sizes. For example, a retract storage area may be of a larger size than a divert storage area in order to receive retracted stacks of notes (in comparison to individual notes which may be placed in a divert storage area).

Figure 58:
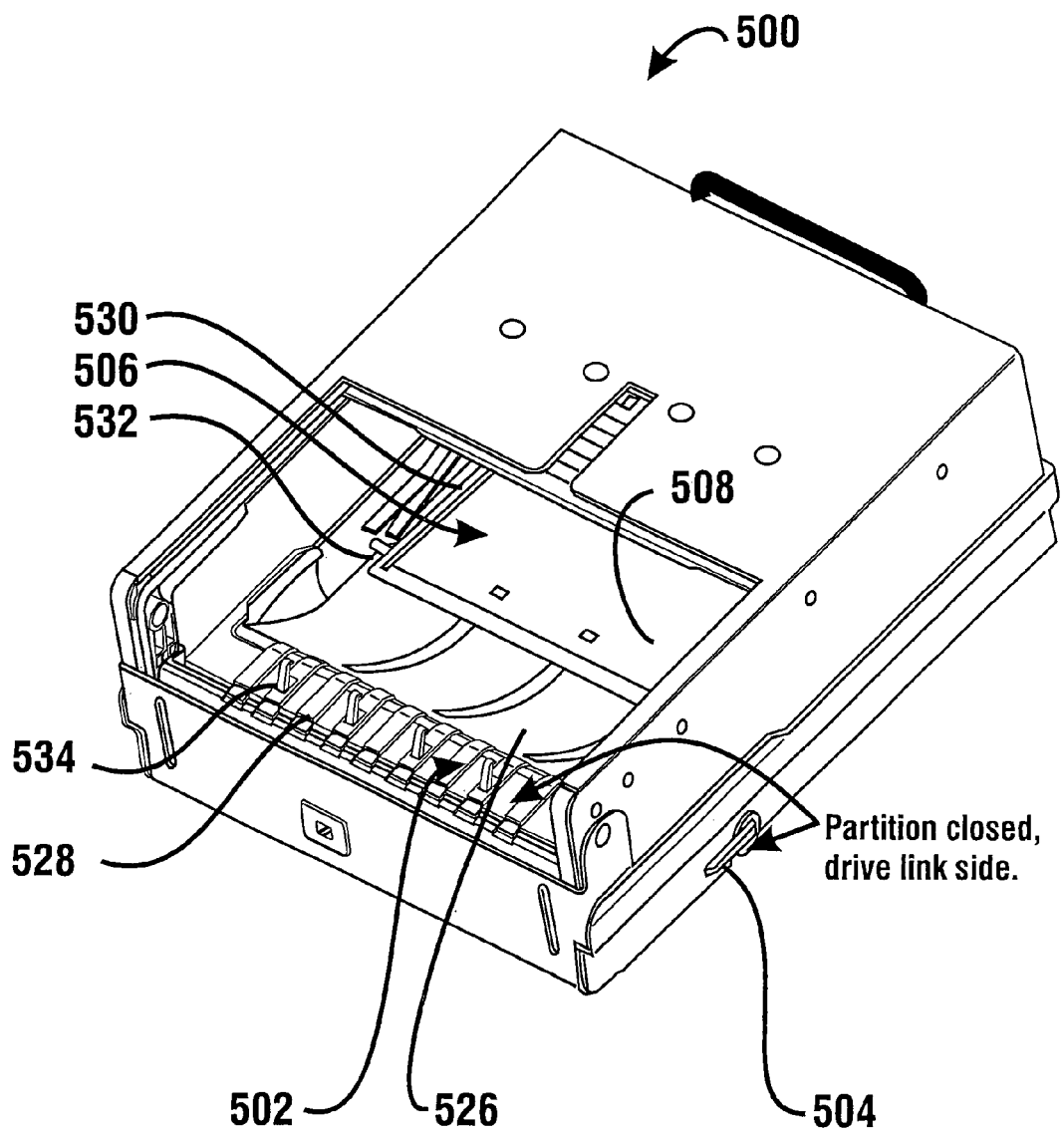
FIG. 58 shows a divert cassette with a partition in a first position.

FIG. 58 shows a divert cassette 500 with a partition 502 in a closed position. A partition lever 504 is also shown in a closed (e.g., horizontal) position. The partition lever can be on an outboard drive link side of the divert cassette. Diverted notes can be stored in a divert storage area 506. The partition 502 includes a compartment separator 508, arms 512, flexible guide 526, and bridge 528. The arms are integral with the bridge 528. A first end of the guide is pivotally connected to the arms adjacent the bridge. A second end of the guide is slidably attached to the separator. The separator has one or more slots 530 which permit tabs 532 of guide 526 to slide relative thereto in engaging relationship.

Figure 59:
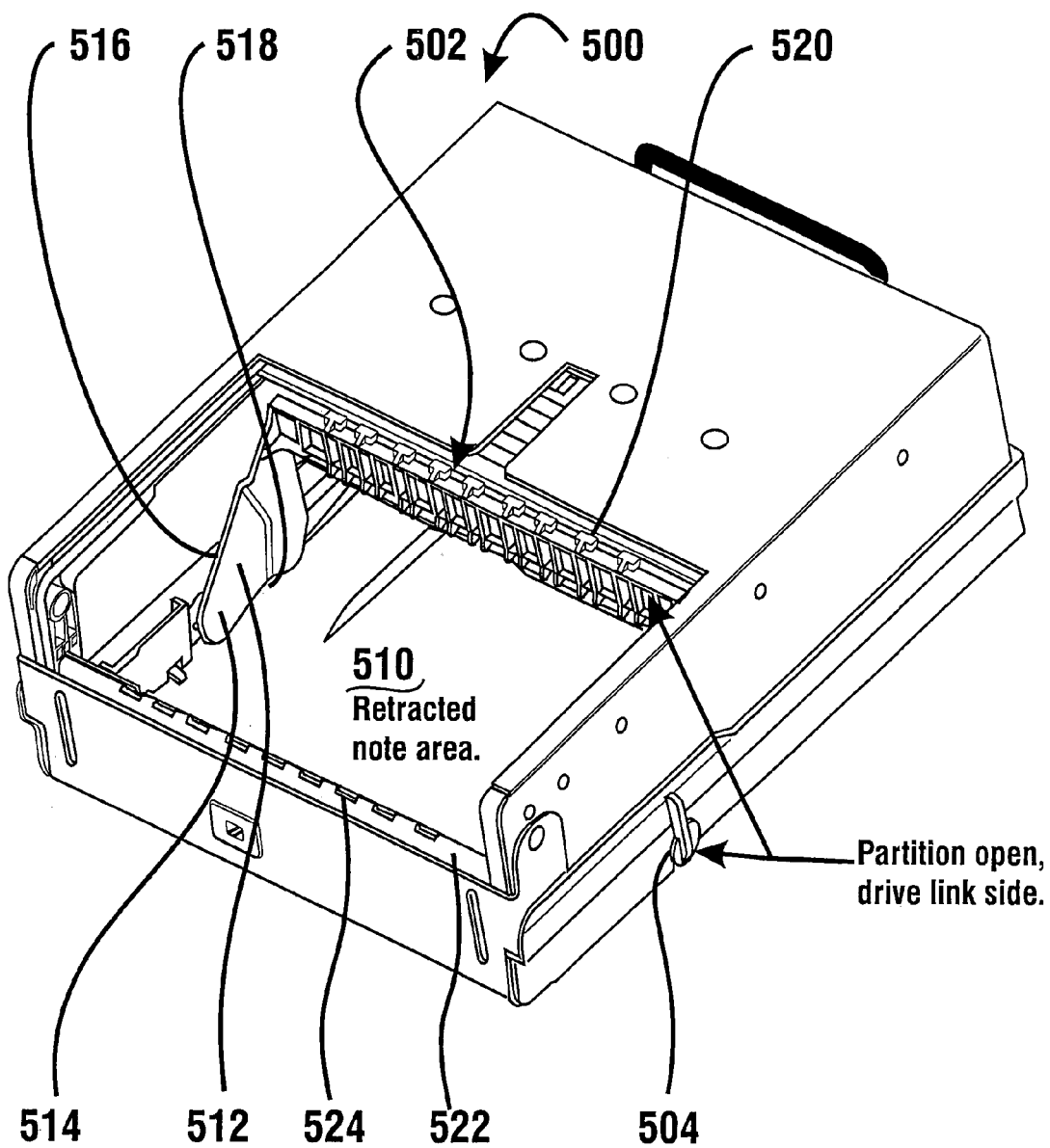
FIG. 59 shows the divert cassette of FIG. 58 with the partition in a second position.

FIG. 59 shows the divert cassette 500 with the partition 502 in an open position. Retracted notes can be stored in a retract storage area 510. The partition lever 504 is shown in its open (e.g., vertical) position.

The lever and a partition arm are connected or linked together about a common axis, such as the axis of an elongated connecting member (e.g., rod or shaft). For example, a common shaft can connect the lever to a partition arm 512. Alternatively, the lever may be integral with an arm. Pivotable rotation of the lever 504 about its axis is operative to axially rotate the arm (connected to the lever). The arms are connected via the bridge. The partition guide is connected to the bridge. Thus, pivotable rotation of the lever is operative to pivot the partition 502 between open and closed positions.

The partition arms can be of a shape (e.g., generally triangular) which assists in support of the partition in both open and closed positions. For example, an arm may have a first edge 516 on one engaging side thereof and a second edge 518 on an opposite engaging side thereof. The arm edges may be arranged to engage a portion (or component) of the cassette to assist in supporting the partition in a respective open or closed position.

The partition bridge 528 has comblike teeth (or forks) 520 which are operative to engage a cassette wall 522 adjacent the media receiving opening of the cassette. The cassette wall has grooves (or slots) 524 which are adapted to receive the teeth in engaging relationship. The slots can guide the teeth (and thus the partition bridge) into a proper open position. The teeth/groove arrangement can be operative to provide alignment or support or stability to the partition bridge when the partition is in the open position. The partition bridge 528 also has teeth (or projections) 534 which are adapted to engage a cassette wall portion when the partition is in a closed position. The projections 534 can likewise provide alignment or support or stability to the partition bridge when the partition is in the closed position.

In the embodiment of FIGS. 58 and 59 the partition separator 508 is fixed. Partition arms 512 are operative to pivot about an axis 514 (which can be the same axis on which the lever pivots) to move the partition toward an open position. Movement of the partition bridge toward an open position causes the partition guide to flex. The guide tab moves in the separator slot to permit the guide to slide (in a direction away from the media receiving opening) underneath the separator. For reasons of clarity the separator is not shown in FIG. 59. However, note FIG. 63.

The lever 504 can be driven to pivot. Pivoting of the lever causes pivoting of the partition arms and the bridge. Pivoting of the bridge causes the partition to move from a closed position (FIG. 58) to an open position (FIG. 59). Contrarily, the lever can also be pivoted to cause pivoting of the partition from the open position (i.e., retracted media receiving position) to the closed position (i.e., diverted media receiving position).

In an exemplary operation an automated banking machine (e.g, an ATM) has at least one divert cassette therein. The divert cassette includes dual storage compartments. The divert cassette includes a diverted currency storage area and a retracted currency storage area. The machine is operative to perform a financial transaction for a customer. For example, the machine may perform a cash withdrawal transaction. The machine can determine whether currency has an acceptable or an unacceptable currency condition. The determination may include a conventional currency bill sensor or reader (e.g., double bill sensor, dirty bill sensor, counterfeit bill sensor, torn bill sensor, unreadable bill sensor, currency validator and/or counterfeit detector, or a combination thereof). Unacceptable currency can be diverted and transported for storage in the diverted media storage area of the divert cassette. Acceptable currency can be transported through the machine and presented to a customer (e.g., the customer requesting the cash withdrawal transaction) at a customer accessible currency outlet. However, the machine is operative to retract any remaining currency previously presented to a customer after a predetermined time period. The machine is operative to transport the retracted currency for storage in the retracted currency storage area of the divert cassette.

Of course, it should be understood that other partition and/or lever drive arrangements may be used. For example, a partition may be operatively connected or linked to a slidable drive cam. A drive arrangement may operate to slide the cam to cause corresponding movement (e.g., pivoting) of the partition. Thus, other drive arrangements, such as a sliding drive arrangement, may be used for moving a partition. Additionally, electrical, magnetic, screw, and mechanical actuation arrangements (or combinations thereof) for driving a partition may also be used.

A machine (e.g., ATM) controller may also be able to determine when a compartment of a divert cassette is full or needs servicing. A divert cassette may have a media-high indicator which is operative to be actuated when the media reaches a predetermined level. A media-high indicator may operate on the principles similar to those of a media-low indicator, which have been previously discussed. A divert cassette may have a media-high indicator for each storage compartment. A machine can be operative to read an actuated or tripped media-high indicator. Upon determining a divert cassette compartment as full, one or more signals may be sent from the machine to authorized personnel indicative of the divert cassette condition or status. Alternatively, if one compartment of a dual compartment cassette is determined as full, then the machine controller may be programmed to feed both divert and retract notes to the other non full compartment. It should also be understood that the embodiments (e.g., RFID tags, etc.) discussed in this application relating to media cassettes may also be applied to divert cassettes.

In an exemplary embodiment a divert cassette includes a self-locking arrangement for a partition. A divert cassette partition can be automatically locked during removal from a machine and unlocked while inserted a machine. A resilient member (e.g., spring) and lock can be located on an outboard non-drive link side of a divert cassette. That is, the spring and lock can be located on a cassette side opposite to the drive link side (which can have the previously discussed partition lever). Thus, the partition drive and the partition locking arrangement can be situated such that they do not interfere with each other.

Figure 60:
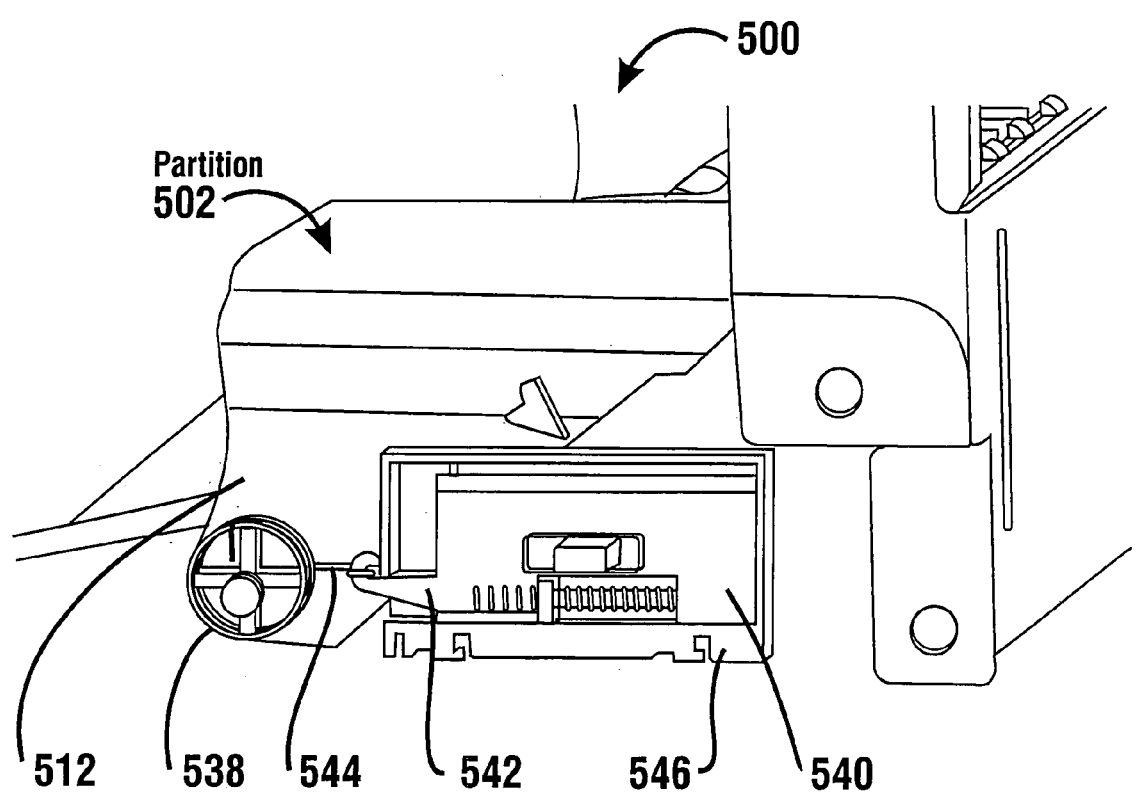
FIG. 60 shows a divert cassette with a self-locking partition.

FIG. 60 shows the divert cassette 500 in which the partition 502 is self-locking. In FIG. 60 the partition is in a locked condition. The shown divert cassette of FIG. 60 can be situated outside of an automated banking machine (or partly positioned in the machine). A partition locking arrangement includes a spring (e.g., torsion spring) 538 and a lock 540. The torsion spring is operatively connected to the partition 502. For example, the torsion spring can be operatively engaged or connected to a partition arm 512. An arm 542 of the lock 540 can be engaged with an arm 544 of the torsion spring 538. Both the lock arm and the torsion spring arm each have an end engaging portion or hook, which may be J-shaped or U-shaped. The lock arm is slidable in a lock housing 546. The lock arm has a hook 552. The torsion spring arm has a hook 554. A locking engagement of the lock arm and spring arm prevents a closed partition from moving to an open position. Other arrangements may use a device other than a torsion spring, such as a projection operative to engage the lock arm hook.

Figure 61:
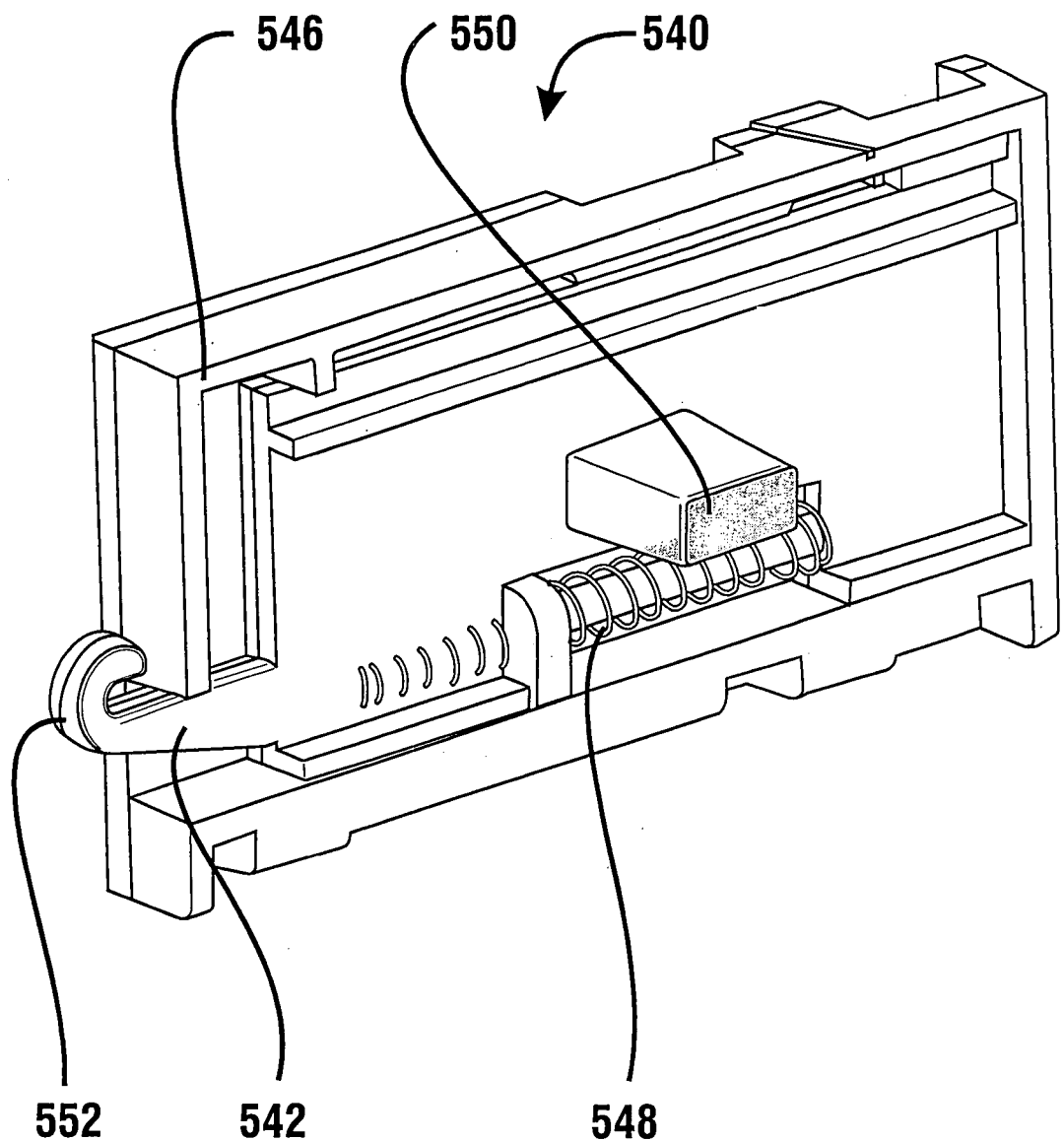
FIG. 61 shows a lock for a partition.

FIG. 61 is an enlarged view of the lock 540 and J-shaped lock arm 542 of FIG. 60. The lock includes a biasing member 548, such as a spring, which provides the lock with a force toward its locking position. That is, the spring attempts to keep the lock arm hook closer to the lock housing. The lock can be a non-user lock in that it can operate automatically without requiring contact by a person. Thus, the locking arrangement can be located inside of a divert cassette and be inaccessible to persons when the cassette is closed. FIG. 61 also shows a projection 550 (e.g., protruding button) on the lock arm. The projection button 550 is operative to engage a dispenser feed channel component, such as a picker mechanism component.

Figure 62:
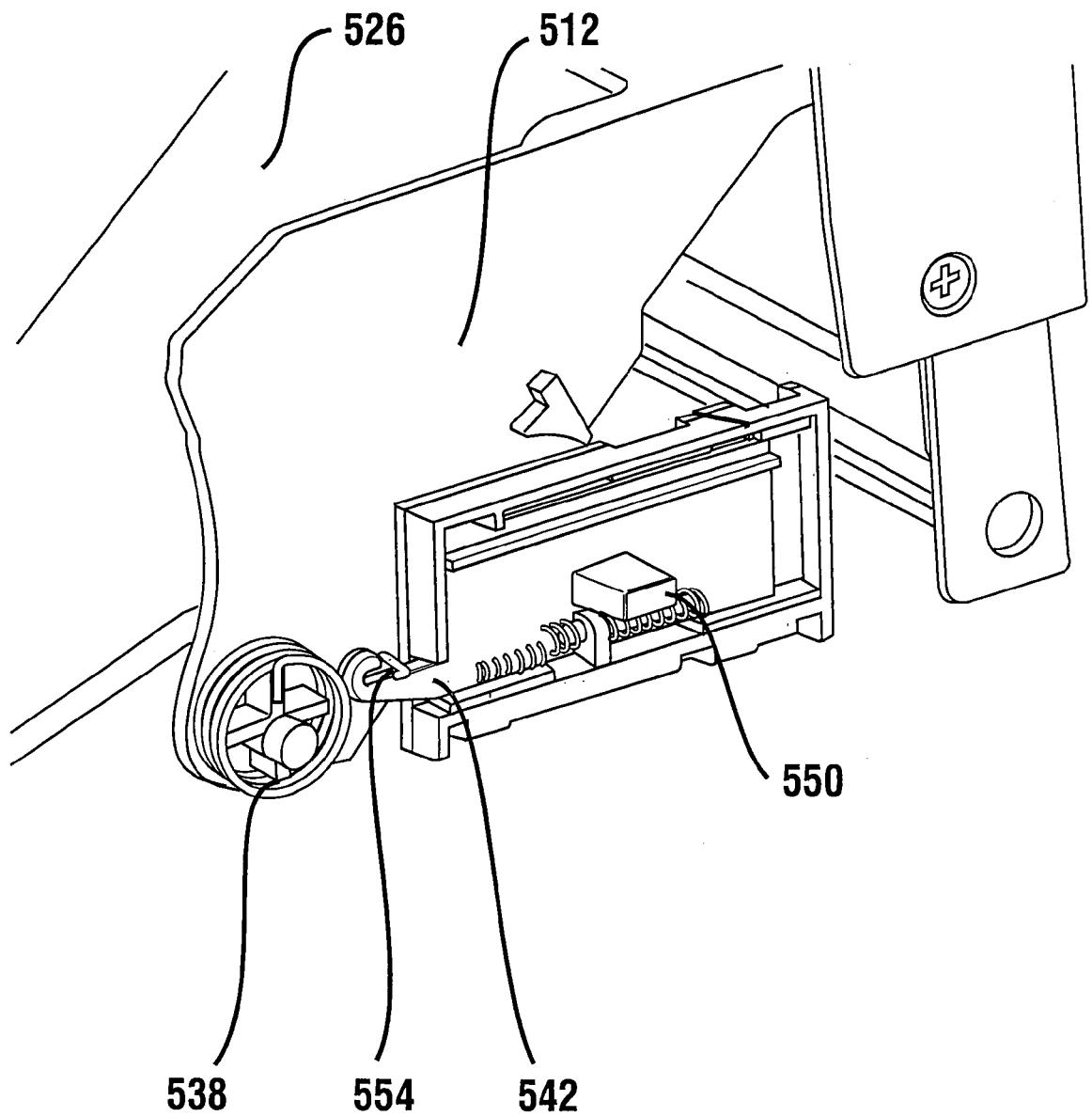
FIG. 62 shows a positioning of a lock arm and a torsion spring.

The torsion spring 538 exerts a biasing force toward having the partition in the closed position. The torsion spring attempts to keep the partition in a closed position. That is, the normal position of the J-shaped arm of the torsion spring is shown in FIG. 62. However, as previously discussed, a partition drive (e.g., engageable with the partition lever) can be operated to overcome (or act against) the force of the torsion spring to move the partition to an open position. When the partition is in the open position (as shown in FIG. 63) the torsion spring is compressed and desires to spring back to the position shown in FIG. 62.

As the divert cassette is inserted into a media dispenser, the projection button 550 engages a dispenser feed channel component. This engagement is operative to move the lock arm 542 relatively toward the torsion, spring. Movement of the lock arm a predetermined distance is operative to enable release of the torsion spring from the lock. That is, movement of the lock button 550 is able to overcome the force of the lock spring 548 to move the lock arm 542. During unlocking, the lock arm is moved toward the torsion spring far enough to allow release or disengagement of the torsion spring hook from the lock hook. FIG. 62 shows the lock arm fully moved toward the torsion spring 538.

Figure 63:
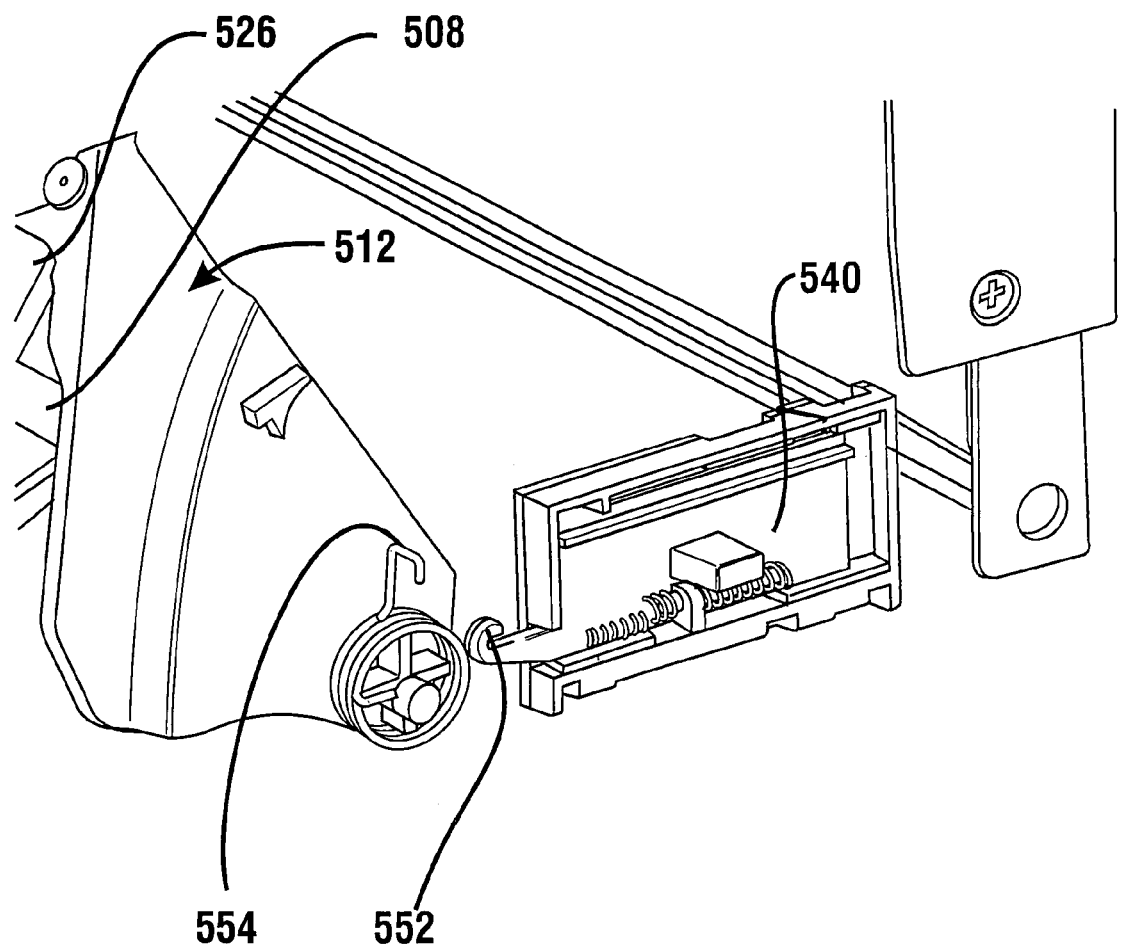
FIG. 63 shows another positioning of the lock arm and the torsion spring.

With the cassette fully inserted into the dispenser, the lock arm is in an unlocked position (FIGS. 62 and 63). With the torsion spring free of the lock arm hook the divert cassette partition is operative to be freely driven (as previously discussed) between closed and open positions. Thus, the torsion spring arm can be rotated relative to (e.g., away from) the lock arm by the partition drive. As shown in FIG. 63, counterclockwise rotational movement of the torsion spring by the partition drive can cause removal of its hook from alignment with the lock hook. That is, the torsion spring arm can be moved (against its spring force) away from the lock arm when the partition is driven toward the open position. Similarly, the torsion spring arm can be moved toward the lock arm when the partition is driven toward the closed position. However, locking engagement between the torsion spring hook and the lock hook will not occur until the lock arm is again moved (or retracted) away from the torsion spring.

During removal of a divert cassette from a dispenser, the outside drive for the partition becomes disengaged from the partition (e.g., becomes disengaged from the partition lever). With the outside drive no longer controlling movement of the partition, the partition is free to pivot. Thus, the torsion spring can move (i.e., spring back) to place the partition in its closed position (as shown in FIG. 62). As the divert cassette is being further removed from the dispenser, the lock button becomes removed from engagement with the picker channel component. With the lock button no longer held by the picker channel component, the lock spring 548 can act to retract the lock arm toward the lock housing. That is, as the cassette is being removed the lock arm (via the force of the lock spring) is also being moved further away from the torsion spring until they are lockingly engaged via their hooked ends (as shown in FIG. 60). The lock spring 548 can be set at a force load strong enough to maintain locking of the partition in the closed position. That is, the lock spring can be operative to prevent unlocking of the engaged lock hook and torsion spring hook when the cassette is completely removed from the dispenser. Thus, a divert cassette partition can be locked during transport.

Figure 64:
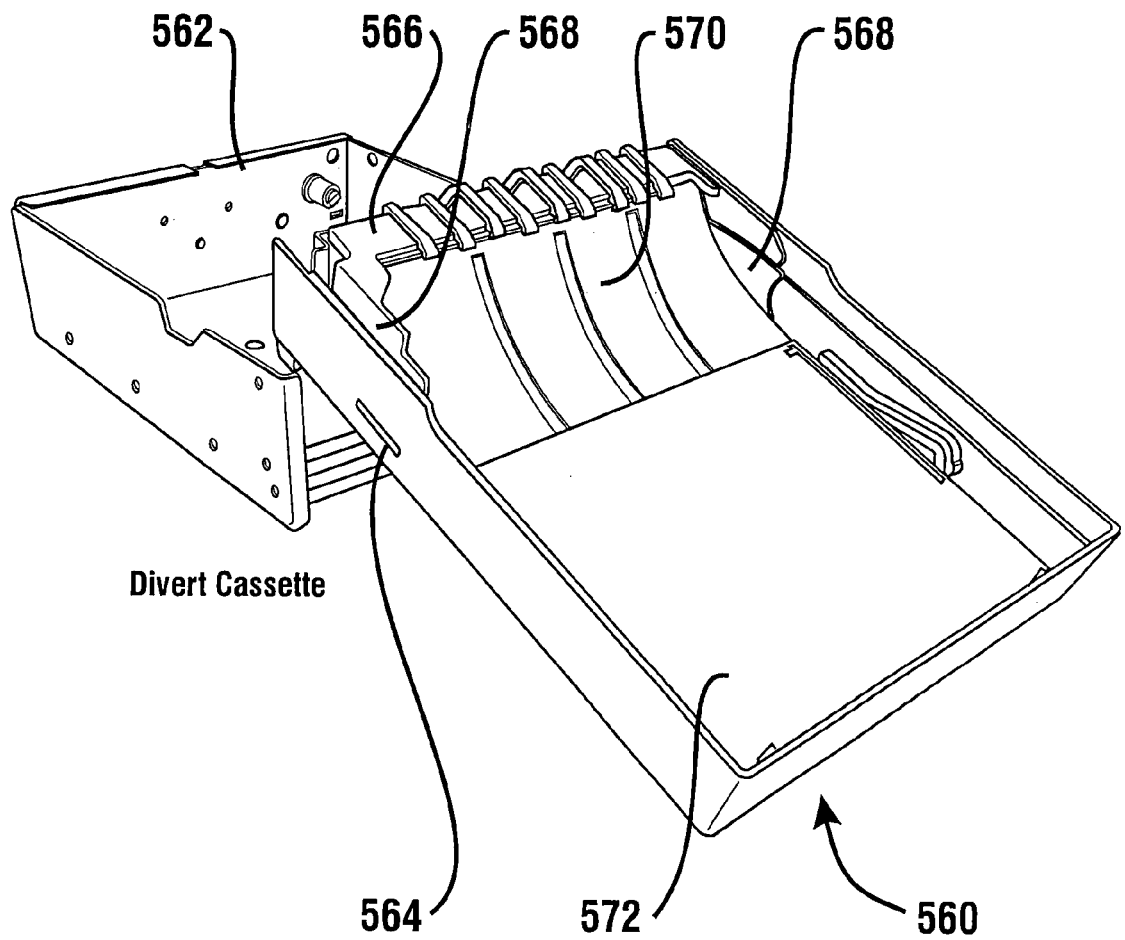
FIG. 64 shows an opened divert cassette.

With the partition in its closed position the lever can be correspondingly in its horizontal position (or alternatively some other corresponding position). Upon extraction of the cassette from a machine the lever is locked in its horizontal position. Thus, when the cassette is again inserted into a machine its lever can be in a proper position (or alignment) to engage with a partition drive. With the divert cassette removed from an automated banking machine, an authorized user can remove notes from the divert and retract storage areas. Notes may be removed after disengaging the partition lock mechanism. FIG. 64 shows an opened divert cassette 560 including a lid 562. Of course the partition portion may also be viewed as a "lid" portion. A partition lever 564, bridge 566, arms 568, guide 570, and separator 572 are also shown in FIG. 64.

In an exemplary operation the locking status of a partition (e.g., compartment guide) of an automated banking machine cassette can be automatically changed responsive to movement of the cassette relative to the automated banking machine. That is, the partition is operative to be locked or unlocked. Subsequently, the locking status of the partition can again be automatically changed responsive to opposite movement of the cassette relative to the automated banking machine.

In certain arrangements the notes may be removed with the partition locked in the closed position. For example, the separator may be partly lifted upon removal of the cassette lid. Because the partition is kept in its closed position, a user can be prevented from closing the cassette (i.e., closing the lid) with the partition in the open position (which can be the wrong lever position for lever/drive engagement during insertion into a machine). A divert cassette partition can be locked while out of a machine and unlocked while in a machine. The locking arrangement allows a divert cassette to remain in operable condition.

In an alternative embodiment a partition lever may be arranged with a dispenser (or an outside drive mechanism) such that during removal of the divert cassette from the dispenser the lever is automatically returned to an exit position to place the partition in its closed position. Further removal of the cassette would result in locking of the partition in its closed position. In the embodiment the partition would be free to open and close under no load from a torsion spring.

FIGS. 65 and 66 show views of a closed divert cassette 573. FIG. 65 shows a front perspective view of the divert cassette 573 including a carrying handle 574, a locking latch lever 575, and a partition lever 576. FIG. 66 shows a rear perspective view of the divert cassette 573.

Figure 67:
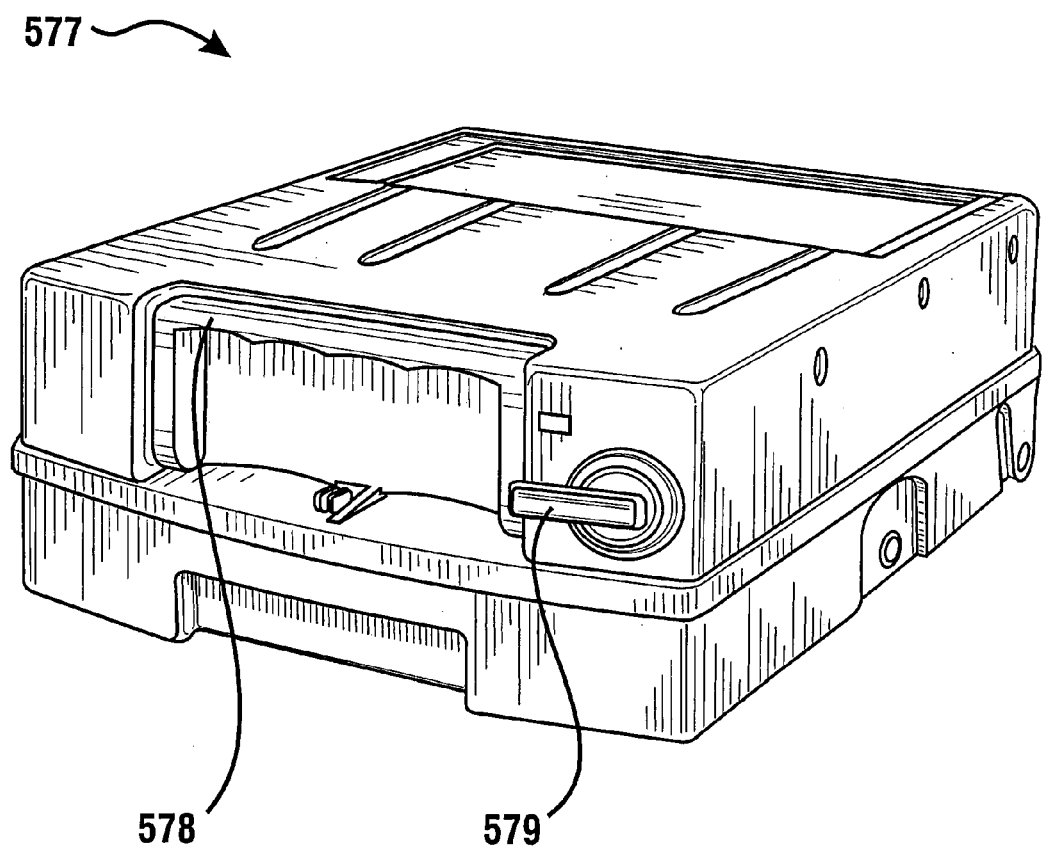
FIG. 67 shows a front perspective view of another divert cassette.

FIG. 67 shows a front perspective view of another divert cassette 577 having a carrying handle 578 and a locking latch lever 579 attached to the shown cassette upper portion or lid.

Figure 68:
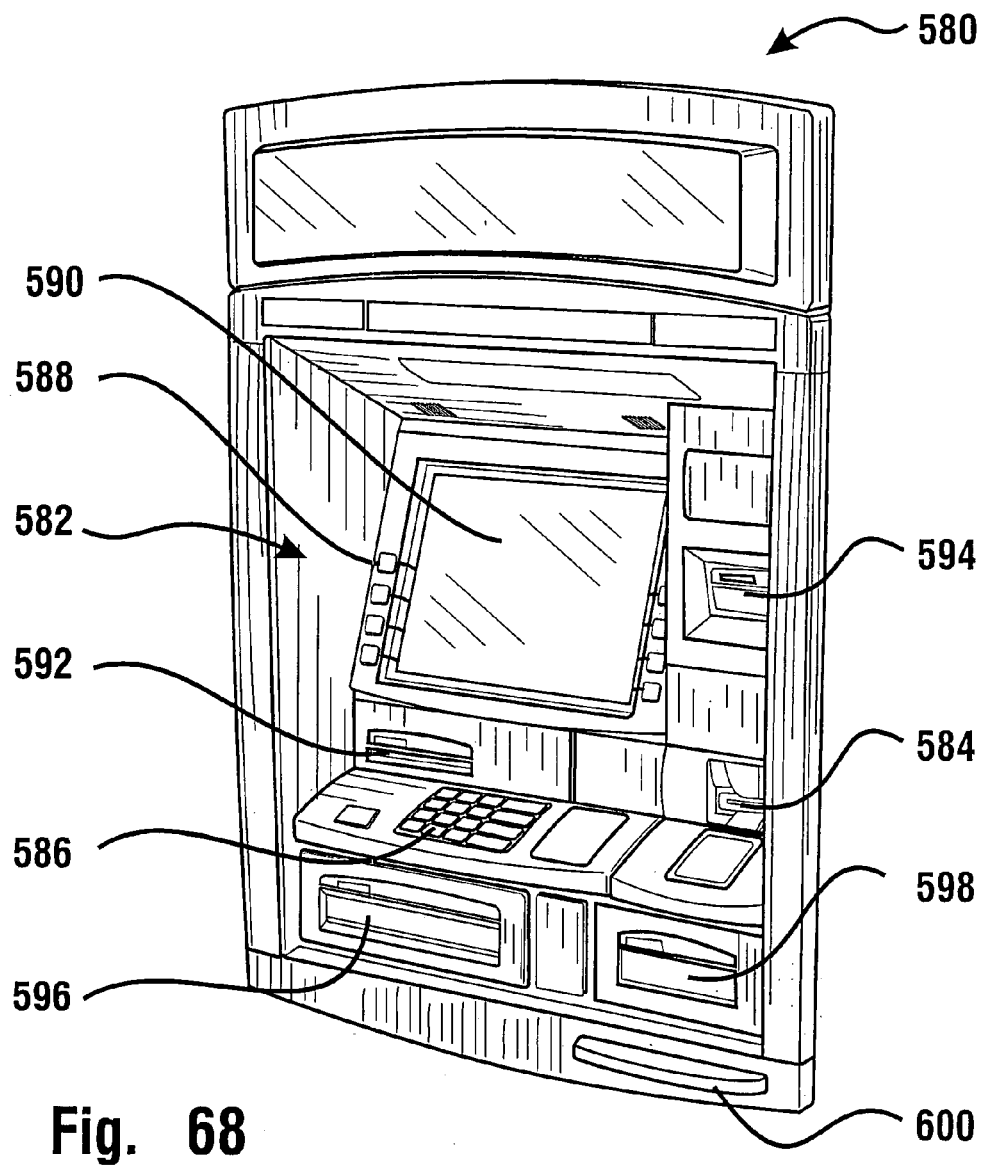
FIG. 68 shows a perspective of an automated banking machine.

FIG. 68 shows another embodiment of an automated banking machine generally indicated 580. The automated banking machine can be an ATM. However, other embodiments may use other types of automated banking machines. ATM 580 includes a fascia 582 which serves as a user or customer interface. The fascia includes a card slot 584, keypad 586, function keys 588, display 590, receipt outlet slot 592, mini statement outlet 594, document (cash) withdrawal opening 596, document deposit opening 598, and a writing shelf 600. The ATM is operative to use the media cassettes and the divert cassettes discussed herein.

Card slot 584 is used to input a card with encoded data thereon that is usable to identify the customer and/or the customer's account information. Card slot 584 is connected to a card reader input device for reading data encoded on the card. The machine may also include other input devices such as biometric readers that may be operative to receive customer identifying inputs such as fingerprints, iris scans, retina scans, face topography data, voice data, or other inputs that provide data that is usable to identify a user. An example of an ATM that uses biometric input devices and other types of input devices is shown in U.S. Pat. No. 6,023,688 the disclosure of which has been fully incorporated herein by reference.

Keypad 586 includes a plurality of keys which may be actuated by a customer to provide inputs to the machine. Function keys 588 permit a customer to respond to screen prompts. The display 590 may be a touch screen display which enables outputs through displays on the screen and enables customers to provide inputs by placing a finger adjacent to areas of the screen. Outlet 594 can also be used to receive other items from ticket printing mechanisms, check printing mechanisms, and other devices that operate to apply indicia to media in the course of performing transactions carried out with the machine. It should be understood that these features of the described ATM user interface are exemplary and in other embodiments the user interface may include different components and/or features and/or arrangements. For example, a different arrangement may have the locations of the receipt outlet slot and the mini statement outlet switched. Likewise with switching the card slot and the receipt outlet slot.

Figures 69, 70, 71:
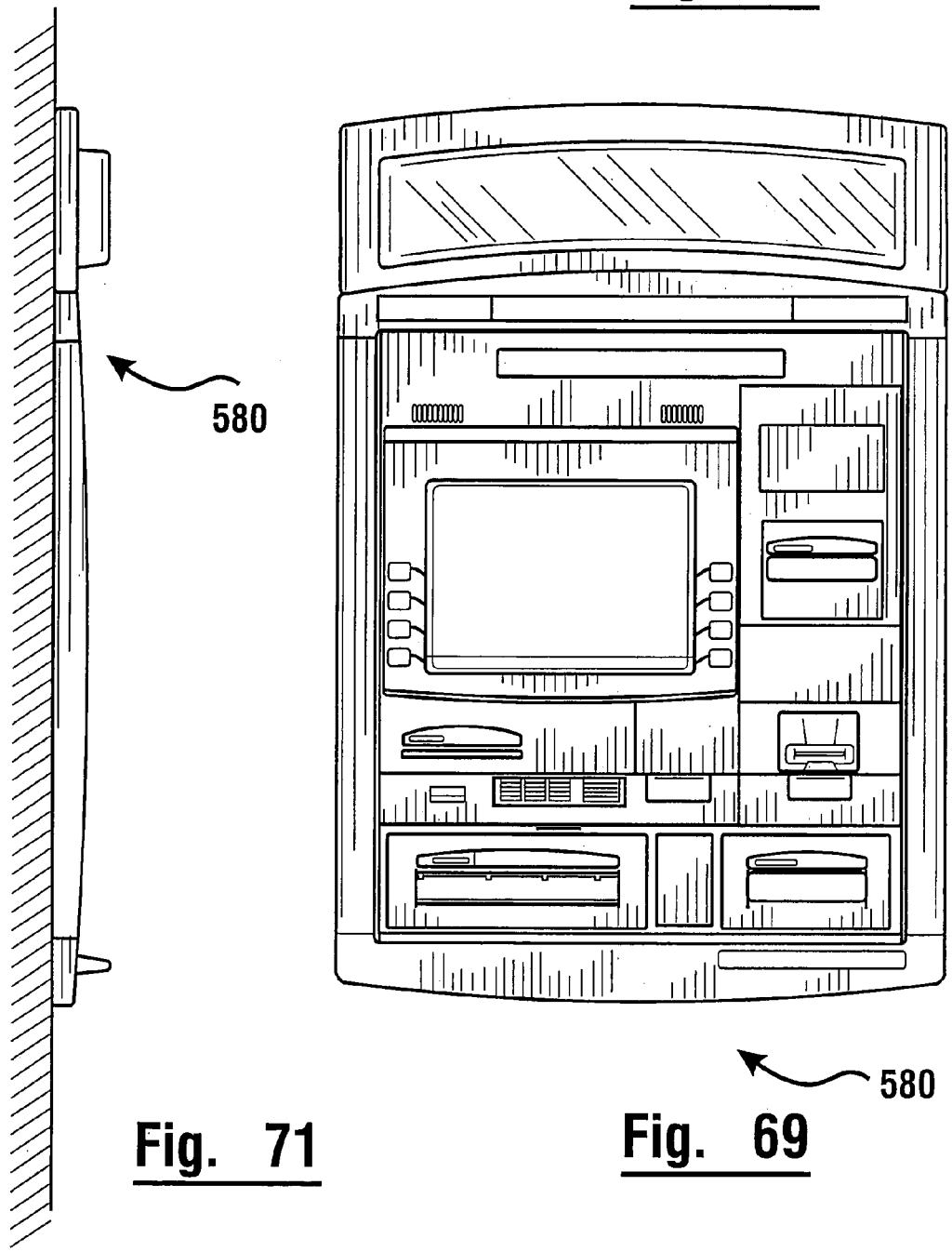
FIG. 69 shows a front view of the machine of FIG. 68.
FIG. 70 shows a top view of the machine of FIG. 68.
FIG. 71 shows a side view of the machine of FIG. 68.

FIGS. 69, 70, and 71 show respective front, top, and side views of the ATM 580 of FIG. 68.

FIG. 72 shows another embodiment of an automated banking machine generally indicated 610. The automated banking machine has a customer interface which includes a card slot 612, keypad 614, function keys 616, display 618, receipt outlet slot 620, mini statement outlet 622, document (cash) withdrawal opening 624, document deposit opening 626, and a bulk document deposit opening 628. FIGS. 73 and 74 show respective top and side views of the automated banking machine 610 of FIG. 72. The automated banking machine is operative to use the media cassettes and the divert cassettes discussed herein.

Thus the new and improved automated banking machine features achieve at least one of the above stated objectives, eliminate difficulties encountered in the use of prior devices and systems, solve problems, and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. An apparatus including:
   a divert cassette,
   wherein the divert cassette is insertable in, adapted for use in, and removable from an automated banking machine,
   wherein the divert cassette comprises a first storage compartment including a diverted media storage area,
   wherein the first storage compartment is adapted to receive diverted media which was deemed unpresentable to an automated banking machine customer,
   wherein the divert cassette comprises a second storage compartment including a retracted media storage area,
   wherein the second storage compartment is adapted to receive retracted media which was presented to an automated banking machine customer,
   wherein the divert cassette has a portion thereof comprising a compartment separating structure,
   wherein the compartment separating structure separates the first storage compartment from the second storage compartment.

2. An apparatus including:
   a divert cassette,
   wherein the divert cassette is adapted for use in an automated banking machine,
   wherein the divert cassette includes a diverted media storage area,
   wherein the diverted media storage area is operative to receive diverted media which was deemed unpresentable to an automated banking machine customer,
   wherein the divert cassette includes a retracted media storage area, wherein the retracted media storage area is operative to receive retracted media which was presented to an automated banking machine customer,
wherein the retracted media storage area is separated from the diverted media storage area,
wherein the divert cassette includes a partition operative to direct media to either of the diverted media storage area or the retracted media storage area.

3. The apparatus according to claim 2 wherein the partition is operatively movable.

4. The apparatus according to claim 3 wherein the partition is pivotable.

5. The apparatus according to claim 3 wherein the divert cassette includes a lever operatively connected to the partition, wherein the lever is operative to be driven by an exterior drive mechanism, and wherein movement of the lever is operative to correspondingly move the partition.

6. The apparatus according to claim 5 wherein the divert cassette includes a separator operatively connected to the partition, wherein the separator is operative to separate the diverted media storage area from the retracted media storage area.

7. The apparatus according to claim 6 wherein the separator is movable.

8. The apparatus according to claim 7 wherein the separator is operative to correspondingly move with the partition.

9. The apparatus according to claim 8 wherein the partition is operatively connected to the separator via a flexible guide.

10. The apparatus according to claim 5 wherein the partition includes a pair of arms connected via a bridge, wherein the arms are integral with the bridge.

11. The apparatus according to claim 10 wherein the arms are operatively connected to the lever.

12. The apparatus according to claim 3 wherein the divert cassette includes a common media receiving opening, wherein both diverted media and retracted media are operative to enter the divert cassette through the opening.

13. The apparatus according to claim 3 and further including an automated banking machine, wherein the machine includes at least one computer, wherein the machine is operative to present media to a customer, and wherein the machine includes the divert cassette.

14. The apparatus according to claim 13 wherein the machine is operative to determine whether media has an unacceptable media condition, wherein the machine is operative to divert media with an unacceptable condition to the diverted media storage area.

15. The apparatus according to claim 14 wherein the machine is operative to store the diverted media in the diverted media storage area.

16. The apparatus according to claim 15 wherein the machine is operative to store the diverted media in the diverted media storage area without presenting the diverted media to a customer.

17. The apparatus according to claim 13 wherein the machine is operative to retract media presented to a customer after a predetermined time period.

18. The apparatus according to claim 17 wherein the machine is operative to store the retracted media in the retracted media storage area.

19. The apparatus according to claim 13 wherein the divert cassette includes a media-high indicator, wherein the indicator is operative to be actuated when the media in one of the storage areas reaches a predetermined level, wherein the machine is operative to read the indicator.

20. The apparatus according to claim 3 wherein the diverted media storage area is located above the retracted media storage area with the divert cassette in an operating position.

21. A method including:
(a) operating an automated banking machine, wherein the machine includes a computer and a removable divert cassette,
wherein the divert cassette comprises a first storage compartment including a diverted media storage area, wherein the first storage compartment is adapted to receive diverted media which was deemed unpresentable to an automated banking machine customer,
wherein the divert cassette comprises a second storage compartment including a retracted media storage area, wherein the second storage compartment is adapted to receive retracted media which was presented to an automated banking machine customer and remained in a customer accessible location during a predetermined period of time,
wherein the divert cassette has a portion thereof comprising a compartment separating structure, wherein the compartment separating structure separates the first storage compartment from the second storage compartment;
(b) operating the computer to determine at least one of:
(b1) unpresentable media, or
(b2) retracted media;
(c) responsive to (b1), operating the machine to store the unpresentable media in the first storage compartment;
(d) responsive to (b2), operating the machine to store the retracted media in the second storage compartment.

22. A method including:
(a) providing an automated banking machine with a divert cassette including a partition movable between a first position and a second position, wherein the divert cassette includes a diverted media storage area separated from a retracted media storage area, wherein the first position is operative to direct media to the diverted media storage area, wherein the second position is operative to direct media to the retracted media storage area,
(b) determining whether media has an acceptable or an unacceptable media condition,
(c) responsive to (b), either
(c1) diverting media having an unacceptable media condition to the diverted media storage area, including moving the partition to the first position, or
(c2) presenting media having an acceptable media condition to a customer;
(c2a) responsive to (c2), retracting presented media remaining after a predetermined time period to the retracted media storage area, including moving the partition to the second position.

23. The method according to claim 22 wherein (c1) includes storing the diverted media in the diverted media storage area without presenting the diverted media to a customer.

24. The method according to claim 22 wherein (a) includes providing the automated banking machine with a divert cassette including a common media receiving opening, wherein both diverted media and retracted media are operative to enter the divert cassette through the common opening.

25. The method according to claim 22 wherein the automated banking machine includes a drive mechanism, wherein (a) includes providing the automated banking machine with a divert cassette including a movable lever operatively connected to the partition, wherein movement of the lever is operative to correspondingly move the partition, and further including (d) moving the lever with the drive mechanism.

26. The method according to claim 22 wherein the media comprises currency, wherein (b) includes determining whether the currency is presentable to a customer.

27. The method according to claim 26 and further including (d) removing currency from one of the diverted media storage area and the retracted media storage area;

(e) removing any currency in the other of the diverted media storage area and the retracted media storage area.

* * * * *